US011418240B2

(12) United States Patent
Harrison et al.

(10) Patent No.: US 11,418,240 B2
(45) Date of Patent: Aug. 16, 2022

(54) VARIABLE COHERENCE ADAPTIVE ANTENNA ARRAY

(71) Applicant: Telefonaktiebolaget LM Ericsson (publ), Stockholm (SE)

(72) Inventors: Robert Mark Harrison, Grapevine, TX (US); Sebastian Faxér, Järfälla (SE); Heunchul Lee, Stockholm (SE); Niklas Wernersson, Kungsängen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 753 days.

(21) Appl. No.: 16/318,632

(22) PCT Filed: Nov. 14, 2018

(86) PCT No.: PCT/EP2018/081226
§ 371 (c)(1),
(2) Date: Jan. 17, 2019

(87) PCT Pub. No.: WO2019/096843
PCT Pub. Date: May 23, 2019

(65) Prior Publication Data
US 2021/0359733 A1    Nov. 18, 2021

Related U.S. Application Data

(60) Provisional application No. 62/588,264, filed on Nov. 17, 2017.

(51) Int. Cl.
*H04B 7/04*     (2017.01)
*H04B 7/0456*   (2017.01)
(Continued)

(52) U.S. Cl.
CPC ........... *H04B 7/0486* (2013.01); *H01Q 21/24* (2013.01); *H04B 7/0639* (2013.01); *H04B 7/0868* (2013.01)

(58) Field of Classification Search
CPC .. H04B 7/0486; H04B 7/0639; H04B 7/0868; H01Q 21/24
See application file for complete search history.

(56) References Cited

U.S. PATENT DOCUMENTS 8,953,699 B2    2/2015  Sayana et al.
10,044,422 B2   8/2018  Moulsley et al.
(Continued)

FOREIGN PATENT DOCUMENTS

CN    103918195 A    7/2014
CN    105830355 A    8/2016
(Continued)

OTHER PUBLICATIONS

Intel Corporation, "Discussion on NR codebook design", 3GPP TSG-RAN WG1 #87, Reno, USA, Nov. 14, 2016, pp. 1-9, R1-1611983, 3GPP.
(Continued)

*Primary Examiner* — Freshteh N Aghdam
(74) *Attorney, Agent, or Firm* — Coats & Bennett, PLLC

(57) ABSTRACT

A user equipment (UE) (200, 500, 1530) transmits data to a base station (100, 500, 1520) in a wireless communication network. The UE (200, 500, 1530) comprises multiple antenna ports, and selects a precoding matrix from a respective first, second, third, or fourth set of precoding matrices according to a number of spatial layers. The first, second, third, and fourth sets of precoding matrices are available for all coherence capabilities and are comprised within a larger set of precoding matrices. The larger set comprises precoding matrices that are not available for all coherence capabilities. The first, second, third, and fourth sets of precoding matrices correspond to one, two, three, or four spatial layers, respectively. The number of columns in the selected precoding matrix is equal to the number of spatial layers and each column comprises a single non-zero element and one or
(Continued)

more zero elements. The UE (200, 500, 1530) transmits data on the number of spatial layers according to the selected precoding matrix.

20 Claims, 29 Drawing Sheets

(51) Int. Cl.
*H01Q 21/24* (2006.01)
*H04B 7/06* (2006.01)
*H04B 7/08* (2006.01)

(56) References Cited

U.S. PATENT DOCUMENTS

| | | | |
|---|---|---|---|
| 10,958,321 B2 | 3/2021 | Park et al. | |
| 2009/0067391 A1* | 3/2009 | Shen | H04L 1/0027 370/336 |
| 2010/0183089 A1 | 7/2010 | Vasil'evich et al. | |
| 2011/0243079 A1 | 10/2011 | Chen et al. | |
| 2012/0008587 A1* | 1/2012 | Lee | H04L 1/06 370/329 |
| 2013/0005382 A1* | 1/2013 | Landstrom | H04L 1/0019 455/517 |
| 2015/0085737 A1* | 3/2015 | Han | H04L 27/2602 370/312 |
| 2015/0092768 A1* | 4/2015 | Ng | H04W 48/16 370/350 |
| 2015/0098432 A1 | 4/2015 | Han et al. | |
| 2015/0215017 A1 | 7/2015 | Yum et al. | |
| 2015/0326284 A1 | 11/2015 | Gohary et al. | |
| 2016/0056941 A1 | 2/2016 | Kang et al. | |
| 2016/0088646 A1 | 3/2016 | Sun et al. | |
| 2016/0119807 A1 | 4/2016 | Sun et al. | |
| 2016/0337056 A1* | 11/2016 | Frenne | H04B 7/0413 |
| 2017/0111898 A1* | 4/2017 | Han | H04L 43/0811 |
| 2017/0311296 A1 | 10/2017 | Onggosanusi et al. | |
| 2018/0048372 A1* | 2/2018 | Sun | H04B 7/0632 |
| 2018/0138950 A1* | 5/2018 | Rahman | H04B 7/0417 |
| 2019/0103907 A1* | 4/2019 | Yang | H04L 5/0048 |
| 2020/0274604 A1* | 8/2020 | Sun | H04B 7/0665 |
| 2021/0105724 A1* | 4/2021 | Huang | H04W 72/0413 |
| 2021/0218517 A1 | 7/2021 | Kwak et al. | |

FOREIGN PATENT DOCUMENTS

| | | |
|---|---|---|
| EP | 2723012 B1 | 4/2014 |
| EP | 2981038 A1 | 2/2016 |
| EP | 2985942 A1 | 2/2016 |
| JP | 2014241597 A | 12/2014 |
| JP | 2020509677 A | 3/2020 |
| RU | 2405252 C2 | 11/2010 |
| RU | 2549196 C2 | 4/2015 |
| WO | 2014138525 A1 | 9/2014 |
| WO | 2018182381 A8 | 9/2019 |

OTHER PUBLICATIONS

3rd Generation Partnership Project, "3rd Generation Partnership Project; Technical Specification Group Radio Access Network; Evolved Universal Terrestrial Radio Access (E-UTRA); Multiplexing and channel coding (Release 14)", Technical Specification, 3GPP TS 36.212 V14.0.0, Sep. 1, 2016, pp. 1-148, 3GPP, XP55516476.
QUALCOMM Incorporated, "Views on SRS", 3GPP TSG-RAN WG1 #87, Reno, Nevada, USA, Nov. 14-18, 2016, pp. 1-4, R1-1612049.
PCT/KR2018/003855, LG Electronics Inc., "Method for Transmitting Uplink Data in Wireless Communication System and Apparatus Therefor", filed Apr. 2, 2018.
3GPP 3rd Generation Partnership Project; Technical Specification Group Radio Access Network; NR; Physical layer procedures for data (Release 15), 3GPP TS 38.214 V15.0.0 (Dec. 2017), pp. 1-71.
3GPP 3rd Generation Partnership Project; Technical Specification Group Radio Access Network; Evolved Universal Terrestrial Radio Access (E-UTRA); Physical Channels and Modulation (Release 10), 3GPP TX 36.211 V10.7.0 (Dec. 2013), pp. 1-101.
3GPP 3rd Generation Partnership Project; Technical Specification Group Radio Access Network; Evolved Universal Terrestrial Radio Access (E-UTRA); Physical layer procedures (Release 10), 3GPP TS 36.213 V10.13.0 (Jun. 2015).

* cited by examiner

VARIABLE COHERENCE ADAPTIVE ANTENNA ARRAY

This application claims the benefit of U.S. Provisional Application No. 62/588,264, filed 17 Nov. 2017, the entire disclosure of which is incorporated by reference herein in its entirety.

TECHNICAL FIELD

The present disclosure relates generally to multi-antenna transmission and reception techniques and, more particularly to codebooks and precoding for spatial multiplexing.

BACKGROUND

The next generation of mobile wireless communication systems, known as Fifth Generation (5G) and Next Radio (NR), will support a diverse set of use cases and a diverse set of deployment scenarios. The latter includes deployment at both low frequencies (100 s of MHz), similar to Long Term Evolution (LTE) today, and very high frequencies (millimeter waves in the tens of GHz).

5G and NR will support multi-antenna techniques that significantly increase the data rates and reliability of a wireless communication system. The performance is in particular improved if both the transmitter and the receiver are equipped with multiple antennas, which results in a multiple-input multiple-output (MIMO) communication channel. Such systems and related techniques are commonly referred to simply as MIMO. The 5G and NR standards are currently evolving with enhanced MIMO support. A core component of this support in LTE is the support of MIMO antenna deployments and MIMO related techniques.

MIMO codebooks for 4-port uplink (UL) transmission supporting variable coherence for NR do not yet exist, and so UEs supporting 4 layer transmission, but only partial or non-coherent operation would not be supported. Also, Rel-10 signaling of a feature group indication for relative transmit phase continuity is insufficient to identify UE capability for UL MIMO operation with fully coherent, partially coherent, and non-coherent operation.

SUMMARY

An uplink MIMO codebook for 4 antenna ports is constructed using precoding matrices that support fully coherent, partially coherent, and non-coherent operation. The codebook is constructed such that a fixed set of antenna ports is used for partially coherent transmission across ail layers using Transmit Precoder Matrix Indicator (TPMIs) derived from the LTE Rel-10 uplink codebook. Fully coherent TPMIs are derived from either the Rel-10 uplink codebook or the Rel-8 downlink codebook. Precoding matrices supporting non-coherent operation are designed, including where TPMI overhead is optimized for ranks 3 and 4.

UEs with analog beamforming and multiple transmit (TX) chains can transmit on all TX chains. UEs that support coherent combining of different analog beams can transmit a MIMO layer on different analog beams. UEs that do not support coherent combining oaf analog beams can transmit different MIMO layers on different analog beams.

UEs capable of greater coherency operation can support TPMIs that are associated with lesser coherency. UE capability identifying which antenna ports support partially coherent operation is provided. TPMI field size may be adjusted according to the coherence of the TPMIs conveyed by the TPMI and/or a subset of ranks to be used in transmission.

One aspect of the disclosure comprises methods of transmitting data from a UE to a base station in a wireless communication network. The UE comprises multiple antenna ports. The UE receives an indication from the base station for a non-coherent data transmission. The precoding matrix is selected from a respective first, second, third, or fourth set of precoding matrices according to a number of spatial layers. The first, second, third, and fourth sets of precoding matrices are available for ail coherence capabilities and are comprised within a larger set of precoding matrices, the larger set comprising precoding matrices that are not available for all coherence capabilities. The first, second, third, and fourth sets of precoding matrices correspond to one, two, three, or four spatial layers, respectively. The number of columns in the selected precoding matrix is equal to the number of spatial layers and each column comprises a single non-zero element and one or more zero elements. The UE further transmits data to the base station using the indicated precoding matrix.

Another aspect of the disclosure comprises methods implemented by a base station of receiving data from a UE having multiple antenna ports. For a non-coherent data transmission, the base station selects a precoding matrix selected from a respective first, second, third, or fourth set of preceding matrices according to a number of spatial layers. The first, second, third, and fourth sets of precoding matrices are available for all coherence capabilities and are comprised within a larger set of preceding matrices. The larger set of preceding matrices comprises preceding matrices that are not available for ail coherence capabilities. The first, second, third, and fourth sets of precoding matrices correspond to one, two, three, or four spatial layers, respectively. The number of columns in the selected precoding matrix is equal to the number of spatial layers and each column comprises a single non-zero element and one or more zero elements. The base station transmits an indication of the selected preceding matrix to the user equipment and receives data transmitted by the UE using the preceding matrix.

Another aspect of the disclosure comprises methods implemented by a base station of receiving data from a UE having multiple antenna ports. For a non-coherent data transmission, the base station transmits a selected precoding matrix for a data transmission, the precoding matrix being selected from a respective first, second, third, or fourth set of precoding matrices according to a number of spatial layers. The first, second, third, and fourth sets of precoding matrices are available for all coherence capabilities and are comprised within a larger set of precoding matrices. The larger set of precoding matrices comprises preceding matrices that are not available for all coherence capabilities. The first, second, third, and fourth sets of precoding matrices correspond to one, two, three, or four spatial layers, respectively. The number of columns in the selected precoding matrix is equal to the number of spatial layers and each column comprises a single non-zero element and one or more zero elements. The base station receives data transmitted by the UE using the selected precoding matrix.

Still another aspect of the disclosure comprises a UE configured for operation in a wireless communication network. The UE comprises an interface circuit for communicating with a base station in the wireless communication network and a processing circuit. The processing circuit is configured to receive an indication of a precoding matrix for a non-coherent data transmission. The precoding matrix selected from a respective first, second, third, or fourth set of precoding matrices according to a number of spatial layers. The first, second, third, and fourth sets of precoding matrices are available for all coherence capabilities and are comprised within a larger set of precoding matrices. The larger set comprising precoding matrices that are not available for all coherence capabilities. The first, second, third, and fourth sets of precoding matrices correspond to one, two, three, or four spatial layers, respectively. The number of columns in the selected precoding matrix is equal to the number of spatial layers and each column comprises a single non-zero element and one or more zero elements. The non-zero magnitude elements represent weights to be applied to respective antenna ports and the zero magnitude elements represent non-transmitting antenna ports. The processing circuit is further configured to transmit data to the base station using the indicated precoding matrix.

Another aspect of the disclosure comprises a base station in a wireless communication network. The base station comprises an interface circuit for communicating with one or more UEs and a processing circuit. The processing circuit is configured to select, for a first data transmission, a precoding matrix from a respective first, second, third, or fourth set of precoding matrices according to a number of spatial layers. The first, second, third, and fourth sets of precoding matrices are available for all coherence capabilities and are comprised within a larger set of precoding matrices. The larger set of precoding matrices comprises precoding matrices that are not available for all coherence capabilities. The first, second, third, and fourth sets of precoding matrices correspond to one, two, three, or four spatial layers, respectively. The number of columns in the selected precoding matrix is equal to the number of spatial layers and each column comprises a single non-zero element and one or more zero elements. The processing circuit is further configured to transmit an indication of the selected precoding matrix to the user equipment and to receive the first data transmission for the UE, the data being transmitted by the UE using the precoding matrix selected for the first data transmission.

Another aspect of the disclosure comprises a base station in a wireless communication network. The base station comprises an interface circuit for communicating with one or more UEs and a processing circuit. The processing circuit is configured to transmit, to the UE, a first indication of a precoding matrix for a first data transmission, the precoding being selected from a respective first second, third, or fourth set of precoding matrices according to a number of spatial layers. The first, second, third, and fourth sets of precoding matrices are available for all coherence capabilities and are comprised within a larger set of precoding matrices. The larger set of precoding matrices comprises precoding matrices that are not available for all coherence capabilities. The first, second, third, and fourth sets of precoding matrices correspond to one, two, three, or four spatial layers, respectively. The number of columns in the selected precoding matrix is equal to the number of spatial layers and each column comprises a single non-zero element and one or more zero elements. The processing circuit is further configured to receive data transmitted by the UE using the selected precoding matrix.

Still another aspect of the disclosure comprises a method implemented by a communication system including a host computer, a base station and a UE. The host computer receives user data transmitted to the base station from the UE, wherein the UE transmits data to the base station non-coherently using a precoding matrix selected from a respective first, second, third, or fourth set of precoding matrices according to a number of spatial layers. The first, second, third, and fourth sets of precoding matrices are available for all coherence capabilities and are comprised within a larger set of precoding matrices. The larger set of precoding matrices comprises precoding matrices that are not available for all coherence capabilities. The first, second, third, and fourth sets of precoding matrices correspond to one, two, three, or four spatial layers, respectively. The number of columns in the selected preceding matrix is equal to the number of spatial layers and each column comprises a single non-zero element and one or more zero elements.

Still another aspect of the disclosure comprises a communication system including a host computer. The communication system comprises a communication interface configured to receive user data originating from a transmission from a user equipment to a base station in a wireless communication network. The user equipment comprises a radio interface and processing circuitry configured to transmit data non-coherently using a precoding matrix selected from a respective first, second, third, or fourth set of precoding matrices according to a number of spatial layers The first, second, third, and fourth sets of preceding matrices are available for all coherence capabilities and are comprised within a larger set of precoding matrices. The larger set of precoding matrices comprises precoding matrices that are not available for all coherence capabilities. The first, second, third, and fourth sets of preceding matrices correspond to one, two, three, or four spatial layers, respectively. The number of columns in the selected precoding matrix is equal to the number of spatial layers and each column comprises a single non-zero element and one or more zero elements.

DETAILED DESCRIPTION

Embodiments of the disclosure are described in the context of a wireless communication network based on, the 5G or NR standard under development by the Third Generation Partnership Project (3GPP). Those skilled in the art will appreciate however that the methods, techniques and apparatus herein described can be adapted for wireless communication networks based on other standards supporting multi-carrier operation.

Figure 1:
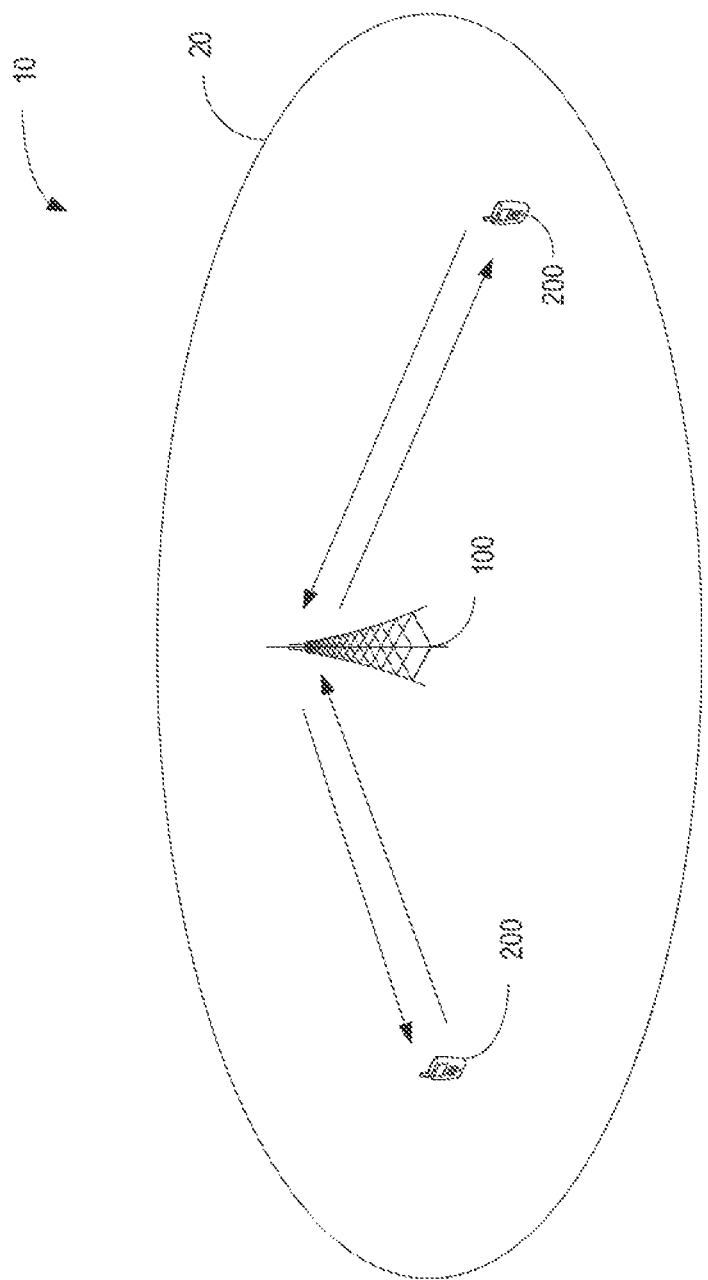
FIG. 1 illustrates a wireless communication network according to an embodiment.

FIG. 1 illustrates communications between a base station 100 and a UE 200 in a wireless communication network 10. The base station 100, sometimes referred to in applicable standards as an Evolved Node B (eNB) or 5G Node B (gNB), provides radio coverage to the user equipment 200 in a cell 20 of the wireless communication network 10. The user equipment 200 may comprise, for example, a cellular telephone, smart phone, laptop computer, notebook computer, tablet, machine-to-machine (M2M) communication device (also referred to as machine-type communication (MTC) device), or other device with wireless communication capabilities. The base station 100 transmits data to the UE 200 in the DL on the Narrowband Physical Downlink Shared Channel (NPDSCH), the Narrowband Physical Downlink Control Channel (NPDCCH), and the Narrowband Physical Broadcast Channel (NPBCH). The UE 200 transmits data to the base station 100 in the UL on the Narrowband Physical Uplink Shared Channel (NPUSCH). The base station 100 and UE 200 are configured to operate according to the 5G or NR standard.

Similar to LTE, NR will use Orthogonal Frequency Division Multiplexing (OFDM) in the downlink from a network node or base station (also known as an Evolved NodeB (eNB) or 5G NodeB (gNB)) to a user equipment (UE). In the uplink (i.e., from the UE to gNB), both OFDM and Discrete Fourier Transform (DFT)-spread OFDM will be supported.

Figure 2:
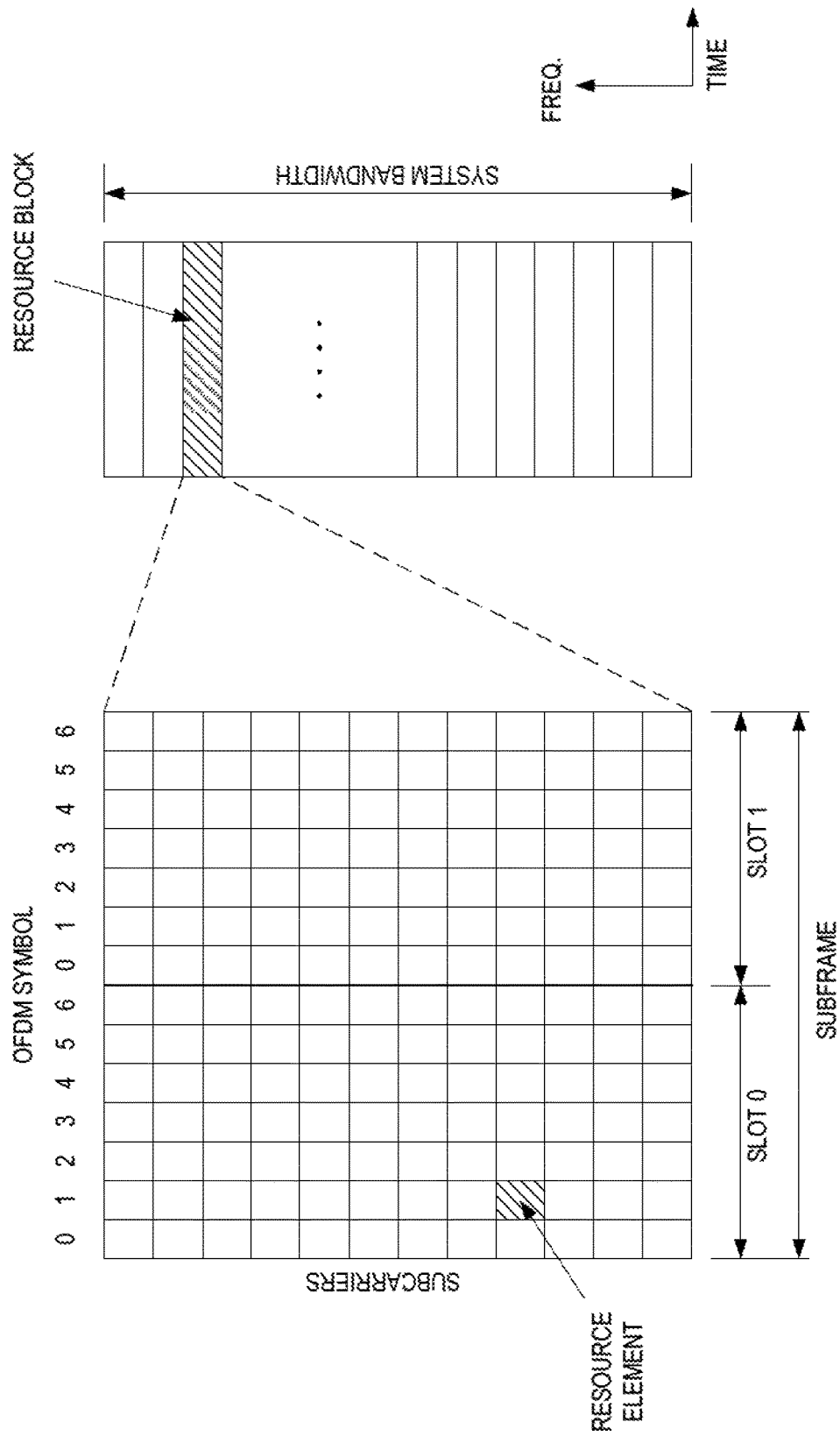
FIG. 2 illustrates a time frequency grid representing radio resources in an OFDM system.

The basic NR physical resource for 5G and NR networks can be viewed as a time-frequency grid similar to the one in LTE as illustrated in FIG. 2, where each resource element corresponds to one OFDM subcarrier during one OFDM symbol interval. Although a subcarrier spacing of $\Delta f=15$ kHz is shown in FIG. 2, different subcarrier spacing values are supported in NR. The supported subcarrier spacing values (also referred to as different numerologies) in NR are given by $\Delta f=2^{\mu} \times 15$ kHz, where p is a non-negative integer.

Furthermore, the resource allocation in LTE is typically described in terms of resource blocks (RBs), where a resource block corresponds to one slot (0.5 ms) in the time domain and 12 contiguous subcarriers in the frequency domain. RBs are numbered in the frequency domain, starting with 0 from one end of the system bandwidth. For NR, a RB is also 12 subcarriers in frequency but for further study in time domain. A RB is also referred to as physical RB (PRB) in the rest of sections.

Figure 3:
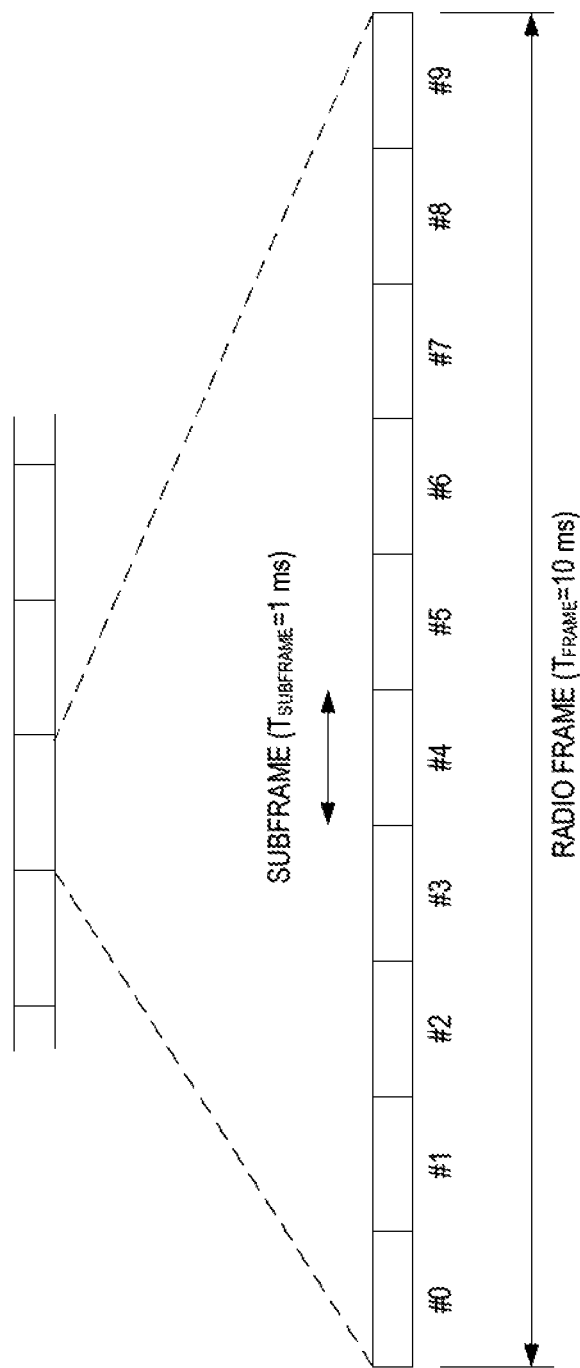
FIG. 3 illustrates an exemplary radio frame.

In the time domain, downlink and uplink transmissions in NR will be organized into equally-sized subframes similar to LTE as shown in FIG. 3, which assumes a sub-carrier spacing of 15 kHz. In NR, subframe length for a reference numerology of $2^{\mu} \times 15$ kHz is exactly $½^{\mu}$ ms.

Downlink transmissions are dynamically scheduled, i.e., in each subframe the gNB transmits downlink control information (DCI) about which UE 200 data is to be transmitted to and which resource blocks in the current downlink subframe the data is transmitted on. This control signaling is typically transmitted in the first one or two OFDM symbols in each subframe in NR. The control information is carried on Physical Control Channel (PDCCH) and data is carried on Physical Downlink Shared Channel (PDSCH). A UE 200 first detects and decodes PDCCH and if a PDCCH is decoded successfully, it decodes the corresponding PDSCH based on the decoded control information in the PDCCH. Each UE 200 is assigned with a unique C-RNTI (Cell Radio Network temporary Identifier) in the same serving cell. The CRC (cyclic redundancy check) bits of a PDCCH for a UE 200 is scrambled by the UE's 200 C-RNTI, so a UE 200 recognizes its PDCCH by checking the C-RNTI used to scramble the CRC bits of the PDCCH.

Uplink data transmissions are also dynamically scheduled using PDCCH. Similar to downlink, a UE 200 first decodes uplink grants in PDCCH and then transmits data over the Physical Uplink Shared Channel (PUSCH) based on the decoded control information in the uplink grant such as modulation order, coding rate, uplink resource allocation, etc.

In LTE, semi-persistent scheduling (SPS) is also supported in both uplink and downlink, in which a sequence of periodic data transmissions is activated or deactivated by a single PDCCH. There is no PDCCH transmitted for data transmissions after activation. In SPS, the PDCCH's CRC is scrambled by a SPS-C-RNTI, which is configured for a UE 200 if the UE 200 supports SPS.

In addition to PUSCH, Physical Uplink Control Channel (PUCCH) is also supported in NR to carry uplink control information (UCI) such as HARQ (Hybrid Automatic Repeat. Request) related Acknowledgement (ACK), Negative Acknowledgement (NACK), or Channel State Information (CSI) feedback.

Codebook-Based Precoding

Multi-antenna techniques can significantly increase the data rates and reliability of a wireless communication system. The performance is particularly improved if both the transmitter and the receiver are equipped with multiple antennas, which results in a MIMO communication channel, Such systems and/or related techniques are commonly referred to as MIMO.

The NR standard is currently being specified. A core component in NR is the support of MIMO antenna deployments and MIMO related techniques. It is expected that NR will support uplink MIMO with at least 4 layer spatial multiplexing using at least 4 antenna ports with channel dependent precoding. The spatial multiplexing mode is aimed for high data rates in favorable channel conditions. An illustration of the spatial multiplexing operation is provided in FIG. 4 for where Cyclic Prefix OFDM (CP-OFDM) is used on the uplink.

As seen, the information carrying symbol vector s is multiplied by a $N_T \times r$ precoder matrix W, which serves to distribute the transmit energy in a subspace of the $N_2$ (corresponding to $N_T$ antenna ports) dimensional vector space. The precoder matrix is typically selected from a codebook of possible precoder matrices, and is typically indicated by means of a transmit precoder matrix indicator (TPMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

Because CP-OFDM is supported for uplink MIMO in NR as opposed to only DFT-S-OFDM for PUSCH in LTE, NR MIMO codebook designs need not emphasize increase in UE 200 power amplifier peak to average power ratios (PAPR) as a design factor as much as was needed for LTE Rel-10 uplink MIMO. Therefore codebooks with limited PAPR increase and those that have relatively high increase in PAPR can be suitable for NR uplink MIMO. Consequently, suitable codebooks for NR uplink MIMO may include the uplink MIMO codebooks defined in clause 5.3.3A of 3GPP technical specification 36.211, as well as the downlink MIMO codebooks in clauses 6.3.4.2.3 of 3GPP technical specification 36.211 and 7.2.4 of 3GPP technical specification 36.213.

The received $N_R \times 1$ vector $y_n$ for a certain TFRE on subcarrier n (or alternatively data TFRE number n) is thus modeled by:

$$y_n = H_n W s_n + e_n \qquad \text{Eq. (1)}$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE 200. In addition, the precoder matrix may also be selected to strive for orthogonalizing the channel, meaning that after proper linear equalization at the UE 200, the inter-layer interference is reduced.

One example method for a UE 200 to select a precoder matrix W can be to select the $W_k$ that maximizes the Frobenius norm of the hypothesized equivalent channel:

$$\max_k \left\| \hat{H}_n W_k \right\|_F^2 \qquad \text{Eq. (2)}$$

where, $\hat{H}_n$ is a channel estimate, possibly derived from Sounding Reference Signals (SRS).

$W_k$ is a hypothesized precoder matrix with index k.

$\hat{H}_n W_k$ is the hypothesized equivalent channel.

In closed-loop precoding for the NR uplink, the TRP transmits, based on channel measurements in the reverse link (uplink), TPMI to the UE 200 that the UE 200 should use on its uplink antennas. The gNB configures the UE 200 to transmit SRS according to the number of UE 200 antennas it would like the UE 200 to use for uplink transmission to enable the channel measurements. A single precoder that is supposed to cover a large bandwidth (wideband precoding) may be signaled. It may also be beneficial to match the frequency variations of the channel and instead feedback a frequency-selective precoding report, e.g., several precoders and/or several TPMIs, one per sub-band.

Other information than TPMI is generally used to determine the UL MIMO transmission state, such as SRS resource indicators (SRIs) as well as transmission rank indicator (TRIs). These parameters, as well as the modulation and coding state (MCS), and the uplink resources where PUSCH is to be transmitted, are also determined by channel measurements derived from SRS transmissions from the UE 200. The transmission rank, and thus the number of spatially multiplexed layers, is reflected in the number of columns of the precoder. For efficient performance, it is important that a transmission rank that matches the channel properties is selected.

Control Signaling

LTE control signaling can be carried in a variety of ways, including carrying control information on PDCCH or PUCCH, embedded in the PUSCH, in MAC control elements ('MAC CEs'), or in RRC signaling. Each of these mechanisms is customized to carry a particular kind of control information.

Control information carried on PDCCH, PUCCH, or embedded in ('piggy backed on') PUSCH is physical layer related control information, such as downlink control information (DCI), uplink control information (UCI), as described in 3GPP TS 36.211, 36.212, and 36.213. DCI is generally used to instruct the UE 200 to perform some physical layer function, providing the needed information to perform the function. UCI generally provides the network with needed information, such as Hybrid Automatic Repeat Request (HARQ) Acknowledgement (ACK), scheduling request (SR), channel state information (CSI), including COI, PMI, RI, and/or CRI. UCI and formation (DCI) can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tend to be on the order of tens of bits, in order to limit the amount of control overhead.

Control information carried in MAC CEs is carried in MAC headers on the uplink and downlink shared transport channels (UL-SCH and DL-SCH), as described in 3GPP TS 36.321. Since a MAC header does not have a fixed size, control information in MAC CEs can be sent when it is needed, and does not necessarily represent a fixed overhead. Furthermore, MAC CEs can carry larger control payloads efficiently, since they are carried in UL-SCH or DL-SCH transport channels, which benefit from link adaptation, HARQ, and can be turbo coded. MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and CRI are not carried in MAC CEs in LTE up to Rel-14.

Multi-Panel UE 200 Antenna Arrays

Figure 4:
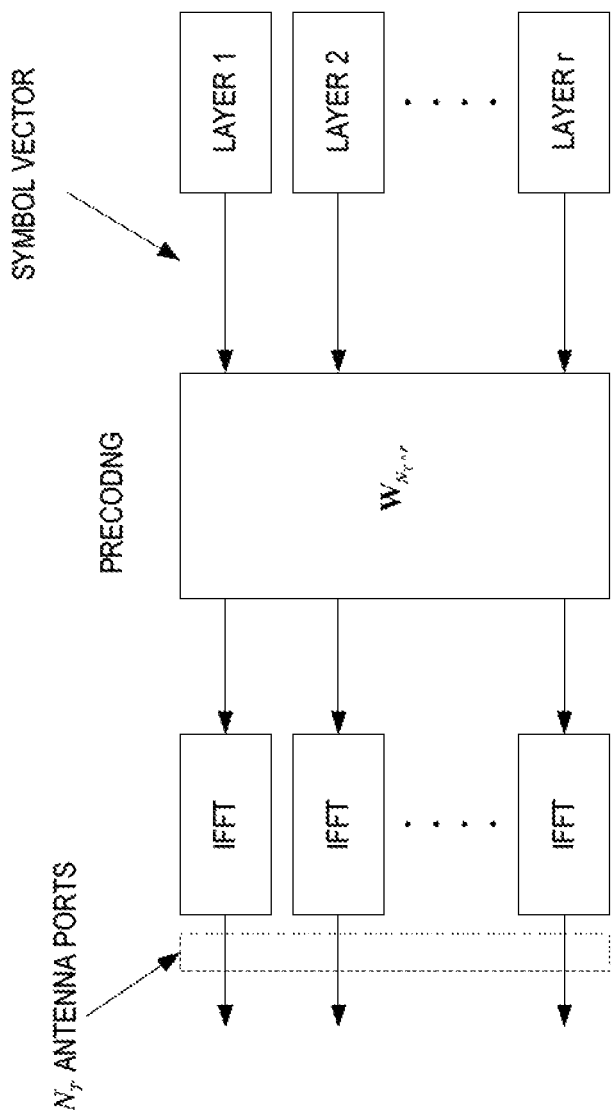
FIG. 4 is a block diagram illustrates spatial multiplexing.

When building UE 200 antenna arrays, it can be challenging to have antennas with the same angular coverage such that they are generally seen by a receiving TRP at the same power level. This can be particularly challenging at the millimeter wave frequencies supported by NR. Furthermore, it may be difficult to place all the UE 200's antennas and TX chains close together in the limited spaces available in small mobile devices. One building practice is to use a modular approach wherein the UE 200 TX chains are split into 'panels' with one or more transmit chains per panel, as shown in FIG. 4. Such multi-panel UEs are generally modeled as having panels with element patterns that point in different directions, while antenna elements within a panel have element patterns that point in the same directions as discussed in 3GPP technical report 36.802. Because the transmit chains in different panels can be separated in UEs, it may be more difficult to maintain calibration and phase coherence between antenna elements in different panels than to maintain calibration and phase coherence between antenna elements in a panel. There may thus exist a frequency offset, timing misalignment, and/or a phase offset between the panels. Aspects of phase coherence among TX chains of different panels is further discussed below.

Figure 5:
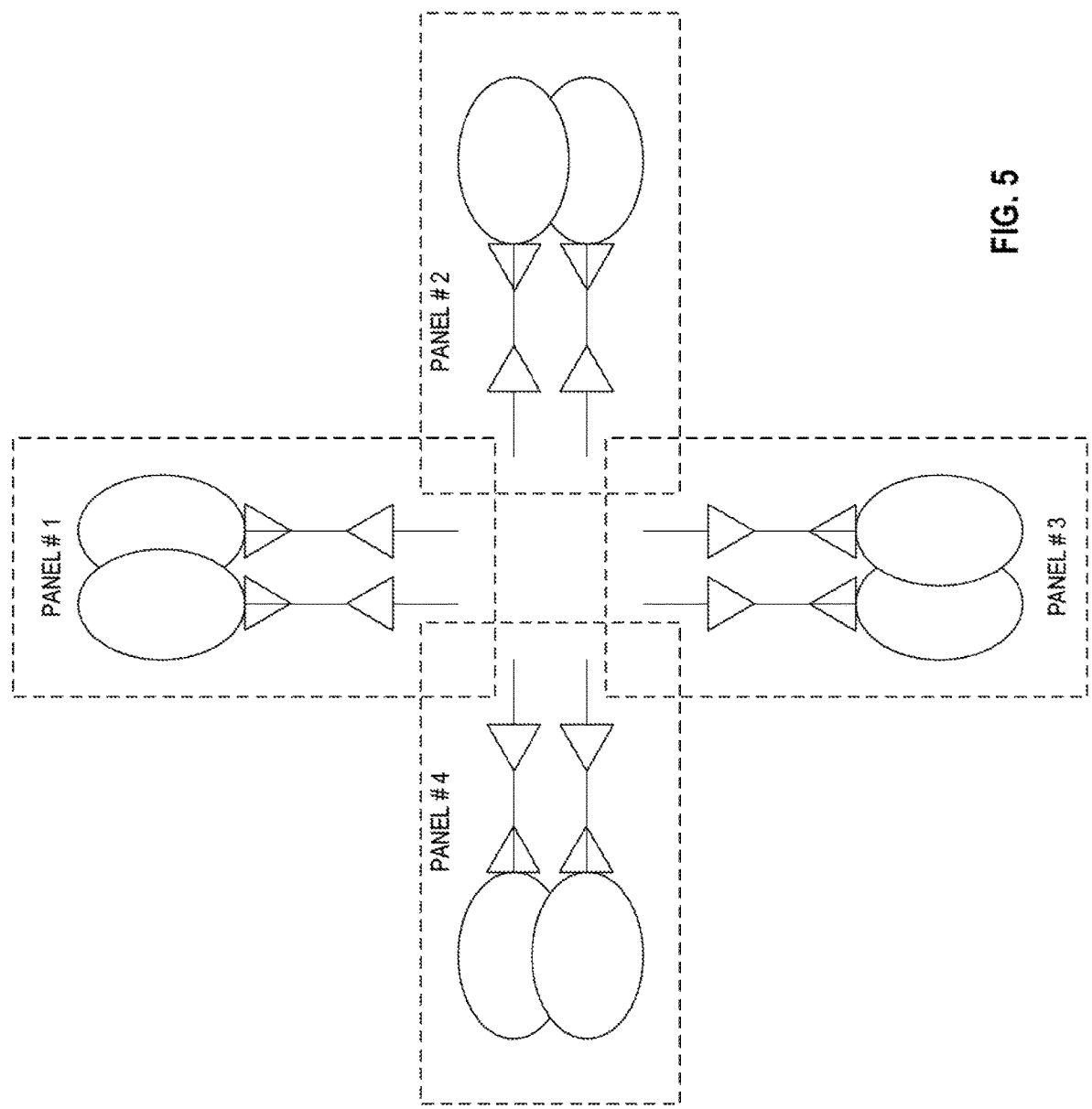
FIG. 5 illustrates an exemplary antenna array with four panels and two antenna elements on each panel.

FIG. 5 shows an example of a 4 panel UE 200 array with 8 total antenna elements. Each panel comprises 2 elements with similar antenna patterns that are driven by independent TX chains. The antenna element patterns have roughly 90 degree beamwidth, such that all directions are covered by the 4 panels together.

SRS Transmission in NR

Sounding reference signals (SRSs) are used for a variety of purposes in LTE, and are expected to serve similar purposes in NR. One primary use for SRS is for uplink channel state estimation, allowing channel quality estimation to enable uplink link adaptation (including determination of which MCS state the UE 200 should transmit with) and/or frequency-selective scheduling. In the context of uplink MIMO, they can also be used to determine precoders and a number of layers that will provide good uplink throughput and/or SINR when the UE 200 uses them for transmission on its uplink antenna array. Additional uses include power control and uplink timing advance adjustment.

Unlike LTE Rel-14, at least some NR UEs may be capable of transmitting multiple SRS resources. This is similar conceptually to multiple CSI-RS resources on the downlink: an SRS resource comprises one or more SRS ports, and the UE 200 may apply a beamformer and/or a precoder to the SRS ports within the SRS resource such that they are transmitted with the same effective antenna pattern. A primary motivation for defining multiple SRS resources in the UE 200 is to support analog beamforming in the UE 200 where a UE 200 can transmit with a variety of beam patterns, but only one at a time. Such analog beamforming may have relatively high directivity, especially at the higher frequencies that can be supported by NR. Earlier LTE uplink MIMO and transmit diversity designs did not focus on cases where high directivity beamforming could be used on different SRS ports, and so a single SRS resource was sufficient. When an NR UE 200 transmits on different beams, the power received by the TRP can be substantially different. One approach could be to have a single SRS resource, but to indicate to the UE 200 which of its beams to use for transmission. However, since UE 200 antenna designs vary widely among UEs and UE 200 antenna patterns can be highly irregular, it is infeasible to have a predetermined set of UE 200 antenna patterns with which the TRP could control UE 200 uplink precoding or beamforming. Therefore, an NR UE 200 may transmit on multiple SRS resources using a distinct effective antenna pattern on each SRS resource, allowing the TRP to determine the composite channel characteristics and quality for the different effective antenna patterns used by the UE 200. Given this association of each effective antenna pattern with a corresponding SRS resource, the TRP can then indicate to the UE 200 which of one or more effective antenna patterns should be used for transmission on PUSCH (or other physical channels or signals) through one or more SRS resource indicator, or 'SRIs'.

UE Coherence Capability in NR

Depending ern UE implementation, it may be possible to maintain the relative phase of the transmit chains. In this case, the UE 200 can form an adaptive array by selecting a beam on each transmit chain, and by transmitting the same modulation symbol on the selected beams of both transmit chains using different gain and/or phase between the transmit chains. This transmission of a common modulation symbol or signal on multiple antenna elements with controlled phase can be labeled 'coherent' transmission'. The support for coherent uplink MIMO transmission in LTE Rel-10 is indicated via a feature group indication for relative transmit phase continuity for uplink spatial multiplexing, wherein a UE 200 indicates if it can adequately maintain the relative phase of transmit chains over time in order to support coherent transmission.

In other UE 200 implementations, the relative phase of the transmit chains may not be well controlled, and coherent transmission may not be used. In such implementations, it may still be possible to transmit on one of the transmit chains at a time, or to transmit different modulation symbols on the transmit chains. In the latter case, the modulation symbols on each transmit chain may form a spatially multiplexed, or 'MIMO', layer. This class of transmission may be referred to as 'non-coherent' transmission. Such non-coherent transmission schemes may be used by LTE Rel-10 UEs with multiple transmit chains, but that do not support relative transmit phase continuity.

In still other UE 200 implementations, the relative phase of a subset of the transmit chains is well controlled, but not over all transmit chains. One possible example is described above with respect to multi-panel operation, where phase is well controlled among transmit chains within a panel, but phase between panels is not well controlled. This class of transmission may be referred to as 'partially-coherent'.

All three of these variants of relative phase control have been agreed for support in NR, and so UE 200 capabilities have been defined for full coherence, partial coherence, and non-coherent transmission.

Precoder Structure and Capability for Variable Coherence Capability Codebooks

It is possible to support all 3 NR coherence capabilities in one MIMO codebook. A precoding matrix or vector, or precede, without any zero magnitude elements requires a fully coherent transmission chain to maintain the relative phase set by the non-zero magnitude elements, and so such a precoder can only be used by a UE 200 with a 'fully coherent' capability, and is not supported by UEs with partial coherence or non-coherent capabilities.

A precoding matrix or vector, or 'precoder', with only one non-zero magnitude element for every spatial layer (for example where a precoding matrix with multiple columns has only one non-zero magnitude in every column) does not require phase coherence, since no antenna ports within a spatial layer are combined together. Therefore, such a precoder can be used by a UE 200 that only supports non-coherent transmission.

A precoding matrix or vector, or 'precoder', with multiple non-zero magnitude elements and at least one zero magnitude element for a given spatial layer (for example where a precoding matrix with multiple columns has only one zero magnitude per column) requires phase coherence only among the antenna ports corresponding to the non-zero ports when transmitting that spatial layer. Such UEs therefore support partial coherence, but not full coherence capability for at least the given spatial layer. When transmitting multiple spatial layers, if two ports require coherence on one layer, they will require it for all layers, since if a TX chain must maintain well controlled phase with another TX chain for one layer, it must do so for all layers. Then, in an embodiment, a partially coherent precoder is one where if an antenna port is combined with another antenna port on one layer, then it can be combined with the other port on any layer, and each antenna port is only combined with a subset of the other antenna ports across all layers.

Which ports are coherently combined across all layers can be determined with an iterative process, starting with what is combined for each layer, and continuing until all coherent combinations across all layers are identified. For example, consider a 6 port rank 4 precoder where port pairs (1,2), (3,4), (5,6), and (1,6) are combined on a first, second, third, and fourth layer, respectively, as would occur using the preceding matrix below, where each column corresponds to a layer and each row to an antenna port.

$$\begin{bmatrix} 1 & 0 & 0 & 1 \\ j & 0 & 0 & 0 \\ 0 & 1 & 0 & 0 \\ 0 & 1 & 0 & 0 \\ 0 & 0 & 1 & 0 \\ 0 & 0 & -1 & 1 \end{bmatrix} \quad \text{Eq. (3)}$$

Figure 6:
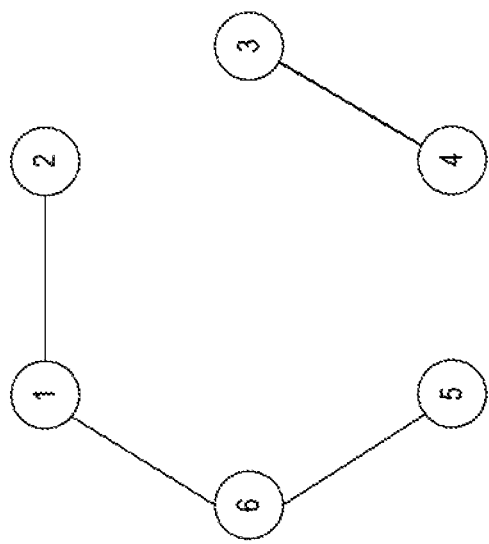
FIG. 6 is a graph illustrating two sets of coherent antenna ports.

By constructing a combinatorial graph using these dependencies, as illustrated in FIG. 6, it can be determined that there are two sets of ports, {3,4} and {1,2,5,6} for this precoder which means that the ports within each of these sets should be coherently transmitted together. Hence, we conclude that ports (1,2,5,6) should be coherently transmitted together and ports (3,4) should be coherently transmitted together.

Since a fully coherent UE 200 is capable of partial coherence and non-coherent transmission, precoders with all, a part, or only one non-zero magnitude element per spatial layer can all be in a codebook used for fully coherent transmission.

While all 3 coherence capabilities can be in one codebook, UEs with either partial or non-coherent capability can't support the entire codebook. However, partial coherence capable UEs can use precoders from the codebook that match the antenna ports on which it can transmit coherently, as well as those that do not require coherence. Similarly, a UE 200 supporting only non-coherent capability can use precoders from the codebook that do not require coherent transmission. Therefore, in an embodiment, a UE 200 indicating full coherence is assumed to support TPMIs identifying precoders where all elements have non-zero magnitude, precoders where at least one element has zero magnitude, and precoders where only one element per spatial layer has non-zero magnitude. A UE 200 indicating partial coherence is assumed to support TPMIs identifying precoders where at least one element has zero magnitude, and precoders where only one element per spatial layer has non-zero magnitude. A UE 200 indicating non-coherent capability is assumed to support TPMs identifying precoders where only one element per spatial layer has non-zero magnitude.

A partially coherent UE 200 can only maintain well controlled relative phase between particular transmit chains and antenna ports. Therefore, not only the number of non-zero magnitude elements a precoder has must match the partial coherence capability, but the elements which have non-zero magnitude on a spatial layer must correspond to antenna ports for which phase is well maintained. Non-zero elements in the precoding matrices represent weights to be applied to respective antenna ports while zero magnitude elements represent non-transmitting antenna ports. In one embodiment, in order to identify its partial coherence capability, a UE 200 can indicate which pairs of antenna ports can support coherent operation. Such an indication may be a list of integer pairs, each integer identifying an antenna port number, where the pair supports coherent transmission. Alternatively, multiple bitmaps could be indicated, where each bitmap contains at most two non-zero bits, corresponding to antenna ports for which coherent transmission is supported.

In some implementations, the ability of a UE to maintain well controlled relative phase across TX chains may also be a function of the carrier frequency. Therefore, in an embodiment, a UE 200 may indicate a first and a second value of coherence capability, respectively corresponding to a first and a second frequency band used for transmission by the UE 200.

UEs 200 are generally free to select which transmit antenna chains correspond to its antenna ports. If a single set of antenna ports is assumed to be allowed for partially coherent transmission, then a UE 200 supporting partial coherence can align its transmit chains to match the antenna port coherence assumption used by codebook, and no additional information on which of the UE's antenna ports support coherent transmission is needed by the network. However, the antenna ports for which coherent transmission is supported must be aligned across different transmission ranks. This means that only the elements of precoders that correspond to those antenna ports for which coherent transmission is supported can have non-zero magnitude on any spatial layer.

4-Port Variable Coherence Capability Codebooks Using LIE Rel-10 Uplink Precoders This constraint of non-zero weights across different transmission ranks can be illustrated with a design for a codebook supporting full coherence, partial coherence, and non-coherent codewords. Such a codebook can be constructed from the LTE Rel-10 uplink MIMO codebook from 3GPP TS 36.211, section 5.5.3A. Table 1 (which is Table 5.3.3A2-2 in 3GPP TS 36.211) provides the codebook for rank 1 (i.e., $v=1$ spatial layer) transmission. Note that while the codebook is illustrated using antenna ports 40, 41, 42, and 43, any antenna port numbering can be used that identifies 4 distinct antenna ports. Here, codebook indices 0-15 all have non-zero magnitude on all entries, and so require fully coherent transmission. However, codebook indices 16-23 have two non-zero magnitude entries each and so can be supported with partially coherent transmission. Since the first element in the vector corresponds to antenna port 40, the second to port 41, etc., and since the first and third elements of codebook indices 16-19 are non-zero magnitude, these indices require coherent transmission on antenna ports 40 and 42. Similarly, codebook indices 19-23 require coherent transmission on antenna ports 41 and 43.

TABLE 1

Codebook for transmission on antenna ports {40, 41, 42, 43} with $v = 1$

| Codebook index | Number of layers $v = 1$ |
|---|---|
| 0-7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |
| 8-15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |

Table 2 (which is a Table 5.3.3A.2-3 in 3GPP TS 36.211 for LTE Release 10) provides the codebook for rank 2 (i.e. $u=2$ spatial layers) transmission. Each matrix in the table has two columns, each of which correspond to one spatial layer. Examining codebook indices 0-7, since the first two elements of the first column and the last two elements of the second column are non-zero, antenna ports 40 and 41 should be transmitted with a controlled relative phase, and antenna ports 42 and 43 should also be transmitted with a controlled relative phase. However, because their corresponding non-zero magnitude elements are on different spatial layers, it is not necessary to control the relative phase between antenna ports 40 and 42 nor between antenna ports 41 and 43.

Observing that antenna port pair 40 and 42 must be transmitted coherently in rank 1, while port pair 40 and 41 must be transmitted coherently for the first layer of rank 2, it can be seen that if codewords 16-23 were used for partially coherent transmission, then a UE 200 would have to support coherent transmission across ports 40, 41, and 42. A similar observation can be made for these codewords considering the second layer of rank 2: port pairs 41 and 43 should support coherent transmission for rank 1, while port pairs 42 and 43 should support coherent transmission for rank 2, and so ports 41, 42, and 43 should support coherent transmission.

TABLE 2

Codebook for transmsson on antenna ports {40, 41, 42, 43} with $v = 2$

| Codebook index | Number of layers $v = 2$ |
|---|---|
| 0-3 | $\frac{1}{2}\begin{bmatrix}1&0\\1&0\\0&1\\0&-j\end{bmatrix}$ $\frac{1}{2}\begin{bmatrix}1&0\\1&0\\0&1\\0&j\end{bmatrix}$ $\frac{1}{2}\begin{bmatrix}1&0\\-j&0\\0&1\\0&1\end{bmatrix}$ $\frac{1}{2}\begin{bmatrix}1&0\\-j&0\\0&1\\0&-1\end{bmatrix}$ |
| 4-7 | $\frac{1}{2}\begin{bmatrix}1&0\\-1&0\\0&1\\0&-j\end{bmatrix}$ $\frac{1}{2}\begin{bmatrix}1&0\\-1&0\\0&1\\0&j\end{bmatrix}$ $\frac{1}{2}\begin{bmatrix}1&0\\j&0\\0&1\\0&1\end{bmatrix}$ $\frac{1}{2}\begin{bmatrix}1&0\\j&0\\0&1\\0&-1\end{bmatrix}$ |

TABLE 2-continued

Codebook for transmsson on antenna ports {40, 41, 42, 43} with $v = 2$

| Codebook index | Number of layers $v = 2$ |
|---|---|
| 8-11 | $\frac{1}{2}\begin{bmatrix}1&0\\0&1\\1&0\\0&1\end{bmatrix}$ $\frac{1}{2}\begin{bmatrix}1&0\\0&1\\1&0\\0&-1\end{bmatrix}$ $\frac{1}{2}\begin{bmatrix}1&0\\0&1\\-1&0\\0&1\end{bmatrix}$ $\frac{1}{2}\begin{bmatrix}1&0\\0&1\\-1&0\\0&-1\end{bmatrix}$ |
| 12-15 | $\frac{1}{2}\begin{bmatrix}1&0\\0&1\\1&0\\0&1\end{bmatrix}$ $\frac{1}{2}\begin{bmatrix}1&0\\0&1\\0&-1\\1&0\end{bmatrix}$ $\frac{1}{2}\begin{bmatrix}1&0\\0&1\\0&1\\-1&0\end{bmatrix}$ $\frac{1}{2}\begin{bmatrix}1&0\\0&1\\0&-1\\-1&0\end{bmatrix}$ |

It may be desirable to require only two pairs of coherent ports in partially coherent transmission over 4 ports, rather than requiring coherent transmission across ports 40-42 and 41-43. One way to achieve this is to allow usage of antenna port pairs (40,42) and (41,43) for coherent transmission in rank 2. Since reordering antenna ports for all codebook indices for a given rank of a codebook does not affect the mutual distance or radio link performance of those codewords, reordering either the rank 1 or rank 2 codebook can be a tool to align ports pairs across ranks.

In order to determine the port reordering, it is desirable to find a reordering that allows as many partially coherent codewords to be used across ranks as possible. Although codebook indices 8-15 always have at most two non-zero magnitude elements per layer, these correspond to a mixture of antenna port pairs. Indices 8-11 correspond to port pairs 40 and 42 for the first layer, and 41 and 43 for the second layer, while indices 12-15 correspond to port pairs (40,43) and (41,42) for the two layers, respectively. This means that port pairs (41,42) and (42,43) have a more consistent usage of the same antenna ports, since they are used over 8 indices, while the other port pairs are used over only 4 indices. Consequently indices 0-7 seem the best candidates to align to rank 1 through a reordering of antenna ports.

If rows 2 and 3, or equivalently antenna ports 41 and 42 are swapped, then the codebook in Table 2 becomes Table 3 below. The codebook indices 0-7 in Table 4 have zeros in the same columns as those in codebook indices 16-23 of Table 1, and so the same antenna port pairs (40,42) and (41,43) require coherent transmission for both ranks 1 and 2. Therefore, reordering the ports allows 8 codewords from rank 1 and 2 to be used for partially coherent transmission with only two port pairs, as opposed to two port triplets (40,41, 42) and (41,42,43) without the port reordering.

Therefore, in an embodiment, a partial coherence capability uses a first set of precoding matrices for one spatial layer, wherein each precoding matrix in the set has a first column with at least two non-zero magnitude elements that correspond to at least a first and a second antenna port, at least one zero magnitude element in and the first column that corresponds to at least a third antenna port. The partial coherence capability uses a second set of precoding matrices for two spatial layers, wherein each precoding matrix in the second set has a second column with at least two non-zero magnitude elements that correspond to the at least first and second antenna ports, and at least one zero magnitude element in the second column that corresponds to at least the third antenna port. Herein, a matrix can comprise one or more columns.

Using partial coherence for rank 3 on the same set of antenna ports may be desirable. The Rel-10 LTE uplink MIMO codebook for rank 3 (Table 5.3.3A.2-4 in 3GPP TS 36.211) is shown in Table 4 below. While 2 of the 3 columns in all of the codebook indices have only one non-zero magnitude element, the first column has two non-zero magnitude elements. This first column therefore requires partially coherent transmission on one port pair for the first spatial layer. Codebook indices 2 and 3 have non-zero magnitude on rows 1 and 3, and so correspond to port pair (40,42). Similarly, codebook indices 8 and 9 have non-zero magnitude on rows 2 and 4, and so correspond to port pair (40,42). Therefore, codebook indices 2, 3, 8, and 9 can be used for partially coherent transmission with rank 2 codebook indices 0-7 of Table 3 and rank 1 codebook indices

TABLE 3

Modified Codebook for transmission on antenna ports {40, 41, 42, 43} with ν = 2

| Codebook index | Number of layers ν = 2 | | | |
|---|---|---|---|---|
| 0-3 | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 1 & 0 \\ 0 & j \end{bmatrix}$ | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ |
| 4-7 | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ |
| 8-11 | $\frac{1}{2}\begin{bmatrix} 1 & 0 \\ 1 & 0 \\ 0 & 1 \\ 0 & 1 \end{bmatrix}$ | $\frac{1}{2}\begin{bmatrix} 1 & 0 \\ 1 & 0 \\ 0 & 1 \\ 0 & -1 \end{bmatrix}$ | $\frac{1}{2}\begin{bmatrix} 1 & 0 \\ -1 & 0 \\ 0 & 1 \\ 0 & 1 \end{bmatrix}$ | $\frac{1}{2}\begin{bmatrix} 1 & 0 \\ -1 & 0 \\ 0 & 1 \\ 0 & -1 \end{bmatrix}$ |
| 12-15 | $\frac{1}{2}\begin{bmatrix} 1 & 0 \\ 0 & 1 \\ 0 & 1 \\ 1 & 0 \end{bmatrix}$ | $\frac{1}{2}\begin{bmatrix} 1 & 0 \\ 0 & -1 \\ 0 & 1 \\ 1 & 0 \end{bmatrix}$ | $\frac{1}{2}\begin{bmatrix} 1 & 0 \\ 0 & 1 \\ 0 & 1 \\ -1 & 0 \end{bmatrix}$ | $\frac{1}{2}\begin{bmatrix} 1 & 0 \\ 0 & -1 \\ 0 & 1 \\ -1 & 0 \end{bmatrix}$ |

16-23 of Table 1. The remaining codebook indices from Table 4 require coherent transmission on other port pairs than (40,42) and (41,43).

TABLE 4

Codebook for transmission on antenna ports {40, 41, 42, 43} with ν = 3

| Codebook index | Number of layers ν = 3 |
|---|---|
| 0-3 | $\frac{1}{2}\begin{bmatrix} 1 & 0 & 0 \\ 1 & 0 & 0 \\ 0 & 1 & 0 \\ 0 & 0 & 1 \end{bmatrix}$ $\frac{1}{2}\begin{bmatrix} 1 & 0 & 0 \\ -1 & 0 & 0 \\ 0 & 1 & 0 \\ 0 & 0 & 1 \end{bmatrix}$ $\frac{1}{2}\begin{bmatrix} 1 & 0 & 0 \\ 0 & 1 & 0 \\ 1 & 0 & 0 \\ 0 & 0 & 1 \end{bmatrix}$ $\frac{1}{2}\begin{bmatrix} 1 & 0 & 0 \\ 0 & 1 & 0 \\ -1 & 0 & 0 \\ 0 & 0 & 1 \end{bmatrix}$ |
| 4-7 | $\frac{1}{2}\begin{bmatrix} 1 & 0 & 0 \\ 0 & 1 & 0 \\ 0 & 0 & 1 \\ 1 & 0 & 0 \end{bmatrix}$ $\frac{1}{2}\begin{bmatrix} 1 & 0 & 0 \\ 0 & 1 & 0 \\ 0 & 0 & 1 \\ -1 & 0 & 0 \end{bmatrix}$ $\frac{1}{2}\begin{bmatrix} 0 & 1 & 0 \\ 1 & 0 & 0 \\ 1 & 0 & 0 \\ 0 & 0 & 1 \end{bmatrix}$ $\frac{1}{2}\begin{bmatrix} 0 & 1 & 0 \\ 1 & 0 & 0 \\ -1 & 0 & 0 \\ 0 & 0 & 1 \end{bmatrix}$ |
| 8-11 | $\frac{1}{2}\begin{bmatrix} 0 & 1 & 0 \\ 1 & 0 & 0 \\ 0 & 0 & 1 \\ 1 & 0 & 0 \end{bmatrix}$ $\frac{1}{2}\begin{bmatrix} 0 & 1 & 0 \\ 1 & 0 & 0 \\ 0 & 0 & 1 \\ -1 & 0 & 0 \end{bmatrix}$ $\frac{1}{2}\begin{bmatrix} 0 & 1 & 0 \\ 0 & 0 & 1 \\ 1 & 0 & 0 \\ 1 & 0 & 0 \end{bmatrix}$ $\frac{1}{2}\begin{bmatrix} 0 & 1 & 0 \\ 0 & 0 & 1 \\ 1 & 0 & 0 \\ -1 & 0 & 0 \end{bmatrix}$ |

To support fully non-coherent operation, it is necessary to add precoding matrices to the Rel-10 UL MIMO 4 port codebooks, since no columns in the precoding matrices of these codebacks has a single non-zero magnitude element. For rank 1 operation, it may be desirable to select any one antenna port, since it may be assumed that any port is equally likely to have the best SINR at the receiver. As such, the following 4 precoders in Table 5 can be added to the rank 1 codebook of Table 2 to support non-coherent operation.

TABLE 5

Additional codebook entries for transmission on antenna ports {40, 41, 42, 43} with ν = 1 enabling non-coherent operation

| Codebook index | Number of layers ν = 1 |
|---|---|
| 0-3 | $\frac{1}{2}\begin{bmatrix} 1 \\ 0 \\ 0 \\ 0 \end{bmatrix}$ $\frac{1}{2}\begin{bmatrix} 0 \\ 1 \\ 0 \\ 0 \end{bmatrix}$ $\frac{1}{2}\begin{bmatrix} 0 \\ 0 \\ 1 \\ 0 \end{bmatrix}$ $\frac{1}{2}\begin{bmatrix} 0 \\ 0 \\ 0 \\ 1 \end{bmatrix}$ |

Note that in Table 5, a scaling factor of ½ is used, although the precoders only contain one non-zero unit magnitude element, resulting in that the precoders are normalized to ¼ power rather than having a unit norm. Alternatively, another scaling factor may be applied, such as a scaling factor of 1, to normalize the precoders to unit norm, this alternative is illustrated in Table 6 below.

TABLE 6

Additional codebook entries for transmission on antenna ports {40, 41, 42, 43} with ν = 1 enabling non-coherent operation, using unit norm scaling factor

| Codebook index | Number of layers ν = 1 |
|---|---|
| 0-3 | $\begin{bmatrix} 1 \\ 0 \\ 0 \\ 0 \end{bmatrix}$ $\begin{bmatrix} 0 \\ 1 \\ 0 \\ 0 \end{bmatrix}$ $\begin{bmatrix} 0 \\ 0 \\ 1 \\ 0 \end{bmatrix}$ $\begin{bmatrix} 0 \\ 0 \\ 0 \\ 1 \end{bmatrix}$ |

For rank 2 operation, it may be desirable to select any antenna port pair across the two layers, since any combination of two ports could have the best SINR at the receiver. As such, the following 6 precoders in Table 7 can be added to the rank 2 codebook of Table 4 to support non-coherent operation.

TABLE 7

Additional codebook entries for transmission on antenna ports {40, 41, 42, 43} with ν = 2 enabling non-coherent operation

| Codebook index | Number of layers ν = 2 |
|---|---|
| 0-3 | $\frac{1}{2}\begin{bmatrix} 1 & 0 \\ 0 & 1 \\ 0 & 0 \\ 0 & 0 \end{bmatrix}$ $\frac{1}{2}\begin{bmatrix} 1 & 0 \\ 0 & 0 \\ 0 & 1 \\ 0 & 0 \end{bmatrix}$ $\frac{1}{2}\begin{bmatrix} 1 & 0 \\ 0 & 0 \\ 0 & 0 \\ 0 & 1 \end{bmatrix}$ $\frac{1}{2}\begin{bmatrix} 0 & 0 \\ 1 & 0 \\ 0 & 1 \\ 0 & 0 \end{bmatrix}$ $\frac{1}{2}\begin{bmatrix} 0 & 0 \\ 1 & 0 \\ 0 & 0 \\ 0 & 1 \end{bmatrix}$ $\frac{1}{2}\begin{bmatrix} 0 & 0 \\ 0 & 0 \\ 1 & 0 \\ 0 & 1 \end{bmatrix}$ |

Similarly as for the rank 1 codebook, an alternative scaling factor may be applied instead of the scaling factor ½ power used in the above, for instance to normalize the precoders to unit norm. In Table 8, a scaling factor of $$\frac{1}{\sqrt{2}}$$

is applied so that the precoders are normalized to unit norm. This is illustrated in Table 8 below. Generally, the embodiments herein may utilize an arbitrary scaling factor.

TABLE 8

Additional codebook entries for transmission on antenna ports {40, 41, 42, 43} with $v = 2$ enabling non-coherent operation, using unit norm scaling factor

| Codebook index | Number of layers $v = 2$ |
|---|---|
| 0-3 | $\frac{1}{\sqrt{2}}\begin{bmatrix}1&0\\0&1\\0&0\\0&0\end{bmatrix}$ $\frac{1}{\sqrt{2}}\begin{bmatrix}1&0\\0&0\\0&1\\0&0\end{bmatrix}$ $\frac{1}{\sqrt{2}}\begin{bmatrix}1&0\\0&0\\0&0\\0&1\end{bmatrix}$ $\frac{1}{\sqrt{2}}\begin{bmatrix}0&0\\1&0\\0&1\\0&0\end{bmatrix}$ $\frac{1}{\sqrt{2}}\begin{bmatrix}0&0\\1&0\\0&0\\0&1\end{bmatrix}$ $\frac{1}{\sqrt{2}}\begin{bmatrix}0&0\\0&0\\1&0\\0&1\end{bmatrix}$ |

For rank 3 operation, it may again be desirable to select any combination of 3 antenna ports pair across the two layers, since any combination of three ports could have the best SINR at the receiver. As such, the following 4 precoders in Table 9 can be added to the rank 3 codebook of Table 4 to support non-coherent operation.

TABLE 9

Additional codebook entries for transmission on antenna ports {40, 41, 42, 43} with $v = 3$ enabling non-coherent operation

| Codebook index | Number of layers $v = 3$ |
|---|---|
| 0-3 | $\frac{1}{2}\begin{bmatrix}1&0&0\\0&1&0\\0&0&1\\0&0&0\end{bmatrix}$ $\frac{1}{2}\begin{bmatrix}0&0&0\\1&0&0\\0&1&0\\0&0&1\end{bmatrix}$ $\frac{1}{2}\begin{bmatrix}0&0&1\\0&0&0\\1&0&0\\0&1&0\end{bmatrix}$ $\frac{1}{2}\begin{bmatrix}0&1&0\\0&0&1\\0&0&0\\1&0&0\end{bmatrix}$ |

For rank 4 operation, an identity matrix can provide good performance. As is known in the art, if the number of transmit antenna ports is equal to the number of layers, no extra degrees of freedom are available to provide array gain. Therefore, a suitable codebook for rank 4 operation with 4 ports can be the Rel-10 UL MIMO 4 port codebook (Table 5.3.3A.2-5 in 3GPP TS 36.211) that is in Table 10 below.

TABLE 10

Codebook for transmission on antenna ports {40, 41, 42, 43} with $v = 4$

| Codebook index | Number of layers $v = 4$ |
|---|---|
| 0 | $\frac{1}{2}\begin{bmatrix}1&0&0&0\\0&1&0&0\\0&0&1&0\\0&0&0&1\end{bmatrix}$ |

Since Table 10 has only one non-zero magnitude element per column, it can be used with non-coherent operation.

Given the above analyses, it is possible to construct a codebook that supports full coherent, partial coherent, and non-coherent operation. The codebook can be considered to comprise all matrices needed for all ranks supported in the codebook. In this case, the codebook comprises the following Tables 11-14. Each of the tables comprises matrices associated with a codebook index, or equivalently a TPMI. The codebooks are arranged such that TPMIs are classified according to the minimum coherence capability needed to support the TPMIs, where a coherence capability of fully coherent operation is considered to have the greatest capability, partially coherent operation is the next greatest coherence capability, and non-coherent operation is the least of the coherence capabilities. A UE 200 capable of fully coherent operation can support TPMIs associated with fully coherent, partially coherent, and non-coherent operation. A UE 200 capable of partially coherent operation can support TPMIs associated with partially coherent, and non-coherent operation, but not fully coherent operation. A UE 200 capable of only non-coherent operation can only support TPMIs associated with non-coherent operation. The minimum coherence capability associated with TPMIs on one or more rows is shown in the rightmost column.

The partial coherence TPMIs used for ranks 2 and 3 are designed such that antenna ports (40,42) and (41,43) require coherent transmission for all partially coherent TPMIs in the codebook for ranks 1, 2, and 3. This excludes TPMIs that could support partially coherent transmission on other antenna ports, such as TPMIs 8-15 for rank 2 and TPMIs 4-11 in rank 3. Since these TPMIs can provide additional performance, but require coherent transmission across other port pairs than (40,42) and (41,43), these TPMIs are used with the fully coherent minimum coherence capability. Therefore, in an embodiment, a full coherence capability uses a first set of precoding matrices for two spatial layers, wherein each precoding matrix in the first set has at least two non-zero magnitude elements that correspond to the at least a first and a second antenna port, at least one zero magnitude element that corresponds to at least a third antenna port, and the full coherence capability uses a second set of precoding matrices for one spatial layer, wherein each precoding matrix in the second set has non-zero magnitude elements that correspond to at least the first, second, and third antenna ports.

TABLE 11

Variable coherence codebook for transmission on antenna ports {40, 41, 42, 43} with $v = 1$

| Codebook index | Number of layers $v = 1$ | Minimum Coherence Capability |
|---|---|---|
| 0-7 | $\frac{1}{2}\begin{bmatrix}1\\1\\1\\-1\end{bmatrix}$, $\frac{1}{2}\begin{bmatrix}1\\1\\j\\j\end{bmatrix}$, $\frac{1}{2}\begin{bmatrix}1\\1\\-1\\1\end{bmatrix}$, $\frac{1}{2}\begin{bmatrix}1\\1\\-j\\-j\end{bmatrix}$, $\frac{1}{2}\begin{bmatrix}1\\j\\1\\j\end{bmatrix}$, $\frac{1}{2}\begin{bmatrix}1\\j\\j\\1\end{bmatrix}$, $\frac{1}{2}\begin{bmatrix}1\\j\\-1\\-j\end{bmatrix}$, $\frac{1}{2}\begin{bmatrix}1\\j\\-j\\-1\end{bmatrix}$ | Fully Coherent |
| 8-15 | $\frac{1}{2}\begin{bmatrix}1\\-1\\1\\1\end{bmatrix}$, $\frac{1}{2}\begin{bmatrix}1\\-1\\j\\-j\end{bmatrix}$, $\frac{1}{2}\begin{bmatrix}1\\-1\\-1\\-1\end{bmatrix}$, $\frac{1}{2}\begin{bmatrix}1\\-1\\-j\\j\end{bmatrix}$, $\frac{1}{2}\begin{bmatrix}1\\-j\\1\\-j\end{bmatrix}$, $\frac{1}{2}\begin{bmatrix}1\\-j\\j\\-1\end{bmatrix}$, $\frac{1}{2}\begin{bmatrix}1\\-j\\-1\\j\end{bmatrix}$, $\frac{1}{2}\begin{bmatrix}1\\-j\\-j\\1\end{bmatrix}$ | |
| 16-13 | $\frac{1}{2}\begin{bmatrix}1\\0\\1\\0\end{bmatrix}$, $\frac{1}{2}\begin{bmatrix}1\\0\\-1\\0\end{bmatrix}$, $\frac{1}{2}\begin{bmatrix}1\\0\\j\\0\end{bmatrix}$, $\frac{1}{2}\begin{bmatrix}1\\0\\-j\\0\end{bmatrix}$, $\frac{1}{2}\begin{bmatrix}0\\1\\0\\1\end{bmatrix}$, $\frac{1}{2}\begin{bmatrix}0\\1\\0\\-1\end{bmatrix}$, $\frac{1}{2}\begin{bmatrix}0\\1\\0\\j\end{bmatrix}$, $\frac{1}{2}\begin{bmatrix}0\\1\\0\\-j\end{bmatrix}$ | Partially Coherent |
| 24-27 | $\frac{1}{2}\begin{bmatrix}1\\0\\0\\0\end{bmatrix}$, $\frac{1}{2}\begin{bmatrix}0\\1\\0\\0\end{bmatrix}$, $\frac{1}{2}\begin{bmatrix}0\\0\\1\\0\end{bmatrix}$, $\frac{1}{2}\begin{bmatrix}0\\0\\0\\1\end{bmatrix}$ | Non-Coherent |

TABLE 12

Variable coherence codebook for transmission on antenna ports {40, 41, 42, 43} with $v = 2$

| Codebook index | Number of layers $v = 2$ | Minimum Coherence Capability |
|---|---|---|
| 0-3 | $\frac{1}{2}\begin{bmatrix}1&0\\0&1\\1&0\\0&-j\end{bmatrix}$, $\frac{1}{2}\begin{bmatrix}1&0\\0&1\\1&0\\0&j\end{bmatrix}$, $\frac{1}{2}\begin{bmatrix}1&0\\0&1\\-j&0\\0&1\end{bmatrix}$, $\frac{1}{2}\begin{bmatrix}1&0\\0&1\\-j&0\\0&-1\end{bmatrix}$ | Partially Coherent |
| 4-7 | $\frac{1}{2}\begin{bmatrix}1&0\\0&1\\-1&0\\0&-j\end{bmatrix}$, $\frac{1}{2}\begin{bmatrix}1&0\\0&1\\-1&0\\0&j\end{bmatrix}$, $\frac{1}{2}\begin{bmatrix}1&0\\0&1\\j&0\\0&1\end{bmatrix}$, $\frac{1}{2}\begin{bmatrix}1&0\\0&1\\j&0\\0&-1\end{bmatrix}$ | |
| 8-11 | $\frac{1}{2}\begin{bmatrix}1&0\\1&0\\0&1\\0&1\end{bmatrix}$, $\frac{1}{2}\begin{bmatrix}1&0\\1&0\\0&1\\0&-1\end{bmatrix}$, $\frac{1}{2}\begin{bmatrix}1&0\\-1&0\\0&1\\0&1\end{bmatrix}$, $\frac{1}{2}\begin{bmatrix}1&0\\-1&0\\0&1\\0&-1\end{bmatrix}$ | Fully Coherent |
| 12-15 | $\frac{1}{2}\begin{bmatrix}1&0\\0&1\\0&1\\1&0\end{bmatrix}$, $\frac{1}{2}\begin{bmatrix}1&0\\0&-1\\0&1\\1&0\end{bmatrix}$, $\frac{1}{2}\begin{bmatrix}1&0\\0&1\\0&1\\-1&0\end{bmatrix}$, $\frac{1}{2}\begin{bmatrix}1&0\\0&-1\\0&1\\-1&0\end{bmatrix}$ | |
| 16-19 | $\frac{1}{2}\begin{bmatrix}1&0\\0&1\\0&0\\0&0\end{bmatrix}$, $\frac{1}{2}\begin{bmatrix}1&0\\0&0\\0&1\\0&0\end{bmatrix}$, $\frac{1}{2}\begin{bmatrix}1&0\\0&0\\0&0\\0&1\end{bmatrix}$, $\frac{1}{2}\begin{bmatrix}0&0\\1&0\\0&1\\0&0\end{bmatrix}$ | Non-Coherent |

TABLE 12-continued

Variable coherence codebook for transmission on antenna ports {40, 41, 42, 43} with ν = 2

| Codebook index | Number of layers ν = 2 | Minimum Coherence Capability |
|---|---|---|
| 20-21 | $\frac{1}{2}\begin{bmatrix} 0 & 0 \\ 1 & 0 \\ 0 & 0 \\ 0 & 1 \end{bmatrix} \quad \frac{1}{2}\begin{bmatrix} 0 & 0 \\ 0 & 0 \\ 1 & 0 \\ 0 & 1 \end{bmatrix}$ | |

TABLE 13

Variable coherence codebook for transmission on antenna ports {40, 41, 42, 43} with ν = 3

| Codebook index | Number of layers ν = 3 | Minimum Coherence Capability |
|---|---|---|
| 0-3 | $\frac{1}{2}\begin{bmatrix} 1 & 0 & 0 \\ 0 & 1 & 0 \\ 1 & 0 & 0 \\ 0 & 0 & 1 \end{bmatrix} \quad \frac{1}{2}\begin{bmatrix} 1 & 0 & 0 \\ 0 & 1 & 0 \\ -1 & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ 1 & 0 & 0 \end{bmatrix} \quad \frac{1}{2}\begin{bmatrix} 0 & 1 & 0 \\ 1 & 0 & 0 \\ 0 & 0 & 1 \\ -1 & 0 & 0 \end{bmatrix}$ | Partially Coherent |
| 4-7 | $\frac{1}{2}\begin{bmatrix} 1 & 0 & 0 \\ 0 & 1 & 0 \\ 0 & 0 & 1 \\ 1 & 0 & 0 \end{bmatrix} \quad \frac{1}{2}\begin{bmatrix} 1 & 0 & 0 \\ 0 & 1 & 0 \\ 0 & 0 & 1 \\ -1 & 0 & 0 \end{bmatrix} \quad \frac{1}{2}\begin{bmatrix} 0 & 1 & 0 \\ 1 & 0 & 0 \\ 1 & 0 & 0 \\ 0 & 0 & 1 \end{bmatrix} \quad \frac{1}{2}\begin{bmatrix} 0 & 1 & 0 \\ 1 & 0 & 0 \\ -1 & 0 & 0 \\ 0 & 0 & 1 \end{bmatrix}$ | Fully Coherent |
| 8-11 | $\frac{1}{2}\begin{bmatrix} 1 & 0 & 0 \\ 1 & 0 & 0 \\ 0 & 1 & 0 \\ 0 & 0 & 1 \end{bmatrix} \quad \frac{1}{2}\begin{bmatrix} 1 & 0 & 0 \\ -1 & 0 & 0 \\ 0 & 1 & 0 \\ 0 & 0 & 1 \end{bmatrix} \quad \frac{1}{2}\begin{bmatrix} 0 & 1 & 0 \\ 0 & 0 & 1 \\ 1 & 0 & 0 \\ 1 & 0 & 0 \end{bmatrix} \quad \frac{1}{2}\begin{bmatrix} 0 & 1 & 0 \\ 0 & 0 & 1 \\ 1 & 0 & 0 \\ -1 & 0 & 0 \end{bmatrix}$ | |
| 12-15 | $\frac{1}{2}\begin{bmatrix} 1 & 0 & 0 \\ 0 & 1 & 0 \\ 0 & 0 & 1 \\ 0 & 0 & 0 \end{bmatrix} \quad \frac{1}{2}\begin{bmatrix} 0 & 0 & 0 \\ 1 & 0 & 0 \\ 0 & 1 & 0 \\ 0 & 0 & 1 \end{bmatrix} \quad \frac{1}{2}\begin{bmatrix} 0 & 0 & 1 \\ 0 & 0 & 0 \\ 1 & 0 & 0 \\ 0 & 1 & 0 \end{bmatrix} \quad \frac{1}{2}\begin{bmatrix} 0 & 1 & 0 \\ 0 & 0 & 1 \\ 0 & 0 & 0 \\ 1 & 0 & 0 \end{bmatrix}$ | Non-Coherent |

TABLE 14

Variable coherence codebook for transmission on antenna ports {40, 41, 42, 43} with ν = 4

| Codebook index | Number of layers ν = 4 | Minimum Coherence Capability |
|---|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | Non-Coherent |

TABLE 15

TPMIs and number of states vs. minimum coherence capability for 4 port codebook

| Rank | Full Coherence Min. Capability | Partial Coherent Min. Capability | Non Coherent Min. Capability |
|---|---|---|---|
| 1 | Table 11 TPMIs 0-15 (16 TPMIs) | Table 11 TPMIs 16-23 (8 TPMIs) | Table 11 TPMIs 24-27 (4 TPMIs) |
| 2 | Table 12 TPMIs 8-15 (8 TPMIs) | Table 12 TPMIs 0-7 (8 TPMIs) | Table 12 TPMIs 16-21 (6 TPMIs) |
| 3 | Table 13 TPMIs 4-11 (8 TPMIs) | Table 13 TPMIs 0-3 (4 TPMIs) | Table 13 TPMIs 12-15 (4 TPMIs) |
| 4 | 0 | 0 | Table 14 TPMI 0 (1 TPMI) |

In order to construct the signaling for TPMI, it is necessary to determine the number of states. Table 15 below is an alternative representation of the 4 port codebook of Tables 11-14 that indicates the number of TPMIs used per rank and per coherence capability.

Table 16 below is another representation of the 4 port codebook of Tables 11-14 that indicates the total number of TPMIs supported by a UE 200 with a given coherence capability per rank. Here, the TPMIs for partial coherent and non-coherent operation are included in the total for full coherence capable UEs, since such UEs can also transmit partially coherent and non-coherent TPMIs. Similarly, the TPMIs for non-coherent operation are included in the total for partial coherent partially coherent capable UEs, since such UEs can also support non-coherent TPMIs. Finally, non-coherent TPMIs are only in the total TPMIs, since UEs supporting only non-coherent capable can only support these TPMIs. It can be observed that Table 16 can be referred to as comprising 3 codebooks: one for fully coherent operation, one for partially coherent operation, and another for non-coherent operation. Therefore, in some embodiments, a UE 200 is configured with an uplink WINO codebook identified as supporting full coherence, partial coherence, or non-coherent operation. In such embodiments, TPMIs identified with non-coherent operation or partially coherent operation may be included in a codebook configured to a UE 200 for fully coherent operation, and TPMIs identified with non-coherent operation may be included in a codebook configured to a UE 200 for partially coherent operation.

TABLE 16

Total TPMIs and number of states vs. minimum coherence capability for 4 port codebook

| Rank | Total Full Coherence TPMIs | Total Partial Coherent TPMIs | Total Non Coherent TPMIs |
|---|---|---|---|
| 1 | Table 11 TPMIs 0-27 (28 TPMIs) | Table 11 TPMIs 16-27 (12 TPMIs) | Table 11 TPMIs 24-27 (4 TPMIs) |
| 2 | Table 12 TPMIs 0-21 (22 TPMIs) | Table 12 TPMIs 0-7, 16-21 (14 TPMIs) | Table 12 TPMIs 16-21 (6 TPMIs) |
| 3 | Table 13 TPMIs 0-15 (16 TPMIs) | Table 13 TPMIs 0-3, 12-15 (8 TPMIs) | Table 13 TPMIs 12-15 (4 TPMIs) |
| 4 | Table 14 TPMI 0 (1 TPMI) | Table 14 TPMI 0 (1 TPMI) | Table 14 TPMI 0 (1 TPMI) |

Table 17 shows the number of TPMIs per coherence capability, accumulated per rank from Table 16. This accumulation of rank allows TRI information to be jointly encoded with TPMI, and so in this embodiment, a TPMI indication can also be labeled as TPMI/TRI, and a given value of the TPMI indication conveys the number of spatial layers to be used in the transmission. The number of bits needed to signal the number of TPMIs is also shown. For a given row of Table 17, the number of TPMIs from the row above (if any) are added to determine the number of TPMIs for the rank corresponding to the row and the prior ranks.

Examining Table 17, we see that the number of states varies according to the coherence capability and the maximum rank. In this design, the number of states tends to decrease according to coherence capability such that at least one bit less is needed for each lower capability than the one above. Therefore, in an embodiment, a UE 200 receives a TPMI field in a control channel wherein a first TPMI field configuration can identify TPMIs associated with a first and a second coherence capability, a second TPMI field configuration can identify TPMIs associated with the second coherence capability, but not the first coherence capability. Some embodiments may use one information bit field in the control channel to convey both a selected precoding matrix and a number of layers to be used in transmission. In some embodiments, the second TPMI field configuration occupies fewer information bits in the control channel than the first TPMI field configuration.

It can also be observed from Table 17 that the number of bits needed to convey PMI and/or rank decreases with the maximum rank. Therefore, in some embodiments, the number of information bits in a control channel used to identify precoding matrices associated with a coherence capability is set to be equal to $\lceil \log_2 N \rceil$, when N comprises the number of precoding matrices associated with the coherence capability in a subset of ranks to be used in transmission, and $\lceil x \rceil$ is the least integer greater than or equal to x. The subset may be indicated by a bitmap whose length is equal to the number of ports supported by a codebook containing the precoding matrices, wherein each bit indicates if precoding matrices for the corresponding spatial layer can be indicated by the TPMI field. Alternatively, the subset may be indicated by a maximum rank value, such that ranks from 1 to the maximum rank value can be indicated by the TPMI field.

TABLE 17

Number of TPMIs vs. minimum coherence capability for 4 port codebook

| Cumulative Rank | Full Coherence Capability Cumulative Sum of TPMIs | Partial Coherent Capability Cumulative Sum of TPMIs | Non Coherent Capability Cumulative Sum of TPMIs |
|---|---|---|---|
| Rank 1 | 28 (5 bits) | 12 (4 bits) | 4 (2 bits) |
| Rank 1-2 | 50 (6 bits) | 26 (5 bits) | 10 (4 bits) |
| Rank 1-3 | 66 (6 bits) | 34 (6 bits) | 14 (4 bits) |
| Rank 1-4 | 67 (7 bits) | 35 (6 bits) | 15 (4 bits) |

We note that the full and partial coherence capabilities have slightly more TPMIs than can be signaled with one less bit. Therefore, in an alternative embodiment shown in Table 18, we eliminate 3 of the TPMIs for rank 3, as shown below. The 3 rank 2 TPMIs that are eliminated should provide limited SNR gain, since antenna selection provided by the extra TPMIs should not improve performance substantially since partially and fully coherent TPMIs are already available, and since rank 3 is near the maximum rank supported by 4 antenna ports.

TABLE 18

TPMIs and number of states vs. minimum coherence capability for 4 port codebook with reduced overhead

| Rank | Full Coherence Min. Capability | Partial Coherent Min. Capability | Non Coherent Min. Capability |
|---|---|---|---|
| 1 | Table 11 TPMIs 0-15 (16 TPMIs) | Table 11 TPMIs 16-23 (8 TPMIs) | Table 11 TPMIs 24-27 (4 TPMIs) |
| 2 | Table 12 TPMIs 8-15 (8 TPMIs) | Table 12 TPMIs 0-7 (8 TPMIs) | Table 12 TPMIs 16-21 (6 TPMIs) |
| 3 | Table 13 TPMIs 4-11 (8 TPMIs) | Table 13 TPMIs 0-3 (4 TPMIs) | Table 13 TPMI 12 (1 TPMI) |
| 4 | 0 | 0 | Table 14 TPMI 0 (1 TPMI) |

Examining Table 19, we see that the maximum number of bits needed is 6 rather than 7, and that the lesser coherence capabilities always require fewer TPMI bits. Therefore, in an embodiment, a 4 port codebook that can be used by UEs capable of one or more of fully coherent, partially coherent, and non-coherent transmission has one precoding matrix for rank 3 where all columns of the matrix have no more than one non-zero magnitude element, and one precoding matrix for rank 4 where all columns of the matrix have no more than one non-zero magnitude element. Such an embodiment may further comprise four rank 1 precoding matrices wherein each rank 1 precoding matrix has a single column comprising a single non-zero element, and a set of 6 rank 2 precoding matrices wherein each rank 2 precoding matrix in the set comprises two columns and non-zero magnitude elements, and where matrix in the set of rank 2 precoding matrices is different from every other matrix in the set such that the location of the non-zero magnitude element is different.

TABLE 19

Number of TPMIs vs. minimum coherence capability for 4 port codebook with reduced overhead

| Cumulative Rank | Full Coherence Capability Cumulative Sum of TPMIs | Partial Coherent Capability Cumulative Sum of TPMIs | Non Coherent Capability Cumulative Sum of TPMIs |
|---|---|---|---|
| Rank 1 | 28 (5 bits) | 12 (4 bits) | 4 (2 bits) |
| Rank 1-2 | 50 (6 bits) | 26 (5 bits) | 10 (4 bits) |
| Rank 1-3 | 63 (6 bits) | 31 (5 bits) | 11 (4 bits) |
| Rank 1-4 | 64 (6 bits) | 32 (5 bits) | 12 (4 bits) |

For simplicity, corresponding Table 19A, below, clarifies the size of the field for signaling TPMIs when using a 4 port codebook.

TABLE 19a

Size of TPMI field vs. minimum coherence capability for 4 port codebook with reduced overhead

| Cumulative Rank | Full Coherence Capability | Partial Coherent Capability | Non Coherent Capability |
|---|---|---|---|
| Rank 1 | 5 bits | 4 bits | 2 bits |
| Rank 1-2 | 6 bits | 5 bits | 4 bits |

TABLE 19a-continued

Size of TPMI field vs. minimum coherence capability for 4 port codebook with reduced overhead

| Cumulative Rank | Full Coherence Capability | Partial Coherent Capability | Non Coherent Capability |
|---|---|---|---|
| Rank 1-3 | 6 bits | 5 bits | 4 bits |
| Rank 1-4 | 6 bits | 5 bits | 4 bits |

4-Port Variable Coherence Capability Codebooks Using LTE Rel-8 Downlink Precoders When CP-OFDM is used for uplink MIMO transmission, the peak to average power ratio (PAPR) or cubic metric (CM) of the PUSCH transmission may not be a primary design concern, and codebooks that do not minimize PAPR or CM may be suitable. Furthermore, it may be advantageous to use existing codebook designs in order to minimize design effort, and since such existing codebooks may have been proven in their use in deployments. UE 200 antenna systems tend to have more decorrelated antenna ports than in base station 100s due to irregular antenna patterns in the UE 200 and due to higher angle spreads found near UEs than near base station 100s. Since the LTE Rel-8 downlink 4 port codebook was designed with uncorrelated antenna systems in mind, it is a logical candidate to use in an uplink MIMO design for CP-OFDM. Such a codebook does not support partially coherent or non-coherent transmission, however. Therefore, additional precoding matrices should be supported along with Rel-8 precoding matrices.

The Rel-8 downlink codebook is constructed with Table 20 below (which is 6.3.4.2.3-2 in 3GPP TS 36.211), where the quantity $W_n^{\{s\}}$ for denotes the precoding matrix codebook index n defined by the columns given by the set $\{s\}$ from the expression $W_n = I - 2u_n u_n^H/u_n^H u_n$ where I is the 4×4 identity matrix and the vector $u_n$ is given by Table 20. It can be seen that 16 TPMIs are used for each of ranks 1 to 4. This would require 64 states for the fully coherent portion of a codebook, as compared to 32 with the design in Table 18, which would substantially increase the codebook size and require extra TPMI overhead. Therefore, it may be desirable to use a subset of the Rel-8 codebook for some of the ranks.

TABLE 20

Codebook for transmission on antenna ports {0, 1, 2, 3} and for CSI reporting based on antenna ports {0, 1, 2, 3} or {15, 16, 17, 18}

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

The greatest performance benefits from precoding tend to come from rank 1 transmission, and so it may be desirable to use all 16 codebook indices from Table 20 in a reduced size codebook based on Table 20, while using a subset of the indices for ranks 2 to 4. Examining the distance properties of the precoding matrices in Table 20, it can be observed that precoding matrices with codebook indices 4-7 tend to have smaller minimum distance to other precoding matrices. Therefore, indices 4-7 may be excluded from the reduced size codebook. The remaining indices have relatively homogeneous distance properties, but one suitable set of 8 matrices is matrices 0-3 and 8-11. These 8 matrices can be suitable for rank 2 and 3 transmissions. Since there is little benefit from precoding using rank 4 transmission on 4 antennas, the diagonal precoder used for non-coherent transmission is sufficient, and one specifically for fully coherent operation is not needed. Therefore, a reduced size 4 port codebook based on the Rel8 4 port downlink but that includes support for different coherence capabilities can be constructed in Table 21 below. More generally, in an embodiment, a precoding matrix $W_n$ associated with fully coherent operation is constructed using the equation $$W_n = I - 2u_n u_n H / u_n^H u_n \qquad \text{Eq. (4)}$$

where n is a precoding matrix index, and the values of $u_n$ are determined from Table 20. In some embodiments, n can be one of 16 values for rank 1, one of 8 values for ranks 2 and 3, and the diagonal matrix shown below for rank 4.

$$W_n = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \qquad \text{Eq. (5)}$$

In some embodiments, $n \in \{0,1,2,3,8,9,10,11\}$ if for rank 2 and rank 3 precoding matrices.

TABLE 21

TPMIs and number of states vs. minimum coherence capability for 4 port codebook using Rel-8 TPMIs with low overhead

| rank | Full Coherence Min. Capability | Partial Coherent Min. Capability | Non Coherent Min. Capability |
|---|---|---|---|
| 1 | Table 19 TPMIs 0-15 (16 TPMIs) | Table 10 TPMIs 16-23 (8 TPMIs) | Table 10 TPMIs 24-27 (4 TPMIs) |
| 2 | Table 19 TPMIs 0-3, 8-11 (8 TPMIs) | Table 11 TPMIs 0-7 (8 TPMIs) | Table 11 TPMIs 16-21 (6 TPMIs) |
| 3 | Table 19 TPMIs 0-3, 8-11 (8 TPMIs) | Table 12 TPMIs 0-3 (4 TPMIs) | Table 12 TPMI 12 (1 TPMI) |
| 4 | 0 | 0 | Table 13 TPMI 0 (1 TPMI) |

4-Port Variable Coherence Capability Codebooks Using NR Rel-15 Downlink Precoders As in the case of the LTE Rel-8 codebook; when CP-OFDM is used for uplink MIMO transmission and the peak to average power ratio (PAPR) or cubic metric (CM) of the PUSCH transmission is not a primary design concern; the NR Rel-15 downlink codebook although it does not minimize PAPR. The NR Rel-15 downlink codebook may be of particular interest, since antenna correlation can be larger when 4 antennas are used in the UE.

Uplink codebooks based Rel-15 downlink codebooks need additional codewords to support both coherent and non-coherent operation, but can use the Rel-15 precoders for the fully coherent portion of the NR 4 Tx codebook for CP-OFDM. Since the Rel-15 based design is not fundamentally different than the Rel-8 based design above, it will also need to contain 64 precoders to be competitive. Therefore, a Rel-15 based codebook design herein also comprises 16, 8, and 8, precoding matrices that are usable only for UEs capable of fully coherent across ranks 1, 2, and 3 respectively. The NR Rel-15 Mode 1 codebook is used, given its compatibility with wideband TPMI and good performance with low overhead. Since 32 precoding matrices are needed for rank 1, we reduce the oversampling factor from O=4 to O=2, thereby reducing the number TPMIs to 16. Furthermore, it is necessary to set $i_{1,3}=0$ for rank 2 in order to reduce to 8 TPMIs for ranks 2 and 3. This leads to the codebook in Tables 21A through 21D below:

TABLE 21A

Codebook Based on NR Rel-15 DL (Rank 1)

| Codebook Index | Number of layer v = 1 | Minimum Coherence Capability |
|---|---|---|
| 0-15 | NR Rel15 DL codebook with CodeBookMode = 1, but with $O_1$ = 2 | Fully Coherent |
| 16-23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ | Partially Coherent |
| 24-27 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ | Non-Coherent |

TABLE 21B

Codebook Based on NR Rel-15 DL (Rank 2)

| Codebook index | Number of layers ν = 2 | Minimum Coherence Capability |
|---|---|---|
| 0-3 | $\frac{1}{2}\begin{bmatrix} 1 & 0 \\ 0 & 1 \\ 1 & 0 \\ 0 & -j \end{bmatrix}$ $\frac{1}{2}\begin{bmatrix} 1 & 0 \\ 0 & 1 \\ 1 & 0 \\ 0 & j \end{bmatrix}$ $\frac{1}{2}\begin{bmatrix} 1 & 0 \\ 0 & 1 \\ -j & 0 \\ 0 & 1 \end{bmatrix}$ $\frac{1}{2}\begin{bmatrix} 1 & 0 \\ 0 & 1 \\ -j & 0 \\ 0 & -1 \end{bmatrix}$ | Partially Coherent |
| 4-7 | $\frac{1}{2}\begin{bmatrix} 1 & 0 \\ 0 & 1 \\ -1 & 0 \\ 0 & -j \end{bmatrix}$ $\frac{1}{2}\begin{bmatrix} 1 & 0 \\ 0 & 1 \\ -1 & 0 \\ 0 & j \end{bmatrix}$ $\frac{1}{2}\begin{bmatrix} 1 & 0 \\ 0 & 1 \\ j & 0 \\ 0 & 1 \end{bmatrix}$ $\frac{1}{2}\begin{bmatrix} 1 & 0 \\ 0 & 1 \\ j & 0 \\ 0 & -1 \end{bmatrix}$ | Partially Coherent |
| 8-15 | NR Rel15 DL codebook with CodeBookMode = 1, but with $O_1 = 2$ and $i_{1,3} = 0$ | Fully Coherent |
| 16-19 | $\frac{1}{2}\begin{bmatrix} 1 & 0 \\ 0 & 1 \\ 0 & 0 \\ 0 & 0 \end{bmatrix}$ $\frac{1}{2}\begin{bmatrix} 1 & 0 \\ 0 & 0 \\ 0 & 1 \\ 0 & 0 \end{bmatrix}$ $\frac{1}{2}\begin{bmatrix} 1 & 0 \\ 0 & 0 \\ 0 & 0 \\ 0 & 1 \end{bmatrix}$ $\frac{1}{2}\begin{bmatrix} 0 & 0 \\ 1 & 0 \\ 0 & 1 \\ 0 & 0 \end{bmatrix}$ | Non-Coherent |
| 20-21 | $\frac{1}{2}\begin{bmatrix} 0 & 0 \\ 1 & 0 \\ 0 & 0 \\ 0 & 1 \end{bmatrix}$ $\frac{1}{2}\begin{bmatrix} 0 & 0 \\ 0 & 0 \\ 1 & 0 \\ 0 & 1 \end{bmatrix}$ | |

TABLE 21C

Codebook Based on NR Rel-15 DL (Rank 3)

| Codebook index | Number of layers ν = 4 | Minimum Coherence Capability |
|---|---|---|
| 0-3 | $\frac{1}{2}\begin{bmatrix} 1 & 0 & 0 \\ 0 & 1 & 0 \\ 1 & 0 & 0 \\ 0 & 0 & 1 \end{bmatrix}$ $\frac{1}{2}\begin{bmatrix} 1 & 0 & 0 \\ 0 & 1 & 0 \\ -1 & 0 & 0 \\ 0 & 0 & 1 \end{bmatrix}$ $\frac{1}{2}\begin{bmatrix} 0 & 1 & 0 \\ 1 & 0 & 0 \\ 0 & 0 & 1 \\ 1 & 0 & 0 \end{bmatrix}$ $\frac{1}{2}\begin{bmatrix} 0 & 1 & 0 \\ 1 & 0 & 0 \\ 0 & 0 & 1 \\ -1 & 0 & 0 \end{bmatrix}$ | Partially Coherent |
| 4-11 | NR Rel15 codebook with CodeBookMode = 1-2, with $O_1 = 2$ | Fully Coherent |
| 12 | $\frac{1}{2}\begin{bmatrix} 1 & 0 & 0 \\ 0 & 1 & 0 \\ 0 & 0 & 1 \\ 0 & 0 & 0 \end{bmatrix}$ | Non-Coherent |

TABLE 21D

Codebook Based on NR Rel-15 DL (Rank 4)

| Codebook index | Number of layers ν = 4 | Minimum Coherence Capability |
|---|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | Non-Coherent |

Codebook Subset Restriction Per UE Capability

In one embodiment, there is a codebook consisting of N codewords and each codeword is connected to one or multiple of the UE 200 coherence capabilities. In one embodiment, the number of bits allowed for signaling TPMI is less than $[\log_2 N]$. In such an embodiment, codebook subset restriction may be utilized such that only a subset of the codewords are used out of the available N codewords. Furthermore, this codebook subset restriction may be carried out in a UE 200 specific way or alternatively depending on UE 200 coherence capability. Hence, for a certain UE 200 there may be a certain subset of the N precoders which is used for codebook based transmission. This subset may be implicitly given by the UE 200 capability, or
explicitly defined by the base station 100 (e.g. gNB), or
explicitly defined by the base station 100 (e.g. gNB) but recommended by the UE 200 through some signaling.

In some embodiments, a UE 200 indicates the TPMIs it can support in a UL MIMO codebook using a supported bitmap in capability signaling. The bitmap comprises a number of elements equal to the number of precoding matrices in a codebook over all ranks supported by the codebook, and where each bit in the bitmap corresponds to a precoding matrix identified by a TPMI field used for the codebook in downlink control signaling. In some embodiments, the UE 200 receives a codebook restriction bitmap in response to the supported bitmap for the UL MIMO codebook, where the codebook restriction bitmap identifies the TPMIs that the UE 200 may expect in downlink control signaling for the UL MIMO codebook, and has the same size as the supported bitmap. In some embodiments, the number of information bits in downlink control signaling carrying TPMIs is reduced according to the number of restricted TPMIs in the codebook restriction bitmap.

In one embodiment where $[\log_2 N]$ is larger than the number of bits allowed for signaling TPMI we define the codebook by adding the rank 1-3 codewords as presented below in Tables 22-24 to the previous presented codebook in Tables 11-14.

TABLE 22

Additional codewords for transmission on antenna ports {40, 41, 42, 43} with ν = 1

| Codebook index | Number of layers ν = 1 | | | |
| --- | --- | --- | --- | --- |
| 28-36 | $\frac{1}{2\sqrt{2}}\begin{bmatrix}\sqrt{2}\\0\\1+j\\0\end{bmatrix}$ | $\frac{1}{2\sqrt{2}}\begin{bmatrix}\sqrt{2}\\0\\1-j\\0\end{bmatrix}$ | $\frac{1}{2\sqrt{2}}\begin{bmatrix}\sqrt{2}\\0\\-1+j\\0\end{bmatrix}$ | $\frac{1}{2\sqrt{2}}\begin{bmatrix}\sqrt{2}\\0\\-1-j\\0\end{bmatrix}$ |
| 28-36 | $\frac{1}{2\sqrt{2}}\begin{bmatrix}0\\\sqrt{2}\\0\\1+j\end{bmatrix}$ | $\frac{1}{2\sqrt{2}}\begin{bmatrix}0\\\sqrt{2}\\0\\1-j\end{bmatrix}$ | $\frac{1}{2\sqrt{2}}\begin{bmatrix}0\\\sqrt{2}\\0\\-1+j\end{bmatrix}$ | $\frac{1}{2\sqrt{2}}\begin{bmatrix}0\\\sqrt{2}\\0\\-1-j\end{bmatrix}$ |

TABLE 23

Additional codewords for transmission on antenna ports {40, 41, 42, 43} with ν = 2

| Codebook index | Number of layers ν = 2 | | | |
| --- | --- | --- | --- | --- |
| 22-25 | $\frac{1}{2}\begin{bmatrix}1&0\\0&1\\1&0\\0&-1\end{bmatrix}$ | $\frac{1}{2}\begin{bmatrix}1&0\\0&1\\1&0\\0&1\end{bmatrix}$ | $\frac{1}{2}\begin{bmatrix}1&0\\0&1\\-1&0\\0&1\end{bmatrix}$ | $\frac{1}{2}\begin{bmatrix}1&0\\0&1\\-1&0\\0&-1\end{bmatrix}$ |

TABLE 24

Additional codewords for transmission on antenna ports 40, 41, 42, 43} with ν = 3

| Codebook index | Number of layers ν = 3 | | | |
| --- | --- | --- | --- | --- |
| 16-19 | $\frac{1}{2}\begin{bmatrix}1&0&0\\0&1&0\\j&0&0\\0&0&1\end{bmatrix}$ | $\frac{1}{2}\begin{bmatrix}1&0&0\\0&1&0\\-j&0&0\\0&0&1\end{bmatrix}$ | $\frac{1}{2}\begin{bmatrix}0&1&0\\1&0&0\\0&0&1\\j&0&0\end{bmatrix}$ | $\frac{1}{2}\begin{bmatrix}0&1&0\\1&0&0\\0&0&1\\-j&0&0\end{bmatrix}$ |

Given this extended codebook, a codebook subset restriction for a full coherence capability UE 200 may result in using the same codewords as in the previous embodiment, hence the 64 codewords as given by Table 25 below. A partial coherence UE 200 will, on the other hand, not be able to use the subset of codewords corresponding to the full coherence codewords. It may then restrict these codewords and instead chose to use other codewords as in Table 25 below. Hence, as illustrated in Table 26, different UEs are using different subsets of the codebook and may further, as in the example of the full coherence UE 200 and partial coherence UE 200, use the same number of bits to signal TPMI. Different UEs may also, as in the example of the non-coherence UE 200 and partial coherence UE 200, use different number of bits to signal TPMI.

TABLE 25

Subsets of codebooks used for different UEs.

| rank | Full Coherence capability used codebook subset | Partial Coherent used codebook subset | Non Coherent used codebook subset |
|---|---|---|---|
| 1 | TPMIs 0-27 | TPMIs 15-36 | TPMIs 24-27 |
| 2 | TPMIs 0-21 | TPMIs 0-7, 15-25 | TPMIs 16-21 |
| 3 | TPMIs 0-12 | TPMIs 0-3, 12-19 | TPMI 12 |
| 4 | TPMI 0 | TPMI 0 | TPMI 0 |

TABLE 26

Subset size used for different UEs.

| Cumulative Rank | Full Coherence Capability Cumulative Sum of TPMIs | Partial Coherent Capability Cumulative Sum of TPMIs | Non Coherent Capability Cumulative Sum of TPMIs |
|---|---|---|---|
| Rank 1 | 28 (5 bits) | 21 (5 bits) | 4 (2 bits) |
| Rank 1-2 | 50 (6 bits) | 38 (6 bits) | 10 (4 bits) |
| Rank 1-3 | 63 (6 bits) | 50 (6 bits) | 11 (4 bits) |
| Rank 1-4 | 64 (6 bits) | 52 (6 bits) | 12 (4 bits) |

FIGS. 7-13 illustrate various methods of transmitting a receiving data using the precoding matrices as herein described. Generally, the base station 100 selects a precoding matrix from a codebook for a data transmission based on measurements of the uplink channel from the UE 200 to the base station 100 and signals the selected precoding matrix to the UE 200 by transmitting an indication (e.g., TPMI) of the selected precoding matrix to the UE 200. The codebook supports non-coherent, partially coherent and fully coherent data transmission from the UE 200 to the base station 100. The UE 200 receives the indication (e.g. TPMI) from the base station 100 and performs an uplink data transmission using the indicated precoding matrix. The base station 100 receives the data transmission from the UE 200.

Figure 7:
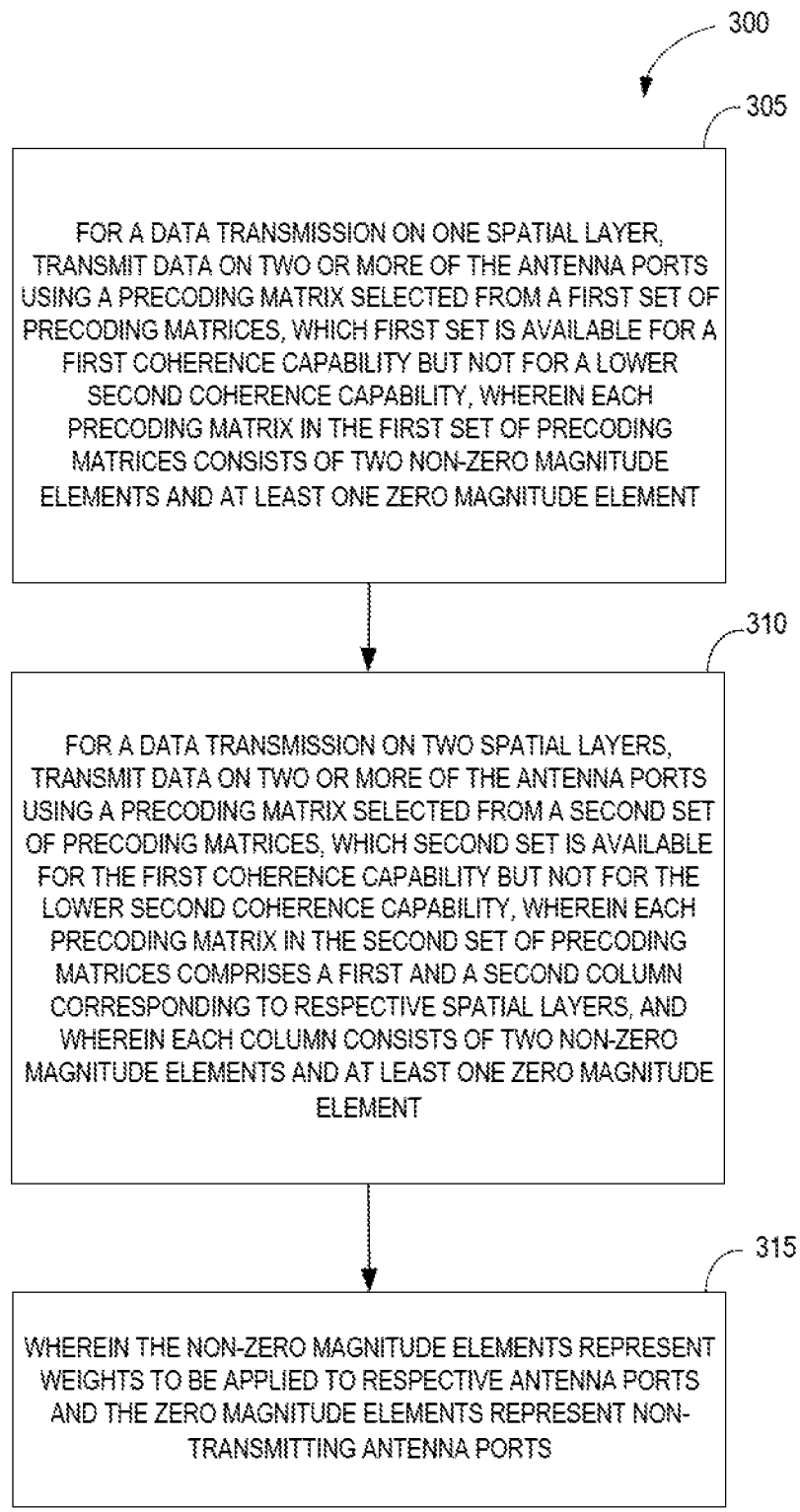
FIG. 7 illustrates an exemplary method of data transmission implemented by a user equipment.

FIG. 7 illustrates an exemplary method 300 for transmitting data from the UE 200 to a base station 100 in a wireless communication network. The method 300 is implemented by a UE 200 having multiple antenna ports connected to an antenna array. Generally, the UE 200 uses a first set of precoding matrices for a single layer data transmission over two or more antenna ports and a second set of precoding matrices for a data transmission over two spatial layers. For a data transmission on one spatial layer, the UE 200 transmits data over two or more of the antenna ports using a precoding matrix selected from the first set of precoding matrices, which is available for a first coherence capability but not the a lower second coherence capability (block 305). Each precoding matrix in the first set of precoding matrices consists of two non-zero magnitude elements and at least one zero magnitude element. For a data transmission on two spatial layers, the UE 200 transmits data over two or more of the antenna ports using a precoding matrix selected from the second set of precoding matrices, which is available for the first coherence capability but not for the lower second coherence capability (block 310). Each precoding matrix in the second set of precoding matrices comprises a first and a second column corresponding to respective spatial layers wherein each column consists of two non-zero magnitude elements and at least one zero magnitude element. Non-zero elements in the preceding matrices represent weights to be applied to respective antenna ports while zero magnitude elements represent non-transmitting antenna ports (block 315).

Some embodiments of the method 300 further comprise transmitting data on three spatial layers. For a data transmission on three spatial layers, the UE 200 transmits data over two or more of the antenna ports using a preceding matrix selected from a third set of preceding matrices, which third, set is available for the first coherence capability but not for a lower second coherence capability. Each precoding matrix in the third set of preceding matrices comprises a first, a second and a third column corresponding to respective spatial layers, wherein each column consists of two non-zero magnitude elements and at least one zero magnitude element.

In some embodiments of the method 300, the UE 200 transmits data over three or antenna ports. For a data transmission on one spatial layer, the UE 200 transmits data over three or more of the antenna ports using a preceding matrix selected from a fourth set of preceding matrices, which fourth set is available for a higher third coherence capability but not for the first or second coherence capability. Each preceding matrix in the fourth set of preceding matrices consists of three or more non-zero magnitude elements. For a data transmission on two spatial layers, the UE 200 transmits data over three or more of the antenna ports using a preceding matrix selected from a fifth set of preceding matrices, which fifth set is available for the third coherence capability but not for the first or second coherence capability. Each preceding matrix in the fifth set of preceding matrices comprises a first and a second column corresponding to respective spatial layers, wherein each column consists of at least three non zero magnitude elements.

In some embodiments of the method 300, the first coherence capability corresponds to a partially coherent transmission capability.

In some embodiments of the method 300, the second coherence capability corresponds to a non-coherent transmission capability.

In some embodiments of the method 300, the third coherence capability corresponds to a fully coherent transmission capability.

Some embodiments of the method 300 further comprise indicating, by UE 200, a coherence capability of the UE 200 to the base station 100. In some embodiments, when the UE 200 indicates a coherence capability, the UE 200 transmits data transmission in accordance with the indicated coherence capability or a lower coherence capability.

Figure 8:
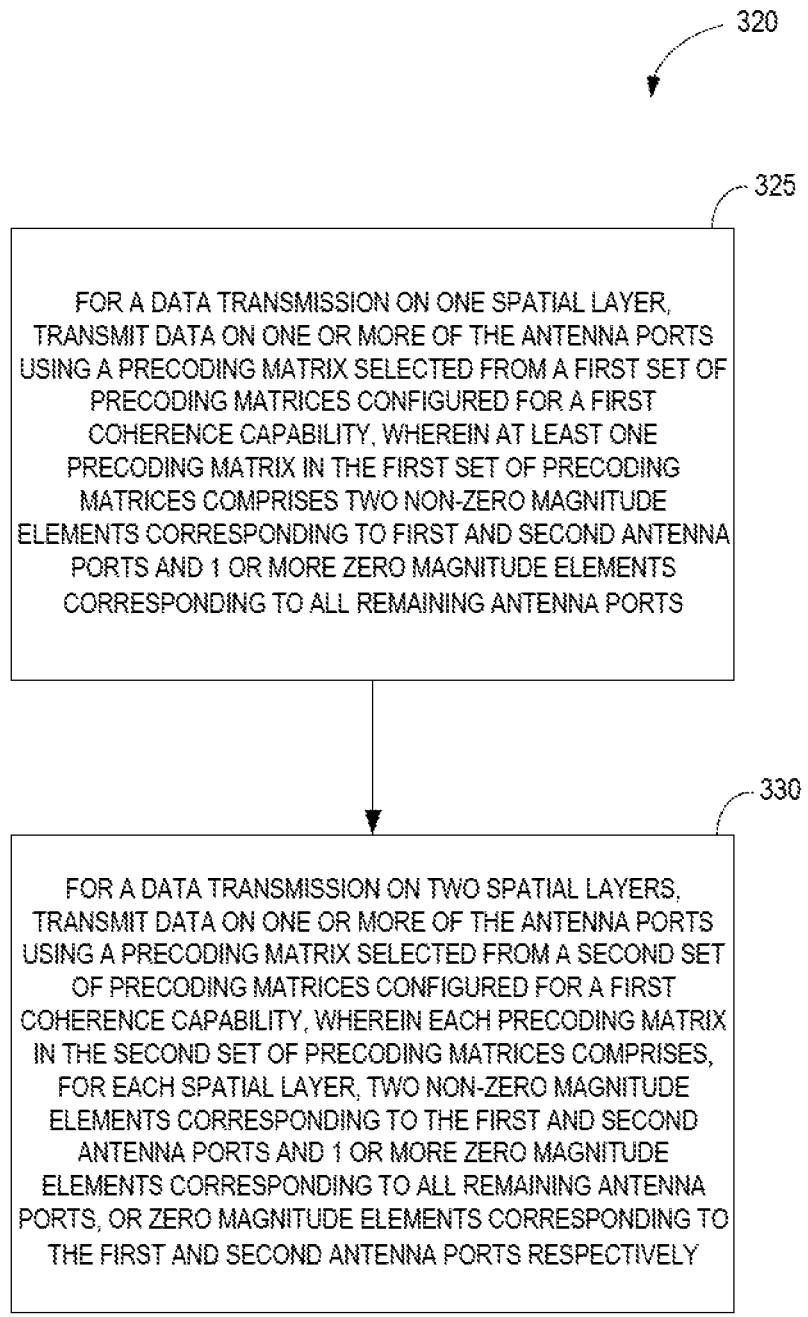
FIG. 8 illustrates an exemplary method of data transmission implemented by a user equipment.

FIG. 8 illustrates another method 320 for transmitting data from the UE 200 to a base station 100 in a wireless communication network according to another embodiment. The method 320 is implemented by a UE 200 having multiple antenna ports connected to an antenna array. Generally, the UE 200 uses a first set of preceding matrices for a single layer data transmission over two or more antenna ports and a second set of precoding matrices for a data transmission over two spatial layers. For a data transmission on one spatial layer, the UE 200 transmits data on one or more of the antenna ports using a precoding matrix selected from a first set of precoding matrices configured for a first coherence capability (block 325). At least one preceding matrix in the first set of precoding matrices comprises two non-zero magnitude elements corresponding to first and second antenna ports and zero magnitude element corresponding all remaining antenna ports. For a data transmission on two spatial layers, the UE 200 transmits data an one or more of the antenna elements using a precoding matrix selected from a second set of precoding matrices configured for the first coherence capability (block 330). Each preceding matrix in the second set of precoding matrices comprises, for each spatial layer, two non-zero magnitude elements corresponding to the first and second antenna ports, and zero magnitude element corresponding all remaining antenna ports, or zero magnitude elements corresponding to the first and second antenna ports respectively.

Some embodiments of the method 320 further comprise transmitting data on three spatial layers. For a data transmission on three spatial layers, the UE 200 transmits data on one or more of the antenna elements using a precoding matrix selected from a third set of precoding matrices configured for a first coherence capability. Each precoding matrix in the third set of precoding matrices comprises, for each spatial layer, two non-zero magnitude elements corresponding to the first and second antenna ports and zero magnitude elements corresponding to all remaining antenna ports, or a single non-zero magnitude element.

In some embodiments of the method 320, the UE 200 transmits data over three or antenna ports. For a data transmission on one spatial layer, the UE 200 transmits data on one or more of the antenna ports using a precoding matrix selected from a fourth set of precoding matrices configured for a second coherence capability. Each precoding matrix in the fourth set of precoding matrices comprises non-zero magnitude elements for all antenna ports. For a data transmission on two spatial layers the UE 200 transmits data on one or more of the antenna ports using a precoding matrix selected from a fifth set of precoding matrices configured for the second coherence capability. Each precoding matrix in the fifth set of precoding matrices comprises, for each spatial layer, one non-zero magnitude element corresponding to one of said first and second antenna ports, one non-zero magnitude element corresponding to a third antenna port, and zero magnitude elements for all remaining antenna ports.

In some embodiments of the method 320, the first coherence capability corresponds to a partially coherent transmission capability.

In some embodiments of the method 320, the second coherence capability corresponds to a fully coherent transmission capability.

In some embodiments of the method 320, the first coherence capability corresponds to a fully coherent transmission capability.

Figure 9:
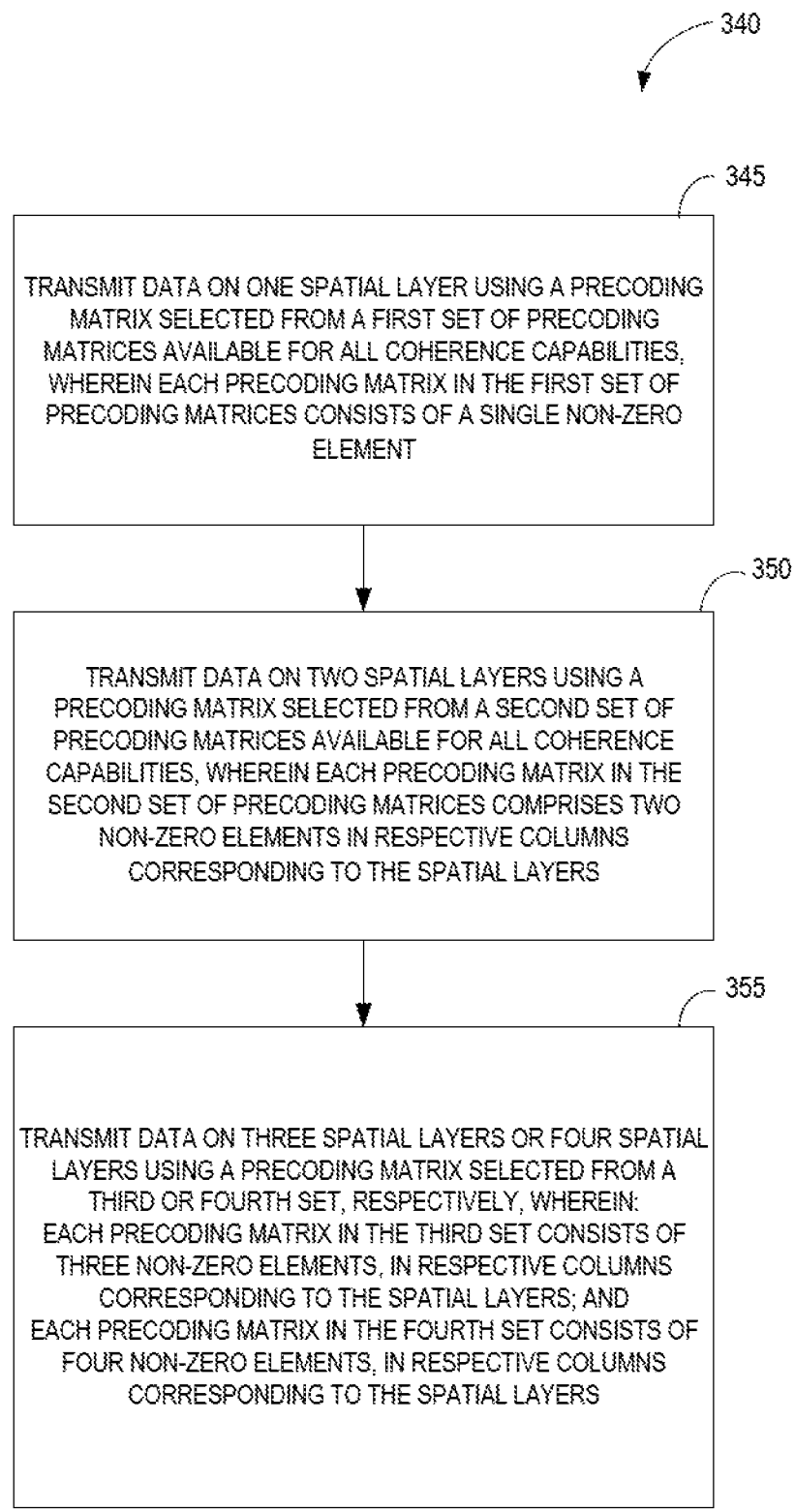
FIG. 9 illustrates an exemplary method of data transmission implemented by a user equipment.

Some embodiments of the method 320 further comprise indicating, by UE 200, a coherence capability of the UE 200 to the base station 100. In some embodiments, when the UE 200 indicates a coherence capability, the UE 200 transmits data transmission in accordance with the indicated coherence capability or a lower coherence capability FIG. 9 illustrates an exemplary method 340 for transmitting data from the UE 200 to a base station 100 in a wireless communication network according to another embodiment. The method 340 is implemented by a UE 200 having multiple antenna ports connected to an antenna array. Generally, the UE 200 transmits data on one, two or three spatial layers. For a data transmission on one spatial layer, the UE 200 transmits data on one spatial layer using a precoding matrix selected from a first set of precoding matrices available for all coherence capabilities (block 345). Each precoding matrix in the first set of precoding matrices consists of a single non-zero element. For a data transmission on two spatial layers, the UE 200 transmits data on two spatial layers using a precoding matrix selected from a second set of precoding matrices available for all coherence capabilities (block 350). Each precoding matrix in the second set of precoding matrices comprises two non-zero elements in respective columns corresponding to the spatial layers. For a data transmission on three spatial layers or four spatial layers, the UE 200 transmits data using a precoding matrix selected from a third or fourth set of precoding matrices, respectively (block 355). Each precoding matrix in the third set consists of three non-zero elements, in respective columns corresponding to the spatial layers. Similarly, each preceding matrix in the fourth set consists of four non-zero elements, in respective columns corresponding to the spatial layers.

In some embodiments of the method 340, the first, second and third sets of precoding matrices are available for all coherence capabilities.

In some embodiments of the method 340, a number of precoding matrices in the first set equals the number of available antenna ports for data transmission.

In some embodiments of the method 340, the number of precoding matrices in the second set equals the number of possible antenna port pairs of the available antenna ports;

In some embodiments of the method 340, each precoding matrix in the fourth set consists of four non-zero elements, in respective columns corresponding to the spatial layers.

Figure 10:
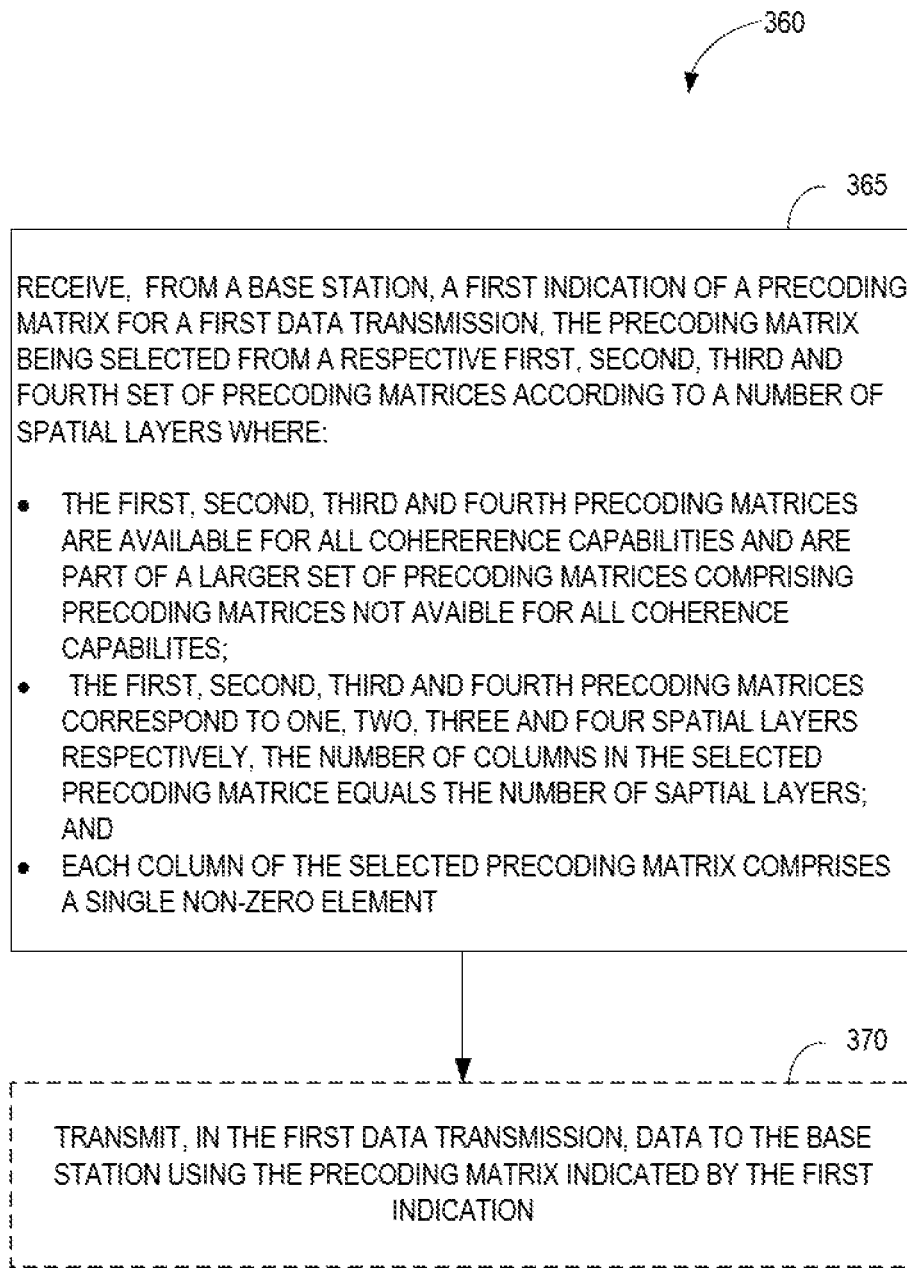
FIG. 10 illustrates an exemplary method of data transmission implemented by a user equipment.

FIG. 10 illustrates an exemplary method 360 for transmitting data from the UE 200 to a base station 100 in a wireless communication network according to another embodiment. The method 490 is implemented by a UE 200 having multiple antenna ports connected to an antenna array. The UE 200 receives, from a base station, a first indication of a precoding matrix available for a non-coherent data transmission (block 365). The preceding matrix is selected from a respective first, second, third, or fourth set of precoding matrices according to a number of spatial layers. The first, second, third, and fourth sets of precoding matrices are available for all coherence capabilities and are comprised within a larger set of precoding matrices. The larger set of precoding matrices comprises preceding matrices that are not available for all coherence capabilities. The first, second, third, and fourth sets of precoding matrices correspond to one, two, three, or four spatial layers, respectively. The number of columns in the selected precoding matrix is equal to the number of spatial layers and each column comprises a single non-zero element and one or more zero elements. The UE 200 transmits data to the base station 100 using the selected precoding matrix (block 370).

In some embodiments of the method 360, the UE 200 further receives a second indication of a precoding matrix available for a partially coherent data transmission, but not for a non-coherent data transmission. The precoding matrix is selected according to a number of spatial layers. For a data transmission on one spatial layer, the precoding matrix is selected from a fifth set of precoding matrices, which fifth set is available for partially coherent data transmissions but not for non-coherent data transmissions. Each precoding matrix in the fifth set of precoding matrices comprises two non-zero magnitude elements and at least one zero magnitude element. For a data transmission on two spatial layers, the precoding matrix is selected from a sixth set of precoding matrices, which sixth set is available for partially coherent data transmission but not for a non-coherent data transmission. Each precoding matrix in the sixth set of precoding matrices comprises a first and a second column corresponding to respective spatial layers and wherein each column comprises two non-zero magnitude elements and at least one zero magnitude element. The UE 200 transmits, in a second data transmission, data on two or more of the antenna ports using the precoding matrix indicated by the second indication.

In some embodiments of the method 360, the UE 200 further receives a third indication of a precoding matrix available for a fully coherent data transmission, but not for a partially coherent data transmission or a non-coherent data transmission. For a data transmission on one spatial layer, the precoding matrix is selected from a seventh set of precoding matrices, which seventh set is available for fully coherent data transmissions but not for partially coherent or non-coherent data transmission. Each precoding matrix in the seventh set of precoding matrices comprises three or more non-zero magnitude elements. The UE 200 transmits, in a third data transmission, data on three or more of the antenna ports using the precoding matrix indicated by the third indication.

In some embodiments of the method 360, the precoding matrix is selected from one of an eighth and ninth set of precoding matrices available for a fully coherent data transmission on Iwo or three spatial layers. The eighth and ninth sets of precoding matrices comprise downlink precoding matrices obtainable according to a predetermined construction rule for constructing rank 2 and rank 3 downlink precoders. The predetermined construction rule uses an oversampling factor of 2. The eighth set of precoding matrices comprises fewer than 32 precoding matrices. In some embodiments, the construction rule comprises a construction that was first used in NR for 3GPP release 15 for rank 2 and rank 3 downlink precoders, respectively, wherein the construction uses an oversampling factor, O, set to O=2 and a variable, i1,3, set to i1,3=0.

In some embodiments of the method 360, the precoding matrix is selected from a tenth set of precoding matrices, which tenth set is available for fully coherent data transmission but not for partially coherent or non-coherent data transmission. Each precoding matrix in the tenth set of precoding matrices comprises a first and a second column corresponding to respective spatial layers, wherein each column comprises two non-zero magnitude elements. The third data transmission comprises a data transmission on two spatial layers on three or more of the antenna ports.

In some embodiments of the method 360, the UE 200 further receives a second indication of a precoding matrix configured for a partially coherent data transmission. The precoding matrix is selected according to a number of spatial layers. For a data transmission on one spatial layer, the preceding matrix is selected from a fifth set of preceding matrices configured for a partially coherent data transmission. At least one precoding matrix in the fifth set of precoding matrices comprises two non-zero magnitude elements corresponding to first and second antenna ports and one or more zero magnitude elements corresponding to all remaining antenna ports. For a data transmission on two spatial layers, the precoding matrix is selected from a sixth set of precoding matrices configured for a partially coherent data transmission. Each precoding matrix in the sixth set of preceding matrices comprises a first and a second column corresponding to respective spatial layers and wherein each column comprises two non-zero magnitude elements and at least one zero magnitude element. The UE 200 transmits, in a second data transmission, data on one or more of the antenna ports using the precoding matrix indicated by the second indication.

In some embodiments, each preceding matrix in the sixth set of precoding matrices is equivalent to a corresponding preceding matrix in a set of legacy uplink preceding matrices for rank 2 with a pair of rows of the legacy preceding matrix being swapped, the legacy precoding matrices being matrices used in LTE release 10 for transmission by UEs 200.

In some embodiments of the method 360, the precoding matrix for the second data transmission is selected from an eleventh set of precoding matrices. Each precoding matrix in the eleventh set of precoding matrices comprises, for each spatial layer, two non-zero magnitude elements corresponding to the first and second antenna ports and zero magnitude elements corresponding to all remaining antenna ports, or a single non-zero magnitude element.

In some embodiments of the method 360, the UE 200 further receives a third indication of a precoding matrix configured for a fully coherent data transmission. The precoding matrix is selected according to a number of spatial layers. For a data transmission on one spatial layer, the precoding matrix is selected from a twelfth set of precoding matrices. Each precoding matrix in the twelfth set of precoding matrices comprises non-zero magnitude elements for all antenna ports. The UE 200 transmits, in a third data transmission, data on one or more of the antenna ports using the precoding matrix indicated by the third indication.

In some embodiments of the method 360, the UE 200 further indicates a coherence capability of the UE 200 to the base station 100 for a data transmission. In one examples, the data transmission is in accordance with the indicated coherence capability. In another examples, the data transmission is in accordance with the indicated coherence capability or a lower coherence capability.

Figure 11:
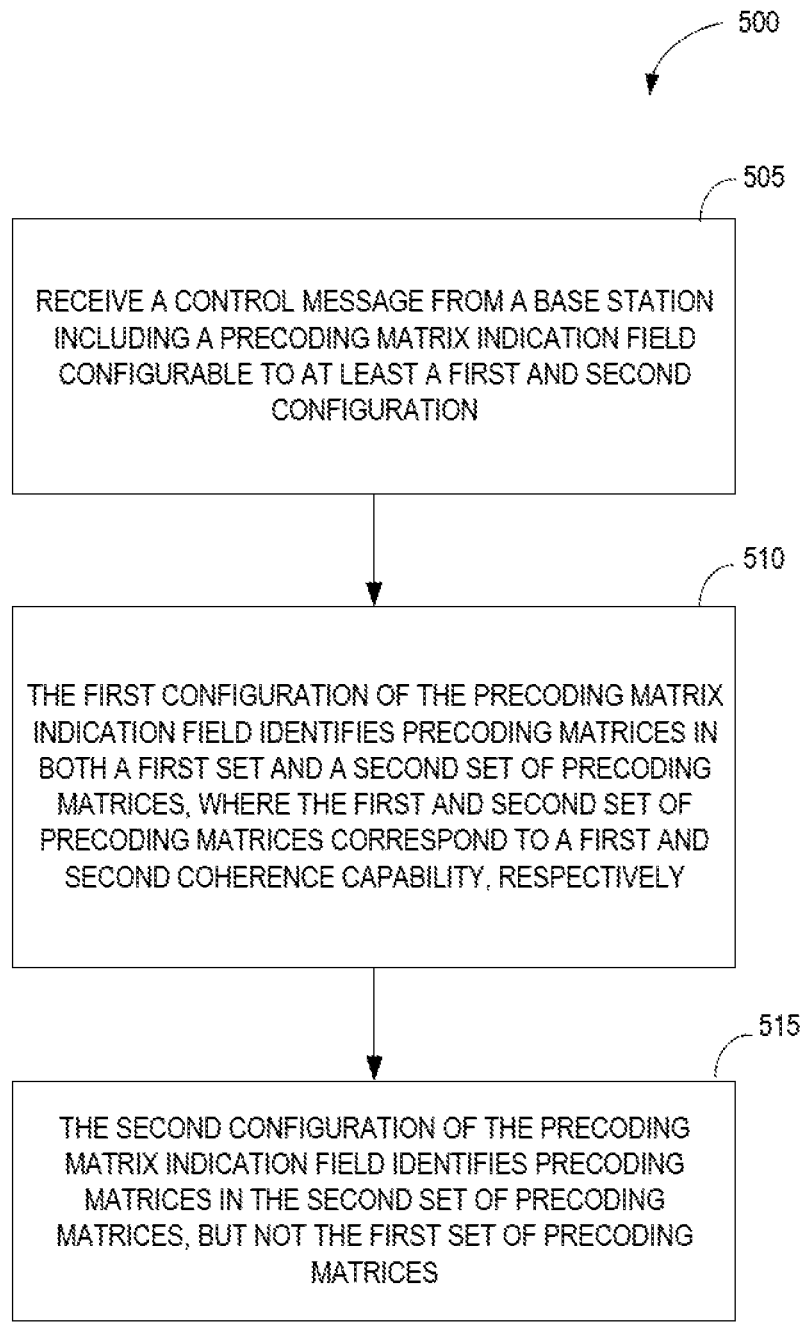
FIG. 11 illustrates an exemplary method of indicating a precoder matrix for a data transmission implemented by a user equipment.

FIG. 11 illustrates an exemplary method 500 implemented by the UE 200 for receiving signaling from a base station 100 in a wireless communication network indicating a precoder matrix for an uplink transmission. The method 500 is implemented by a UE 200 having multiple antenna ports connected to an antenna array. The UE 200 receives a control message from a base station 100 including a precoding matrix indication field configurable to at least a first and second configuration (block 505). The first configuration of the precoding matrix indication field identifies precoding matrices in both a first set and a second set of precoding matrices, where the first and second set of precoding matrices correspond to a first and second coherence capability, respectively (block 510). The second configuration of the precoding matrix indication field identifies precoding matrices in the second set of precoding matrices, but not the first set of precoding matrices (block 515).

In some embodiments of the method 500 the UE 200 transmits data over two or more antenna ports according to a precoding matrix indicated by a precoding matrix indicator contained in the precoding matrix indicator field.

In some embodiments of the method 500, the control message is received in higher protocol layer signaling, such as Radio Resource Control (RRC) signaling.

Figure 12:
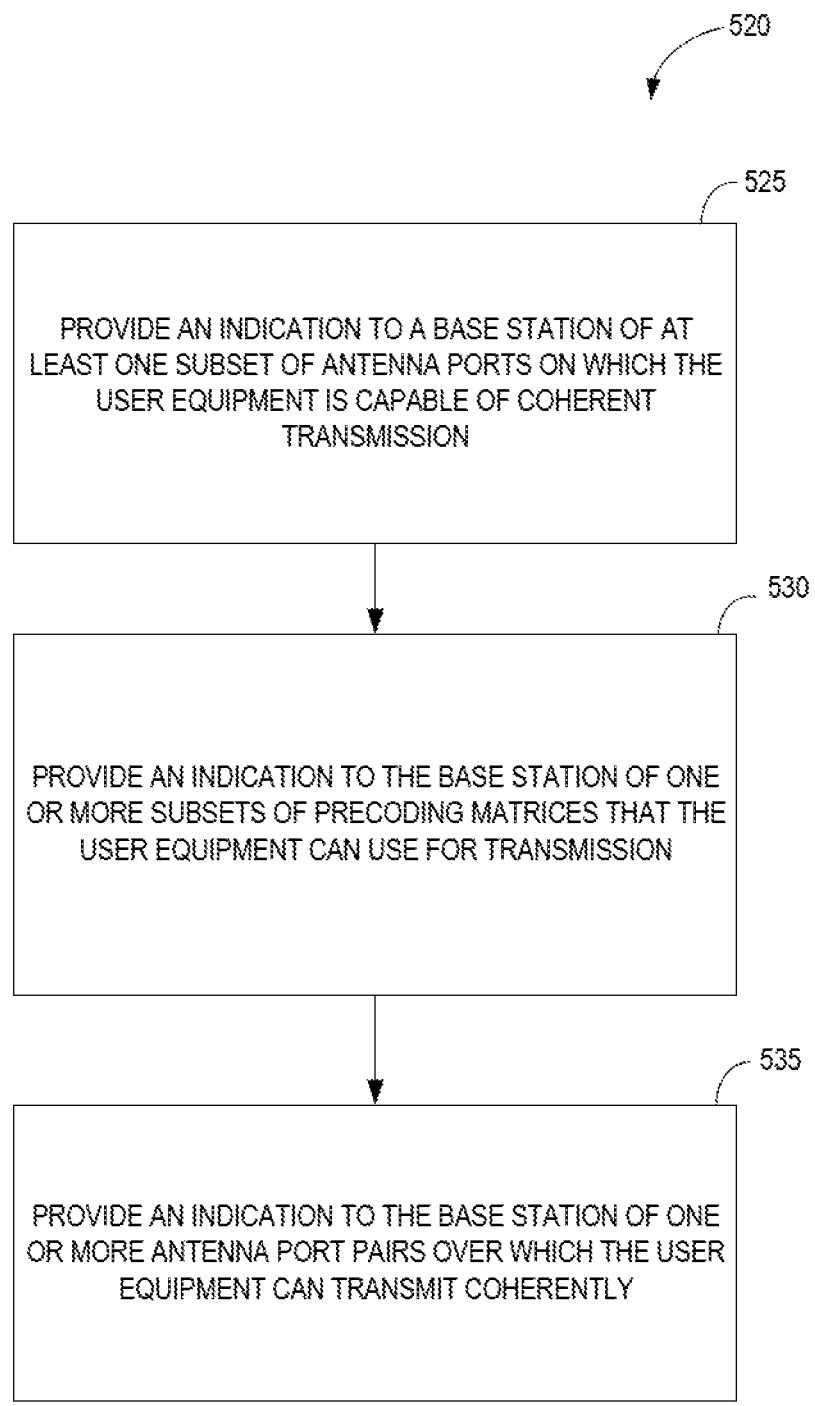
FIG. 12 illustrates an exemplary method of indicating a coherence capability for a data transmission implemented by a user equipment.

FIG. 12 illustrates an exemplary method 520 for indicating a coherence capability for a data transmission from the UE 200 to a base station 100 in a wireless communication network. The method 380 is implemented by UE 200 having multiple antenna ports connected to an antenna array. The UE 200 provides one or more of 1) an indication to a base station 100 of at least one subset of antenna ports on which the user equipment is capable of coherent transmission (block 525); 2) an indication to the base station 100 of one or more subsets of precoding matrices that the user equipment can use for transmission (block 530); or 3) an indication to the base station 100 of one or more antenna port pairs over which the user equipment can transmit coherently (block 535).

In some embodiments of the method 520, the indication of a subset of antenna ports on which the user equipment is capable of coherent transmission comprises an indication, for each of two or more frequency bands, of the antenna ports on which the user equipment is capable of coherent transmission for the respective frequency band.

In some embodiments of the method 520, the indication of the number of subsets of precoding matrices that the user equipment can use for transmission comprises an indication, for each of two or more frequency bands, of the number of subsets of precoding matrices that the user equipment can use for the respective frequency band.

In some embodiments of the method 520, the indication of a number of antenna port pair over which the user equipment can transmit coherently comprises an indication, for each of two or more frequency bands, of the number of antenna port pairs over which the user equipment can transmit coherently for the respective frequency band.

Some embodiments of the method 520 further comprise transmitting data over two or more antenna ports according to the indication.

FIGS. 13-18 illustrate complementary methods performed by a base station 100 corresponding respectively to the methods of FIGS. 7-12 respectively.

Figure 13:
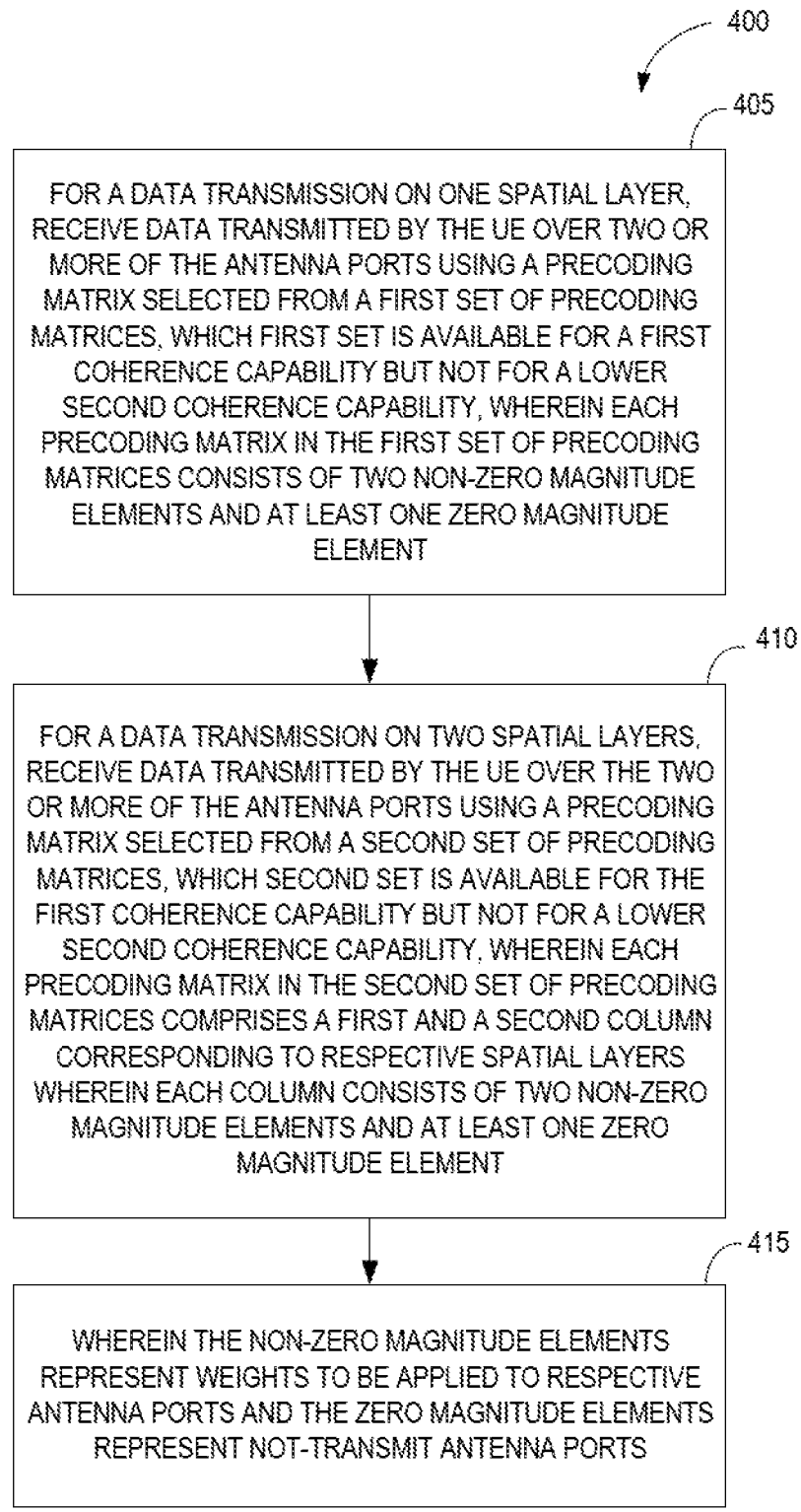
FIG. 13 illustrates an exemplary method of data transmission implemented by a base station of receiving data from a UE.

FIG. 13 illustrates an exemplary method 400 implemented by a base station 100 in a wireless communication network 10 for receiving data from the UE 200. For a data transmission on one spatial layer, the base station 100 receives data transmitted by the UE 200 over two or more of the antenna ports using a precoding matrix selected from a first set of precoding matrices, which is available for the first coherence capability but not a lower second coherence capability (block 405). Each precoding matrix in the first set of precoding matrices consists of two non-zero magnitude elements and at least one zero magnitude element. For a data transmission on two spatial layers, the base station 100 receives data transmitted by the UE 200 over two or more of the antenna ports using a precoding matrix selected from the second set of precoding matrices, which is available for the first coherence capability but not for the lower second coherence capability (block 410). Each precoding matrix in the second set of preceding matrices comprises a first and a second column corresponding to respective spatial layers wherein each column consists of two non-zero magnitude elements and at least one zero magnitude element (block 415).

Figure 14:
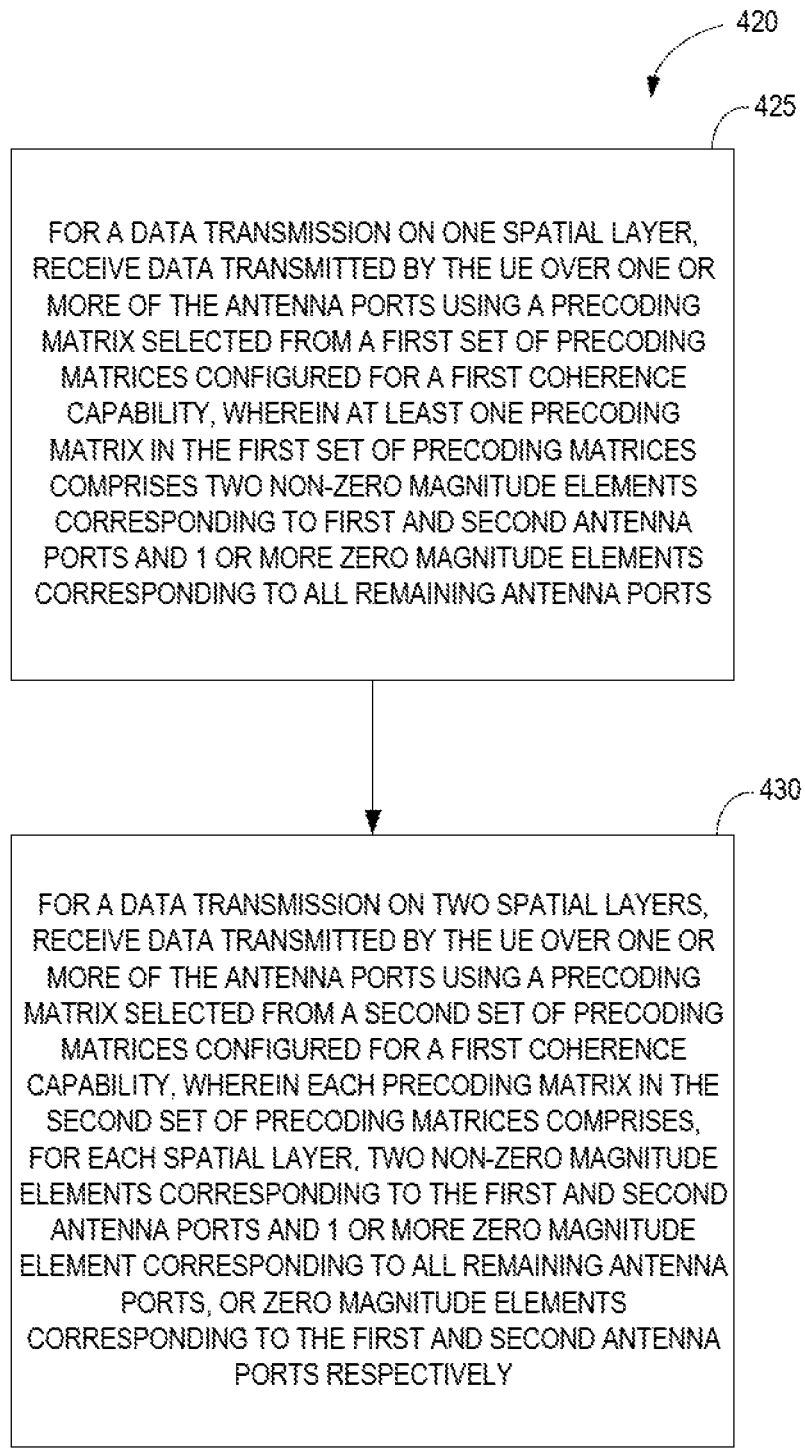
FIG. 14 illustrates an exemplary method of data transmission implemented by a base station of receiving data from a UE.

FIG. 14 illustrates an exemplary method 420 implemented by a base station 100 in a wireless communication network for receiving data from the UE 200. For a data transmission on one spatial layer, the base station 100 receives data transmitted by the UE 200 on one or more of the antenna ports using a precoding matrix selected from a first set of precoding matrices configured for a first coherence capability (block 425). At least one precoding matrix in the first set of precoding matrices comprises two non-zero magnitude elements corresponding to first and second antenna ports and one or more zero magnitude elements corresponding to all remaining antenna ports. For a data transmission on two spatial layers, the base station 100 receives data transmitted by the UE 200 on one or more of the antenna elements using a precoding matrix selected from a second set of preceding matrices configured for the first coherence capability (block 430). Each precoding matrix in the second set of precoding matrices comprises, for each spatial layer, two non-zero magnitude elements corresponding to the first and second antenna ports and one or more zero magnitude elements corresponding to all remaining antenna ports, or zero magnitude elements corresponding to the first and second antenna ports respectively.

Figure 15:
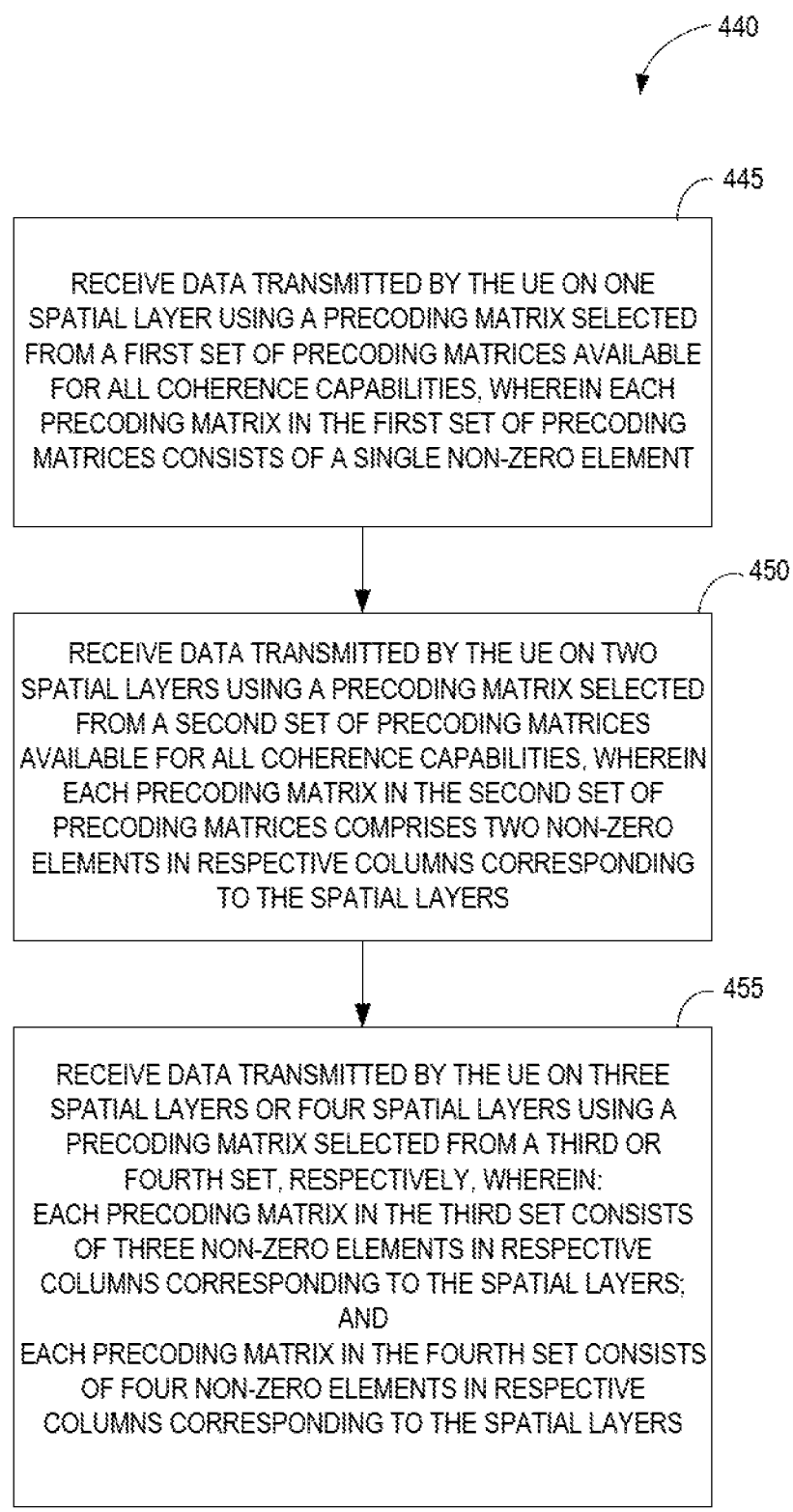
FIG. 15 illustrates an exemplary method of data transmission implemented by a base station of receiving data from a UE.

FIG. 15 illustrates an exemplary method 440 implemented by a base station 100 in a wireless communication network for receiving data from the UE 200. For a data transmission on one spatial layer, the base station 100 receives data transmitted by the UE 200 on one spatial layer using a precoding matrix selected from a first set of precoding matrices available for all coherence capabilities (block 445). Each precoding matrix in the first set of precoding matrices consists of a single non-zero element. For a data transmission on two spatial layers, the base station 100 receives data transmitted by the UE 200 on two spatial layers using a precoding matrix selected from a second set of preceding matrices available for all coherence capabilities (block 450). Each precoding matrix in the second set of precoding matrices comprises two non-zero elements in respective columns corresponding to the spatial layers. For a data transmission on three spatial layers or four spatial layers, the base station 100 receives data transmitted by the UE 200 using a precoding matrix selected from a third or fourth set of precoding matrices, respectively (block 455). Each precoding matrix in the third set consists of three non-zero elements, in respective columns corresponding to the spatial layers. Similarly, each precoding matrix in the fourth set consists of four non-zero elements, in respective columns corresponding to the spatial layers.

Figure 16:
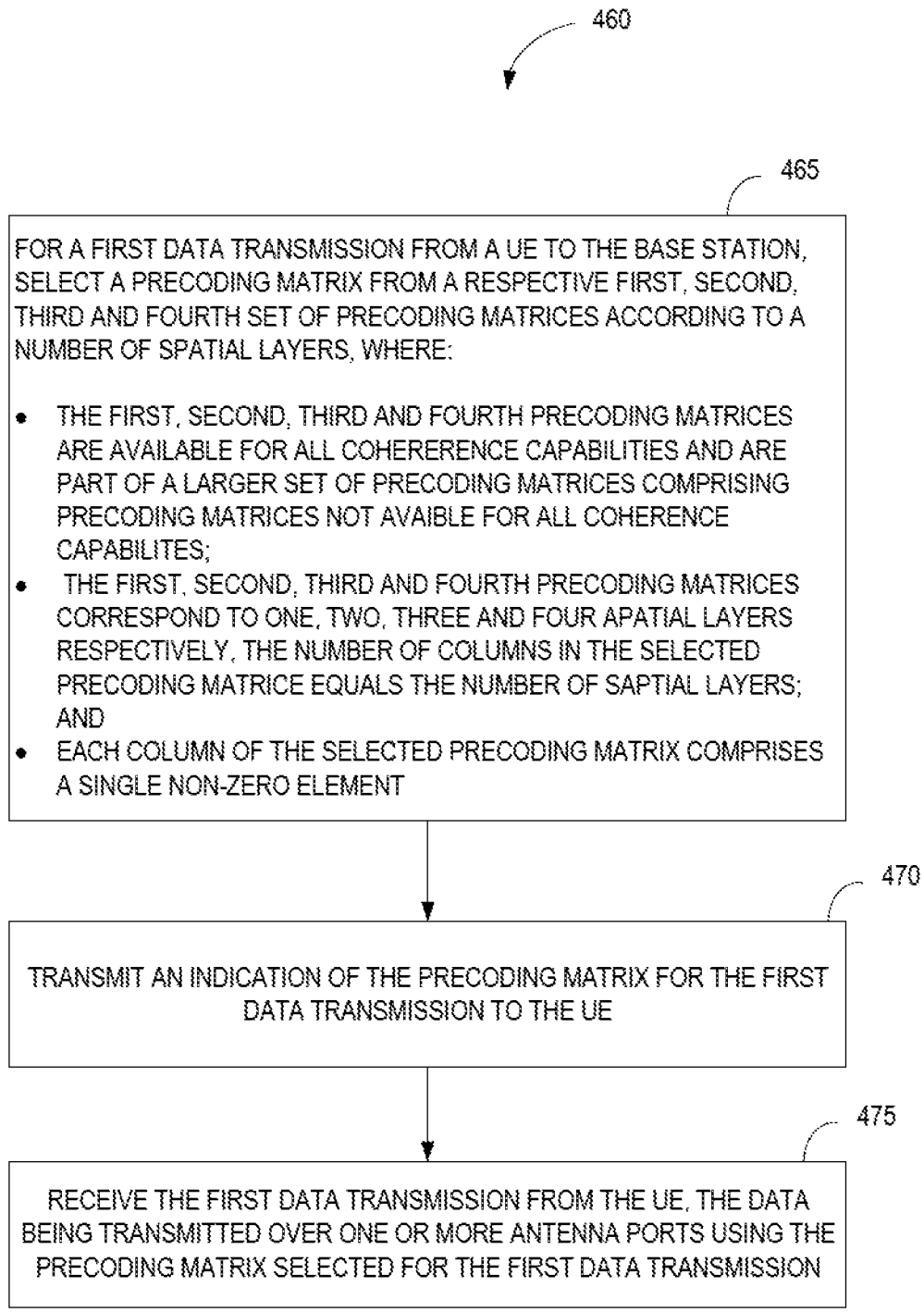
FIG. 16 illustrates an exemplary method of data transmission implemented by a user equipment.

FIG. 16 illustrates an exemplary method 460 implemented by a base station 100 in a wireless communication network 10 for receiving data from the UE 200. The base station 100 selects, for a first data transmission, a precoding matrix from a respective first, second, third, or fourth set of precoding matrices according to a number of spatial layers (block 465), The first, second, third, and fourth sets of precoding matrices are available for all coherence capabilities and are comprised within a larger set of precoding matrices. The larger set of precoding matrices comprises precoding matrices that are not available for all coherence capabilities. The first, second, third, and fourth sets of preceding matrices correspond to one, two, three, or four spatial layers, respectively. The number of columns in the selected precoding matrix is equal to the number of spatial layers and each column comprises a single non-zero element and one or more zero elements. The base station 100 further transmits an indication of the selected precoding matrix to UE 200 (block 470). The base station 100 further receives the first data transmission, the data being transmitted by the UE 200 over one or more antenna ports using the preceding matrix selected for the first data transmission (block 475).

In some embodiments of the method 460, the base station 100 selects, for a second data transmission, a precoding matrix available for a first coherence capability but not for a lower coherence capability according to a number of spatial layers. For a data transmission on one spatial layer, the base station 100 selects the precoding matrix for the second data transmission from a fifth set of precoding matrices, which fifth set is available for a first coherence capability but not for a lower second coherence capability. Each precoding matrix in the fifth set of preceding matrices comprises two non-zero magnitude elements and at least one zero magnitude element. For a data transmission on two spatial layers, the base station 100 receives data transmitted by the UE 200 over the two or more of the antenna ports using a precoding matrix selected from a sixth set of precoding matrices, which sixth set is available for the first coherence capability but not for a lower second coherence capability. Each precoding matrix in the sixth set of precoding matrices comprises a first and a second column corresponding to respective spatial layers wherein each column comprises two non-zero magnitude elements and at least one zero magnitude element. The non-zero magnitude elements represent weights to be applied to respective antenna ports and the zero magnitude elements represent not-transmitting antenna ports. The base station 100 further transmits an indication of the precoding matrix selected for the second data transmission to UE 200 and receives the second data transmission, the data being transmitted by the UE 200 over two or more antenna ports using the precoding matrix selected for the second data transmission.

In some embodiments of the method 460, the base station 100 selects, for a second data transmission, a precoding matrix configured for a partially coherent precoding matrix according to a number of spatial layers. For a partially coherent data transmission on one spatial layer, the base station 100 receives data transmitted by the UE 200 over one or more of the antenna ports using a precoding matrix selected from a fifth set of precoding matrices configured for partially coherent data transmission. At least one precoding matrix in the fifth set of precoding matrices comprises two non-zero magnitude elements corresponding to first and second antenna ports and one or more zero magnitude element corresponding to all remaining antenna ports. For a partially coherent data transmission on two spatial layers, the base station 100 receives data transmitted by the UE 200 over one or more of the antenna ports using a precoding matrix selected from a sixth set of precoding matrices configured for partially coherent data transmission. Each precoding matrix in the sixth set of precoding matrices comprises, for each spatial layer, two non-zero magnitude elements corresponding to the first and second antenna ports and one or more zero magnitude element corresponding to all remaining antenna ports, or zero magnitude elements corresponding to the first and second antenna ports respectively. The base station 100 further transmits an indication of the precoding matrix selected for the second data transmission to UE 200 and receives the second data transmission, the data being transmitted by the UE 200 over two or more antenna ports using the precoding matrix selected for the second data transmission.

In some embodiments of the method 460, the base station 100 receives data transmitted by the UE 200 on one spatial layer using a precoding matrix selected from a first set of precoding matrices available for all coherence capabilities, wherein each precoding matrix in the first set of precoding matrices comprises a single non-zero element. The base station 100 further receives data transmitted by the UE 200 on two spatial layers using a precoding matrix selected from a second set of precoding matrices available for all coherence capabilities, wherein each precoding matrix in the second set of precoding matrices comprises two non-zero elements in respective columns corresponding to the spatial layers. The base station 100 further receives data transmitted by the UE 200 on three spatial layers or four spatial layers using a precoding matrix selected from a third or fourth set, respectively. Each precoding matrix in the third set comprises three non-zero elements, in respective columns corresponding to the spatial layers.

In some embodiments of the method 460, the base station 100 receives an indication from the UE 200 of a coherence capability of the UE 200 for a data transmission. In one examples, the data transmission received by the base station 100 is in accordance with the indicated coherence capability. In another examples, the data transmission received by the base station 100 is in accordance with the indicated coherence capability or a lower coherence capability.

Figure 17:
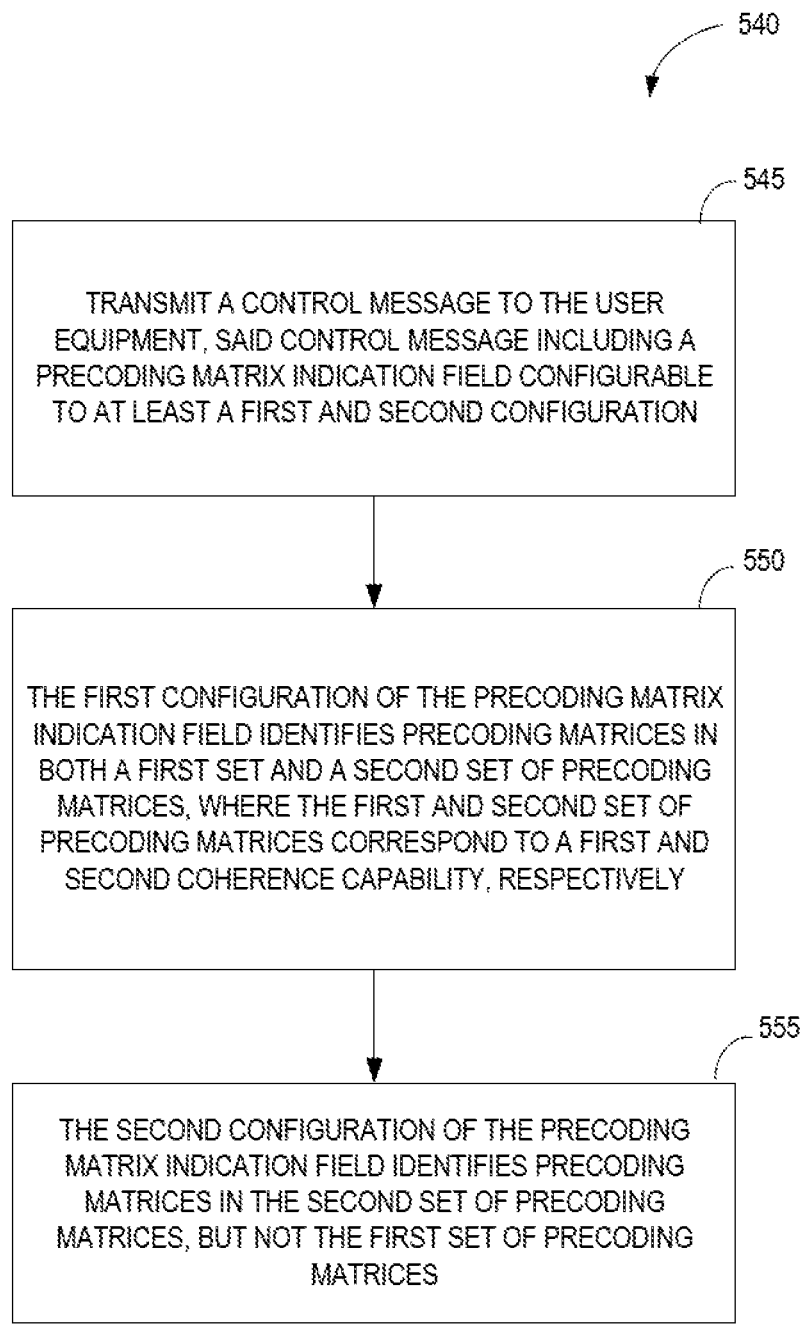
FIG. 17 illustrates an exemplary method of data transmission implemented by a base station of indicating a precoder for an uplink transmission from a UE to the base station.

FIG. 17 illustrates an exemplary method 540 implemented by a base station 100 in a wireless communication network 10 for signaling a precoding matrix to use for an uplink transmission to the UE 200. The base station 100 transmits a control message to the UE 200 including a precoding matrix indication field configurable to at least a first and second configuration (block 545). The first configuration of the precoding matrix indication field identifies precoding matrices in both a first set and a second set of preceding matrices, where the first and second set of precoding matrices correspond to a first and second coherence capability, respectively (block 550). The second configuration of the precoding matrix indication field identifies precoding matrices in the second set of precoding matrices, but not the first set of precoding matrices (block 555).

Figure 18:
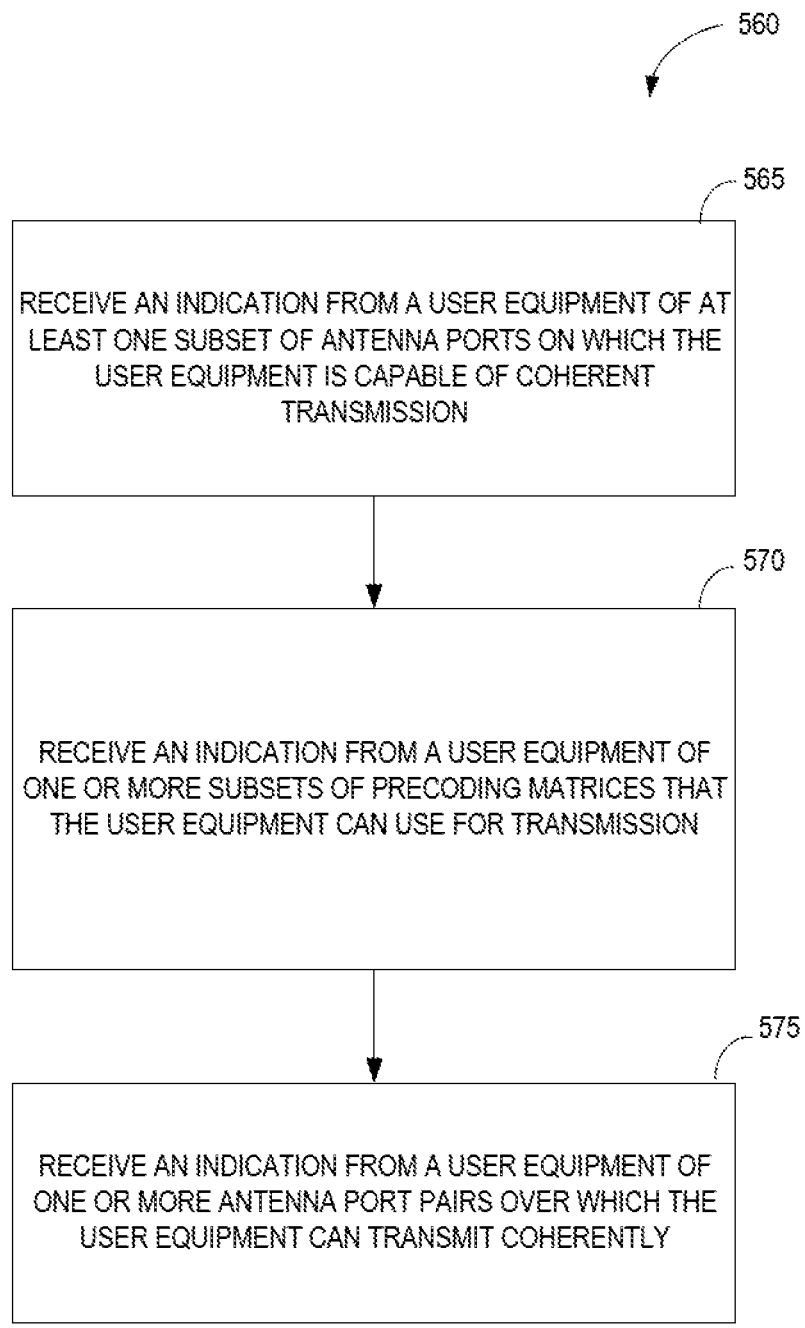
FIG. 18 illustrates an exemplary method of data transmission implemented by a base station of receiving from a UE, an indication of the UE coherence capability.

FIG. 18 illustrates an exemplary method 560 implemented by a base station 100 in a wireless communication network 10 for receiving a coherence capability from the UE 200. The base station 100 receives, from the UE 200, one or more of 1) an indication to a base station 100 of at least one subset of antenna ports on which the user equipment is capable of coherent transmission (block 565); 2) an indication of one or more subsets of precoding matrices that the user equipment can use for transmission (block 570); or an indication of one or more antenna port pairs over which the user equipment can transmit coherently (block 575).

An apparatus can be configured to perform any of the methods herein described by implementing any functional means, modules, units, or circuitry. In one embodiment, for example, the apparatus comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 19:
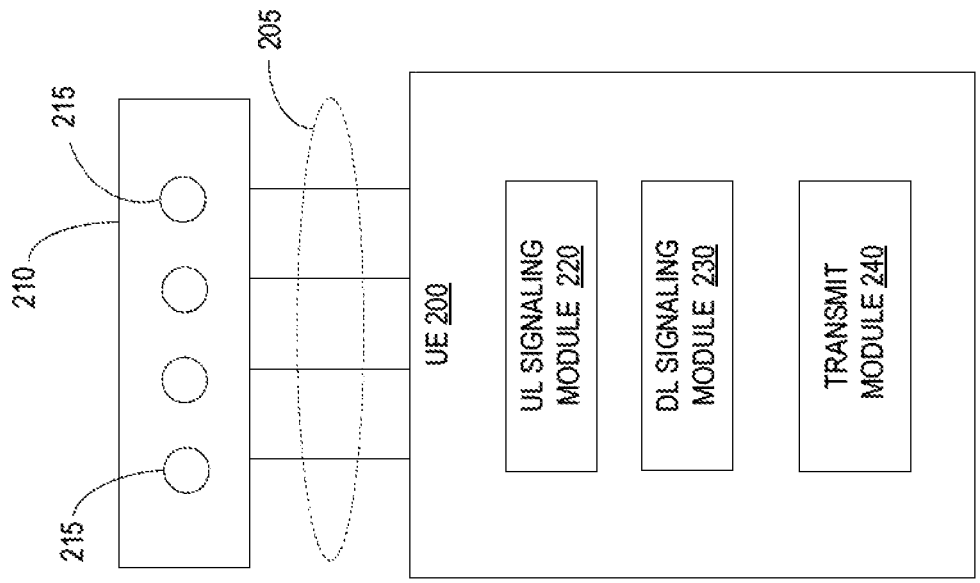
FIG. 19 illustrates an exemplary user equipment according to an embodiment.

FIG. 19 illustrates a UE 200 in accordance with one or more embodiments. The UE 400 comprises an antenna array 210 coupled to a plurality of antenna ports 205 and having multiple antenna elements 215, a UL signaling module 220 for signaling a coherence capability to the base station 100, a DL signaling module 230 for receiving the TPMI from the base station 100 for an uplink transmission, and a transmit module 240 for transmitting data to the base station 100 over one or more antenna ports 205 on an uplink channel, e.g., Physical Uplink Shared Channel (PUSCH). The various modules 220, 230, and 240 can be implemented by hardware and/or by software code that is executed by a processor or processing circuit. The UE 200 of FIG. 19 can be configured to perform any of the methods of FIGS. 7-12.

Figure 20:
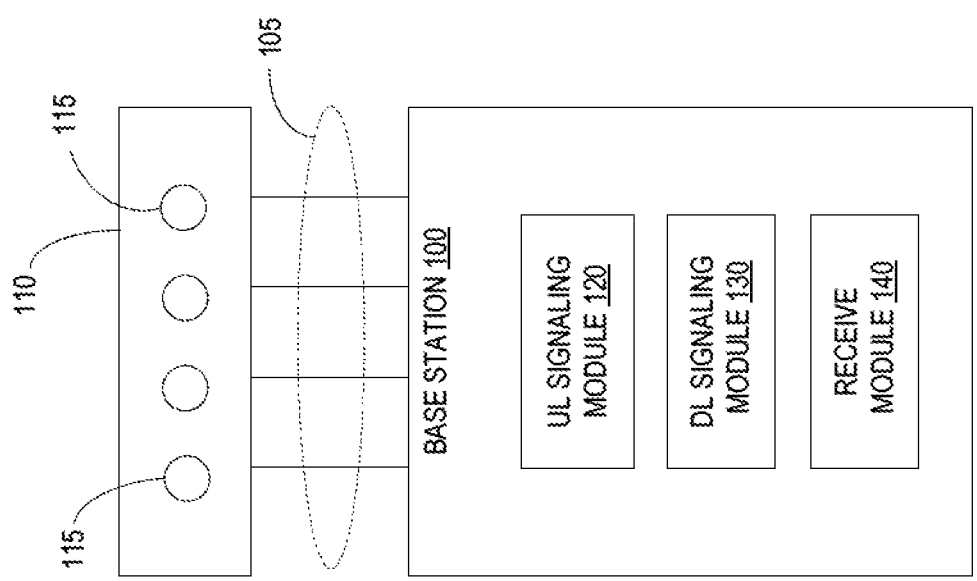
FIG. 20 illustrates an exemplary base station according to an embodiment.

FIG. 20 illustrates a base station 100 in accordance with one or more embodiments. The base station 100 comprises an antenna array 110 coupled to a plurality of antenna parts 115 and having multiple antenna elements 115, an UL signaling module 120 for receiving an indication from the UE 200 of the UE coherence capability. DL signaling module 120 for signaling the TPMI to the UE 200 for an uplink transmission, a DCI transmitting module 130 for transmitting DCI to the UE 200 on the primary DL carrier, and a receive module 140 for receiving UL data transmissions from the UE 200 on an uplink channel, e.g., PUSCH. The various modules 120, 130, and 140 can be implemented by hardware and/or by software code that is executed by a processor or processing circuit. The base station 100 of FIG. 20 can be configured to perform any of the methods of FIGS. 13-18.

Figure 21:
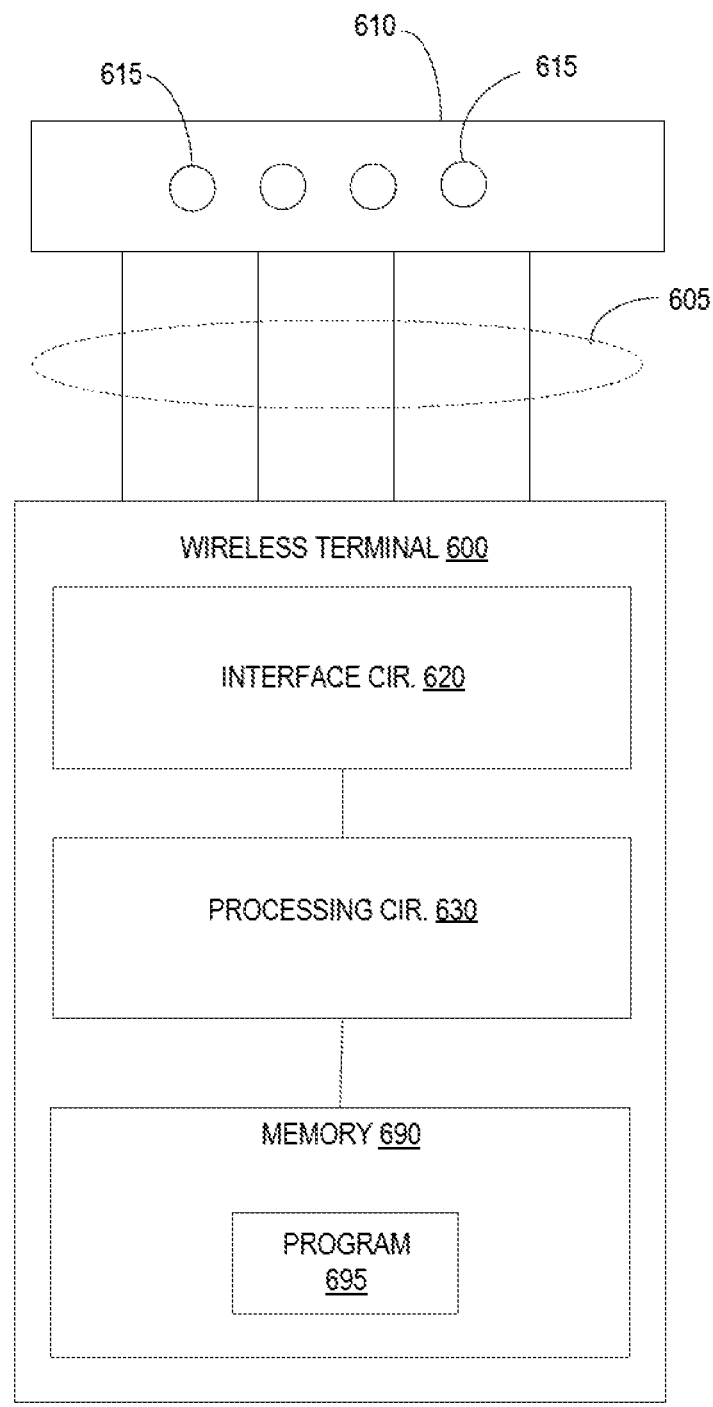
FIG. 21 illustrates an exemplary wireless terminal configured of transmitting of receiving an uplink transmission with variable coherence capability.

FIG. 21 illustrates a wireless terminal 600 according to one embodiment that may be configured to function as a base station 100 or UE 200 as herein described. The wireless terminal 600 comprises an antenna array 510 coupled to a plurality of antenna parts 605 multiple antenna elements 615, an interface circuit 620, a processing circuit 630, and memory 690.

The interface circuit 620620 is coupled to the antenna array 610 and comprises the radio frequency (RF) circuitry needed for transmitting and receiving signals over a wireless communication channel. The interface circuit 620 provides a plurality of antenna ports 505 for spatial multiplexing transmissions. The processing circuit 630 controls the overall operation of the wireless terminal 500 and processes the signals transmitted to or received by the wireless terminal 500. Such processing includes coding and modulation of transmitted data signals, and the demodulation and decoding of received data signals. The processing circuit 630 may comprise one or more microprocessors, hardware, firmware, or a combination thereof.

Memory 690 comprises both volatile and non-volatile memory for storing computer program code and data needed by the processing circuit 630 for operation. Memory 690 may comprise any tangible, non transitory computer-readable storage medium for storing data including electronic, magnetic, optical, electromagnetic, or semiconductor data storage. Memory 690 stores a computer program 695 comprising executable instructions that configure the processing circuit 630 to implement any of the methods according to FIGS. 7-18 as described herein. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, computer program 695 for configuring the processing circuit 630 as herein described may be stored in a removable memory, such as a portable compact disc, portable digital video disc, or other removable media. The computer program 695 may also be embodied in a carrier such as an electronic signal, optical signal, radio signal, or computer readable storage medium.

Figure 22:
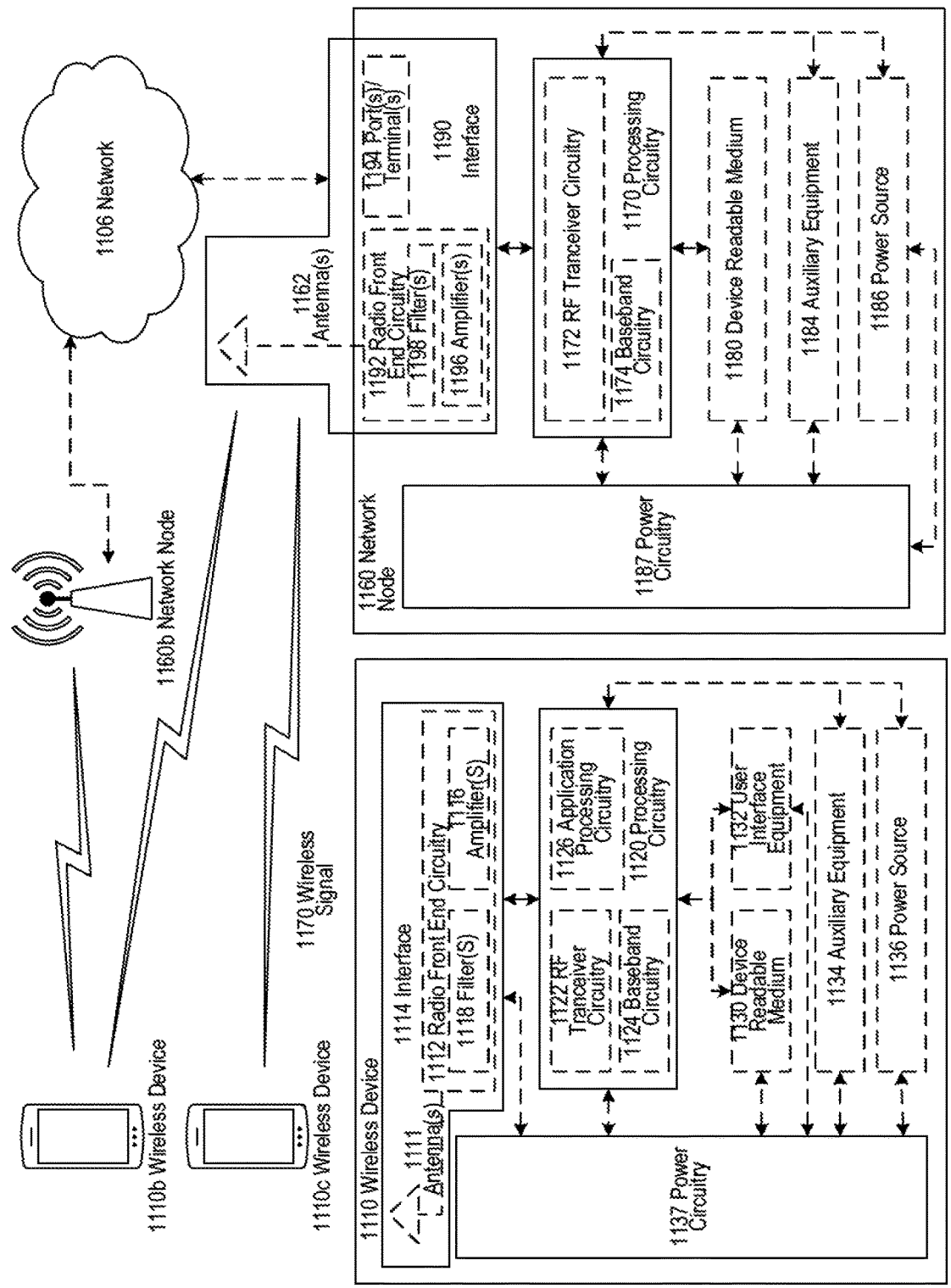
FIG. 22 illustrates an exemplary wireless network according to an embodiment.

Although the subject matter described herein may be implemented in any appropriate type of system using any suitable components, the embodiments disclosed herein are described in relation to a wireless network, such as the example wireless network illustrated in FIG. 22. For simplicity, the wireless network of FIG. 22 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Long Term Evolution (LTE), New Radio, Narrowband Internet of Things (NB-IoT), and/or other suitable 4G or 5G or higher standards and/or any other appropriate wireless communication standard.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 22, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 22 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises part(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RE transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 2 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, LTE, NR or NB-IoT wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes, or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WO. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 23:
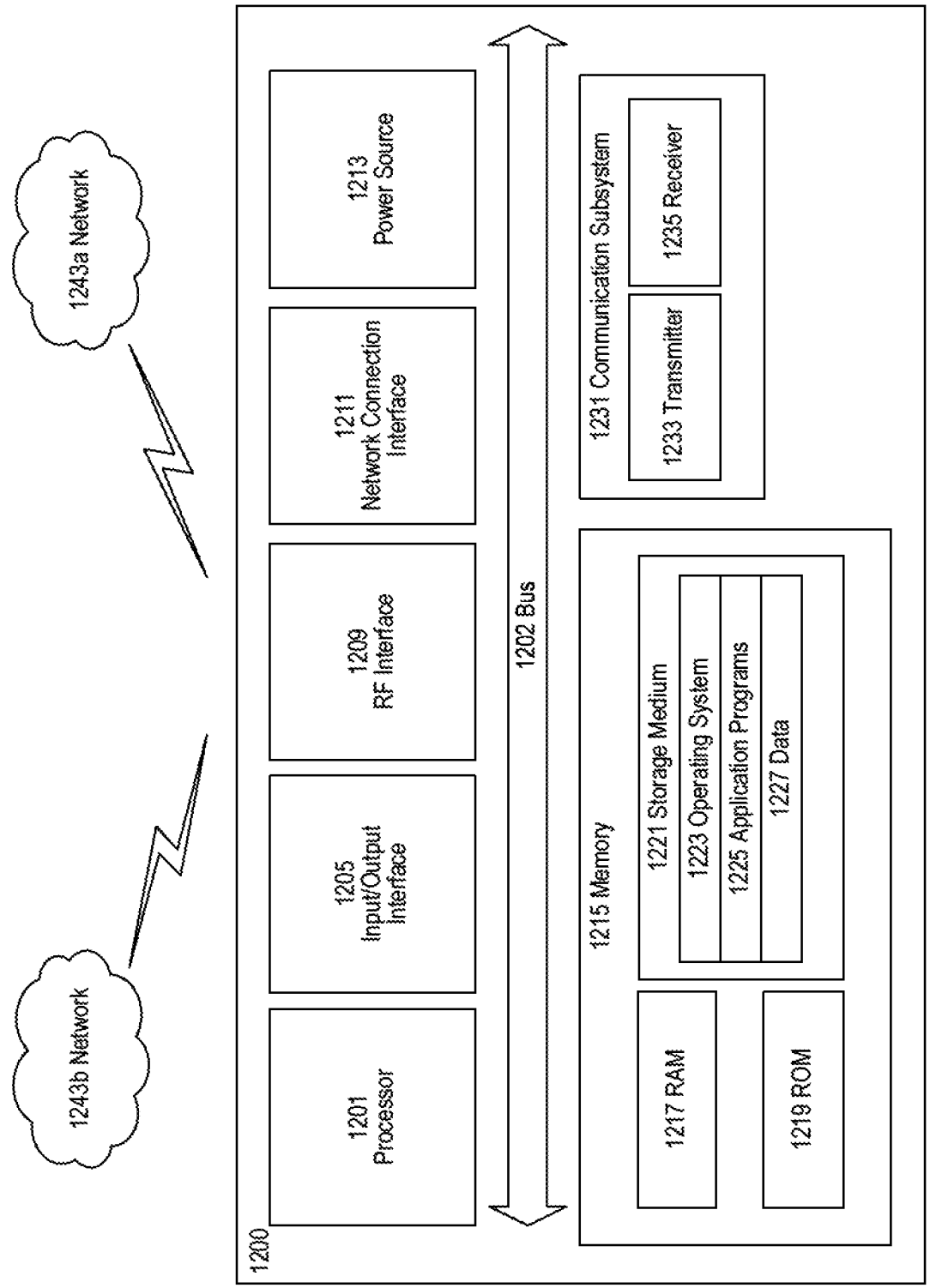
FIG. 23 illustrates an exemplary UE according to an embodiment.

FIG. 23 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 23, is one example of a WD configured for communication in accordance with one or more communication standards promulgated by the 3rd Generation Partnership Project (3GPP), such as 3GPP's LTE, and/or 5G standards. As mentioned previously, the term WD and UE may be used interchangeable. Accordingly, although FIG. 23 is a UE, the components discussed herein are equally applicable to a WD, and vice-versa.

In FIG. 23, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 23, or only a subset of the components. The level of integration between the components may vary from one UE to another UE. Further, certain UEs may contain multiple instances of a component, such as multiple processors, memories, transceivers, transmitters, receivers, etc.

In FIG. 23, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 23, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 23, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as WCDMA, LTE, UTRAN, NR, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 24:
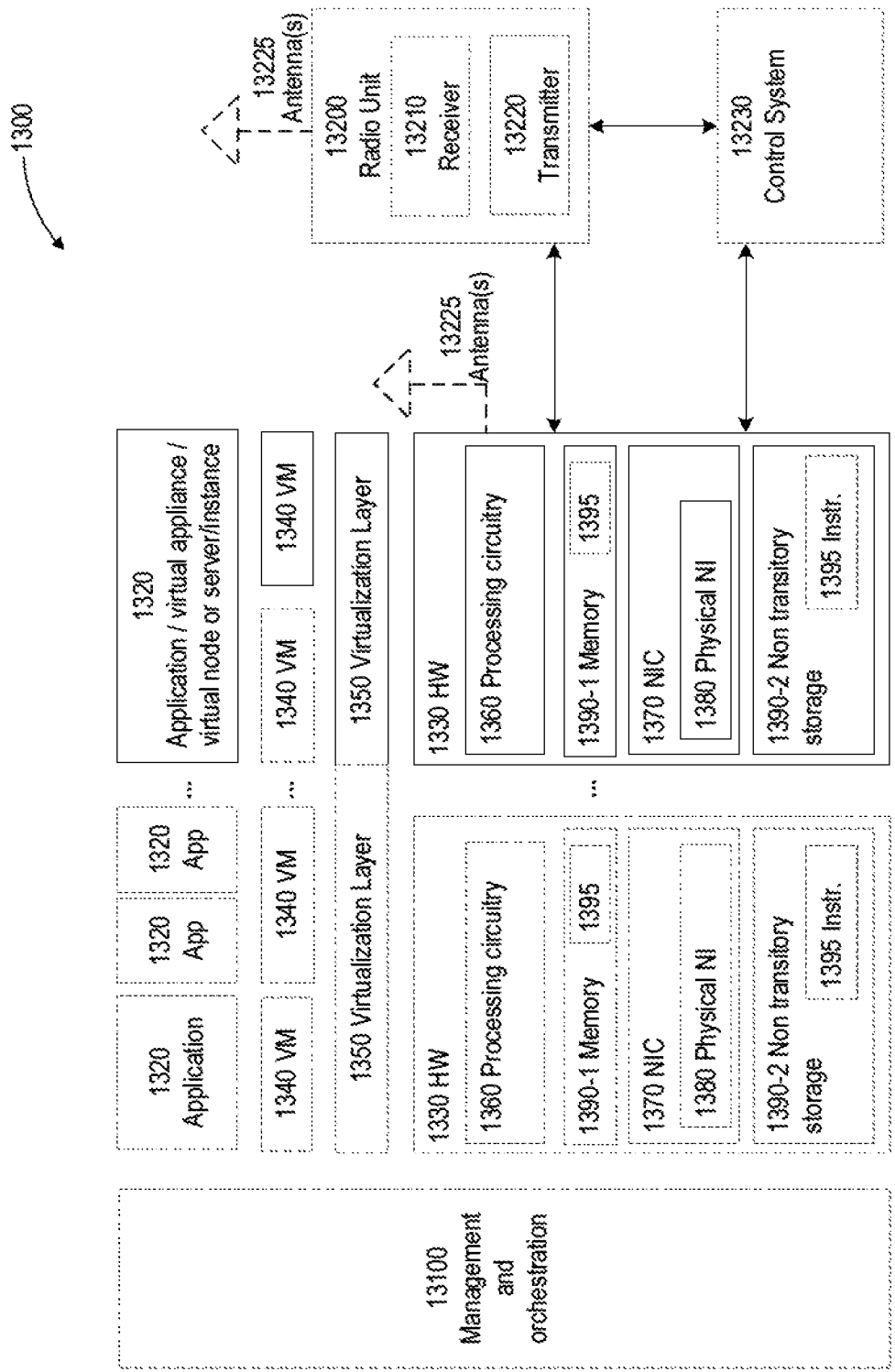
FIG. 24 illustrates an exemplary virtualization environment according to an embodiment.

FIG. 24 is a schematic, block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

Figure 25:
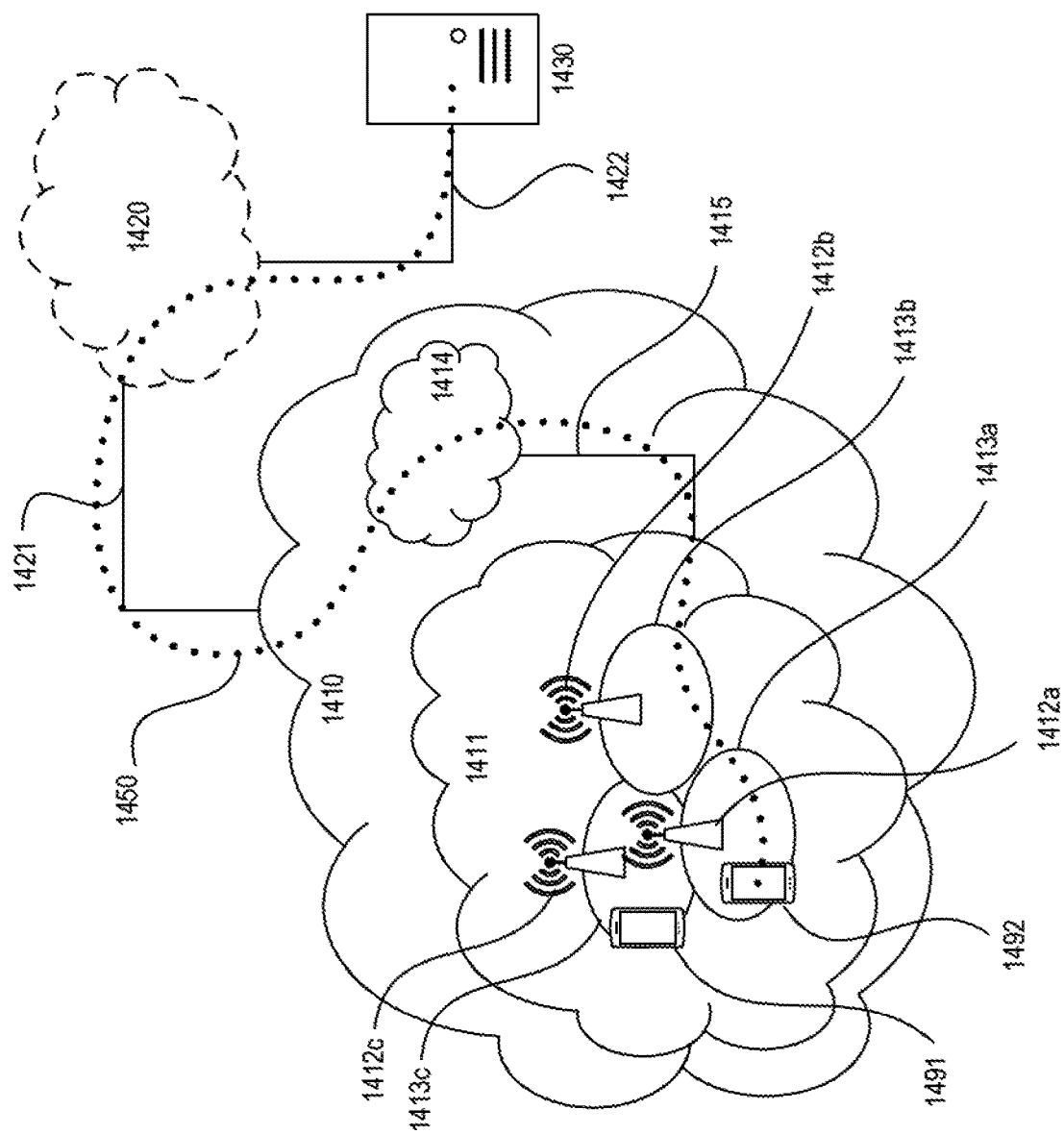
FIG. 25 illustrates an exemplary telecommunication network connected via an intermediate network to a host computer according to an embodiment.

FIG. 25 illustrates a telecommunication network connected via an intermediate network to a host computer in accordance with some embodiments. In particular, with reference to FIG. 23, in accordance with an embodiment, a communication system includes telecommunication network 1410, such as a 3GPP-type cellular network, which comprises access network 1411, such as a radio access network, and core network 1414. Access network 1411 comprises a plurality of base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*. 1412*b*. 1412*c* is connectable to core network 1414 over a wired or wireless connection 1415. A first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 25 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 26:
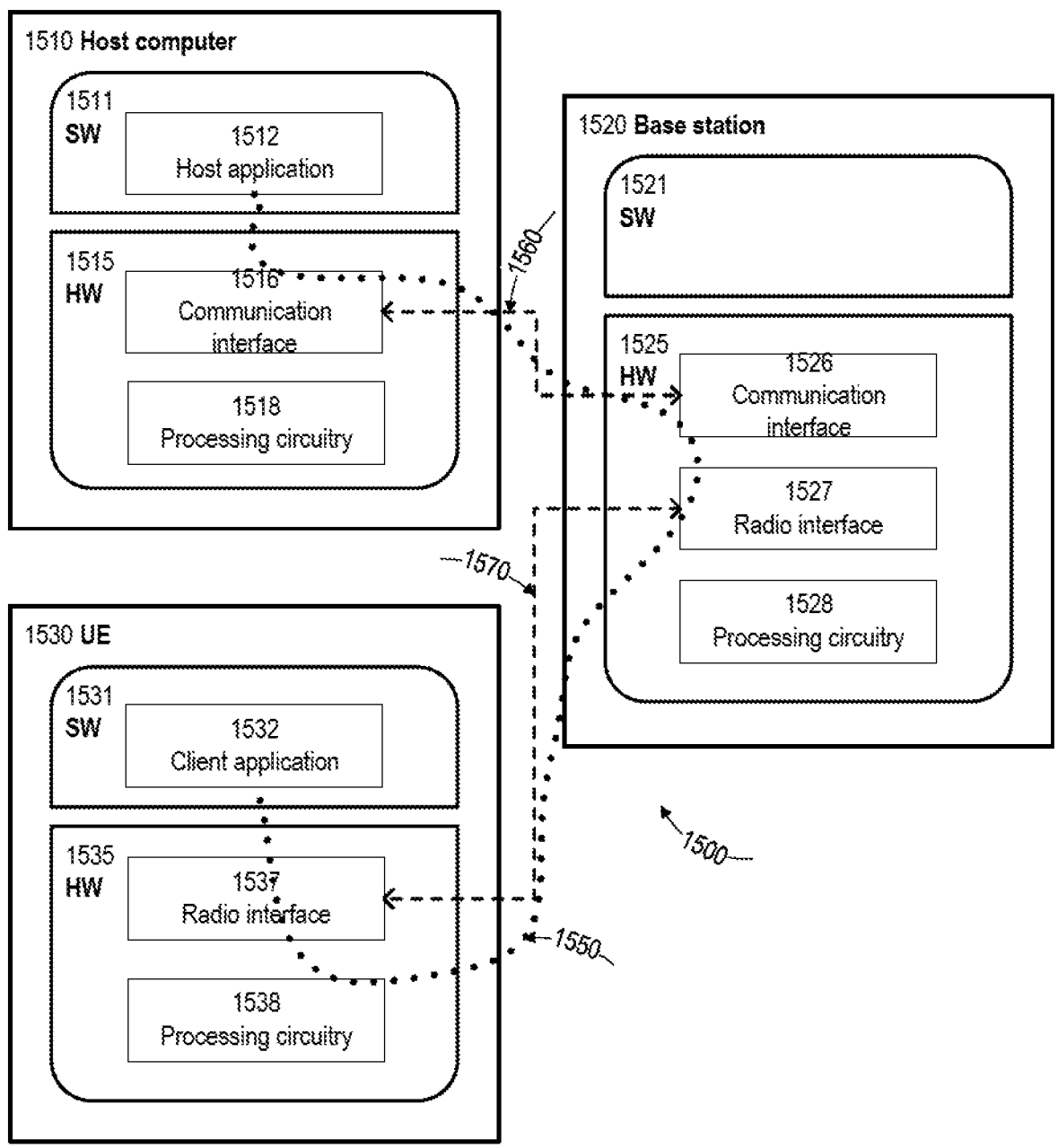
FIG. 26 illustrates an exemplary host computer communicating via a base station with a user equipment over a partially wireless connection according to an embodiment.

Example implementations, in accordance with an embodiment, of the UE, base station and host computer discussed in the preceding paragraphs will now be described with reference to FIG. 26. FIG. 26 illustrates host computer communicating via a base station with a user equipment over a partially wireless connection in accordance with some embodiments. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 26) served by base station 1520. Communication interface 1526 may be configured to facilitate connection 1560 to host computer 1510. Connection 1560 may be direct or it may pass through a core network (not shown in FIG. 26) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 26 may be similar or identical to host computer 1430, one of base stations 1412*a*, 1412*b*, 1412*c* and one of UEs 1491, 1492 of FIG. 25, respectively. This is to say, the inner workings of these entities may be as shown in FIG. 26 and independently, the surrounding network topology may be that of FIG. 25.

In FIG. 26, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the latency of data transmissions and thereby provide benefits such as reduced waiting time, particularly for machine control applications.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or dummy messages, using OTT connection 1550 while it monitors propagation times, errors etc.

Figure 27:
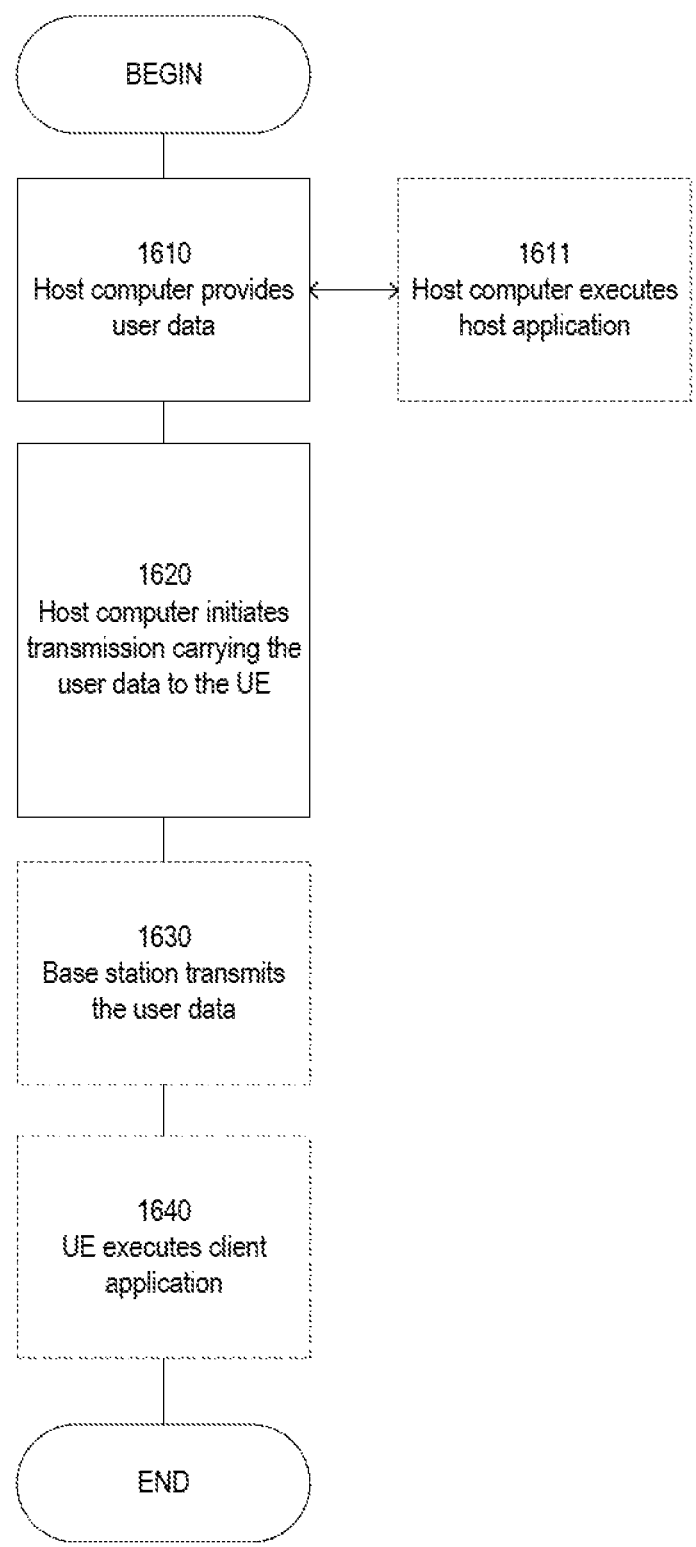
FIGS. 27-30 illustrate an exemplary methods implemented in a communication system, according to an embodiment.

FIG. 27 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 28:
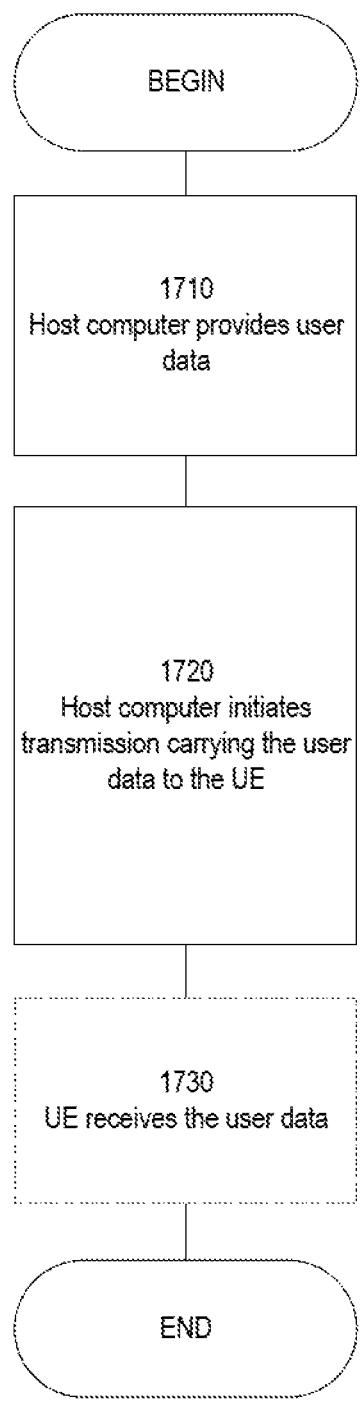

FIG. 28 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 29:
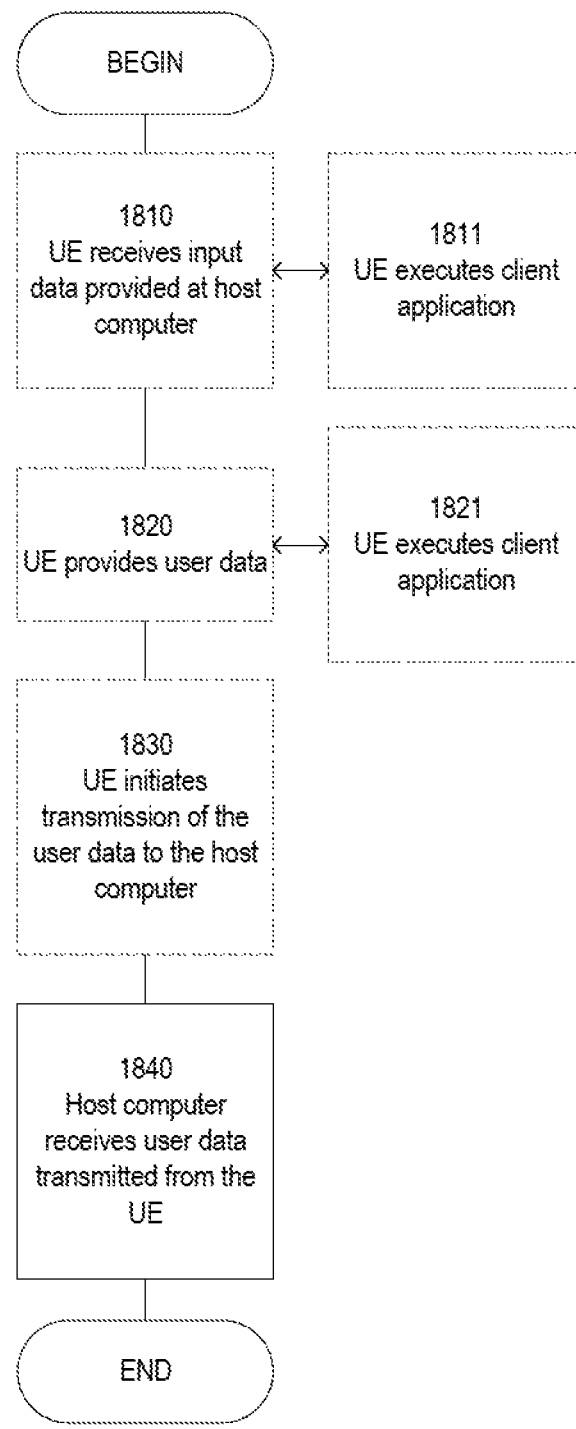

FIG. 29 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 27 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 30:
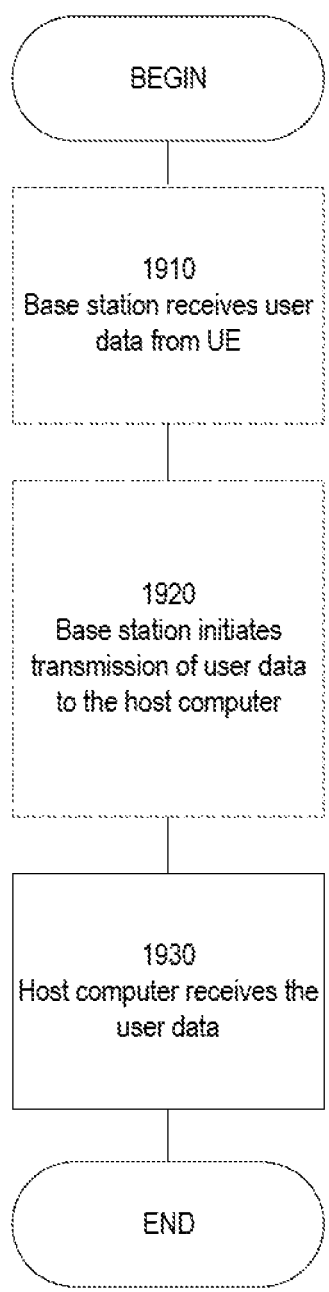

FIG. 30 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 28 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to, perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to wan/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein: rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method implemented by a user equipment (UE) of receiving precoding matrix indication from a base station in a wireless communication network, the UE being configured to transmit over multiple antenna ports, said method comprising:

receiving a control message from a base station including a precoding matrix indication field configurable to at least a first and second configuration, wherein:

the first configuration of the precoding matrix indication field identifies precoding matrices in both a first set and a second set of precoding matrices, where the first and second set of precoding matrices correspond to a requirement for a first and second transmission coherence of the UE, respectively;

the second configuration of the precoding matrix indication field identifies precoding matrices in the second set of precoding matrices, but not the first set of precoding matrices;

the precoding matrix indication field is further configurable to a third configuration;

the third configuration of the precoding matrix indication field identifies precoding matrices in a third set of precoding matrices, in addition to the first and second sets of precoding matrices, the third set of precoding matrices corresponding to a requirement for a third transmission coherence of the UE; and for maximum of four spatial layers, the first, second and third configurations of the precoding matrix indication field occupy 5, 4 and 6 information bits, respectively.

2. The method of claim 1, wherein the first, second and third transmission coherence represent partial coherence, non-coherence and full coherence, respectively.

3. The method of claim 1, wherein the first transmission coherence represents partial coherence and the first set of precoding matrices includes $$\frac{1}{2}\begin{bmatrix}1&0\\0&1\\1&0\\0&-j\end{bmatrix}, \frac{1}{2}\begin{bmatrix}1&0\\0&1\\1&0\\0&j\end{bmatrix}, \frac{1}{2}\begin{bmatrix}1&0\\0&1\\-j&0\\0&1\end{bmatrix}, \frac{1}{2}\begin{bmatrix}1&0\\0&1\\-j&0\\0&-1\end{bmatrix}, \frac{1}{2}\begin{bmatrix}1&0\\0&1\\-1&0\\0&-j\end{bmatrix},$$

$$\frac{1}{2}\begin{bmatrix}1&0\\0&1\\-1&0\\0&j\end{bmatrix}, \frac{1}{2}\begin{bmatrix}1&0\\0&1\\j&0\\0&1\end{bmatrix},$$

and $$\frac{1}{2}\begin{bmatrix}1&0\\0&1\\j&0\\0&-1\end{bmatrix}.$$

4. The method of claim 3, wherein the first set of precoding matrices further includes $$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix},$$

$$\frac{1}{2}\begin{bmatrix}0\\1\\0\\-j\end{bmatrix}.$$

5. The method of claim 1, further comprising:
initially recommending the first or second set of precoding matrices by indicating to the base station the first or second transmission coherence as a coherence capability of the UE.

6. The method of claim 1, further comprising:
transmitting data over two or more antenna ports according to a precoding matrix indicated by a precoding matrix indicator contained in the precoding matrix indication field.

7. A method implemented by a base station in a wireless communication network of indicating to a user equipment (UE), a precoding matrix for an uplink transmission from the UE to the base station, said method comprising:
transmitting a control message to the UE, said control message including a precoding matrix indication field configurable to at least a first and second configuration, wherein:
the first configuration of the precoding matrix indication field identifies precoding matrices in both a first set and a second set of precoding matrices, where the first and second set of precoding matrices correspond to a requirement for a first and second transmission coherence of the UE, respectively;
the second configuration of the precoding matrix indication field identifies precoding matrices in the second set of precoding matrices, but not the first set of precoding matrices;

the precoding matrix indication field is further configurable to a third configuration;
the third configuration of the precoding matrix indication field identifies precoding matrices in a third set of precoding matrices, in addition to the first and second sets of precoding matrices, the third set of precoding matrices corresponding to a requirement for a third transmission coherence of the UE; and
for maximum of four spatial layers, the first, second and third configurations of the precoding matrix indication field occupy 5, 4 and 6 information bits, respectively.

8. The method of claim 7, wherein the first, second and third transmission coherence represent partial coherence, non-coherence and full coherence, respectively.

9. The method of claim 7, wherein the first transmission coherence represents partial coherence and the first set of precoding matrices includes $$\frac{1}{2}\begin{bmatrix}1&0\\0&1\\1&0\\0&-j\end{bmatrix}, \frac{1}{2}\begin{bmatrix}1&0\\0&1\\1&0\\0&j\end{bmatrix}, \frac{1}{2}\begin{bmatrix}1&0\\0&1\\-j&0\\0&1\end{bmatrix}, \frac{1}{2}\begin{bmatrix}1&0\\0&1\\-j&0\\0&-1\end{bmatrix}, \frac{1}{2}\begin{bmatrix}1&0\\0&1\\-1&0\\0&-j\end{bmatrix},$$

$$\frac{1}{2}\begin{bmatrix}1&0\\0&1\\-1&0\\0&j\end{bmatrix}, \frac{1}{2}\begin{bmatrix}1&0\\0&1\\j&0\\0&1\end{bmatrix},$$

and $$\frac{1}{2}\begin{bmatrix}1&0\\0&1\\j&0\\0&-1\end{bmatrix}.$$

10. The method of claim 9, wherein the first set of precoding matrices further includes $$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix},$$

and $$\frac{1}{2}\begin{bmatrix}0\\1\\0\\-j\end{bmatrix}.$$

11. A user equipment (UE) operable in a wireless communication network, said UE being configured to transmit over multiple antenna ports, said UE comprising:
an interface circuit; and
a processing circuit configured to cause the UE to:
receive a control message from a base station including a precoding matrix indication field configurable to at least a first and second configuration,
wherein:
the first configuration of the precoding matrix indication field identifies precoding matrices in both a first set and a second set of precoding matrices, where the first and second sets of precoding matrices correspond to a requirement for a first and second transmission coherence of the UE, respectively;

the second configuration of the precoding matrix indication field identifies precoding matrices in the second set of precoding matrices, but not the first set of precoding matrices the precoding matrix indication field is further configurable to a third configuration;

the third configuration of the precoding matrix indication field identifies precoding matrices in a third set of precoding matrices, in addition to the first and second sets of precoding matrices, the third set of precoding matrices corresponding to a requirement for a third transmission coherence of the UE; and for maximum of four spatial layers, the first, second and third configurations of the precoding matrix indication field occupy 5, 4 and 6 information bits, respectively.

12. The UE of claim 11, wherein the first, second and third transmission coherence represent partial coherence, non-coherence and full coherence, respectively.

13. The UE of claim 11, wherein the first transmission coherence represents partial coherence and the first set of orecodina matrices includes $$\frac{1}{2}\begin{bmatrix} 1 & 0 \\ 0 & 1 \\ 1 & 0 \\ 0 & -j \end{bmatrix}, \frac{1}{2}\begin{bmatrix} 1 & 0 \\ 0 & 1 \\ 1 & 0 \\ 0 & j \end{bmatrix}, \frac{1}{2}\begin{bmatrix} 1 & 0 \\ 0 & 1 \\ -j & 0 \\ 0 & 1 \end{bmatrix}, \frac{1}{2}\begin{bmatrix} 1 & 0 \\ 0 & 1 \\ -j & 0 \\ 0 & -1 \end{bmatrix}, \frac{1}{2}\begin{bmatrix} 1 & 0 \\ 0 & 1 \\ -1 & 0 \\ 0 & -j \end{bmatrix},$$

$$\frac{1}{2}\begin{bmatrix} 1 & 0 \\ 0 & 1 \\ -1 & 0 \\ 0 & j \end{bmatrix}, \frac{1}{2}\begin{bmatrix} 1 & 0 \\ 0 & 1 \\ j & 0 \\ 0 & 1 \end{bmatrix},$$

and $$\frac{1}{2}\begin{bmatrix} 1 & 0 \\ 0 & 1 \\ j & 0 \\ 0 & -1 \end{bmatrix}.$$

14. The UE of claim 13, wherein the first set of precoding matrices further includes $$\frac{1}{2}\begin{bmatrix} 1 \\ 0 \\ 1 \\ 0 \end{bmatrix}, \frac{1}{2}\begin{bmatrix} 1 \\ 0 \\ -1 \\ 0 \end{bmatrix}, \frac{1}{2}\begin{bmatrix} 1 \\ 0 \\ j \\ 0 \end{bmatrix}, \frac{1}{2}\begin{bmatrix} 1 \\ 0 \\ -j \\ 0 \end{bmatrix}, \frac{1}{2}\begin{bmatrix} 0 \\ 1 \\ 0 \\ 1 \end{bmatrix}, \frac{1}{2}\begin{bmatrix} 0 \\ 1 \\ 0 \\ -1 \end{bmatrix}, \frac{1}{2}\begin{bmatrix} 0 \\ 1 \\ 0 \\ j \end{bmatrix},$$

and $$\frac{1}{2}\begin{bmatrix} 0 \\ 1 \\ 0 \\ -j \end{bmatrix}.$$

15. The UE of claim 11, wherein the processing circuit is further configured to cause the UE to:

initially recommend the first or second set of precoding matrices by indicating to the base station the first or second transmission coherence as a coherence capability of the UE.

16. The UE of claim 11, wherein the processing circuit is further configured to cause the UE to:

transmit data over two or more antenna ports according to a precoding matrix indicated by a precoding matrix indicator contained in the precoding matrix indication field.

17. A base station operable in a wireless communication network, said base station comprising:

an interface circuit; and a processing circuit configured to cause the base station to:

transmit a control message to a user equipment (UE), said control message including a precoding matrix indication field configurable to at least a first and second configuration;

wherein:

the first configuration of the precoding matrix indication field identifies precoding matrices in both a first set and a second set of precoding matrices, where the first and second set of precoding matrices correspond to a requirement for a first and second transmission coherence of the UE, respectively;

the second configuration of the precoding matrix indication field identifies precoding matrices in the second set of precoding matrices, but not the first set of precoding matrices;

the precoding matrix indication field is further configurable to a third configuration;

the third configuration of the precoding matrix indication field identifies precoding matrices in a third set of precoding matrices, in addition to the first and second sets of precoding matrices, the third set of precoding matrices corresponding to a requirement for a third transmission coherence of the UE; and for maximum of four spatial layers, the first, second and third configurations of the precoding matrix indication field occupy 5, 4 and 6 information bits, respectively.

18. The base station of claim 17, wherein the first, second and third transmission coherence represent partial coherence, non-coherence and full coherence, respectively.

19. The base station of claim 17, wherein the first transmission coherence represents partial coherence and the first set of precoding matrices includes $$\frac{1}{2}\begin{bmatrix} 1 & 0 \\ 0 & 1 \\ 1 & 0 \\ 0 & -j \end{bmatrix}, \frac{1}{2}\begin{bmatrix} 1 & 0 \\ 0 & 1 \\ 1 & 0 \\ 0 & j \end{bmatrix}, \frac{1}{2}\begin{bmatrix} 1 & 0 \\ 0 & 1 \\ -j & 0 \\ 0 & 1 \end{bmatrix}, \frac{1}{2}\begin{bmatrix} 1 & 0 \\ 0 & 1 \\ -j & 0 \\ 0 & -1 \end{bmatrix}, \frac{1}{2}\begin{bmatrix} 1 & 0 \\ 0 & 1 \\ -1 & 0 \\ 0 & -j \end{bmatrix},$$

$$\frac{1}{2}\begin{bmatrix} 1 & 0 \\ 0 & 1 \\ -1 & 0 \\ 0 & j \end{bmatrix}, \frac{1}{2}\begin{bmatrix} 1 & 0 \\ 0 & 1 \\ j & 0 \\ 0 & 1 \end{bmatrix},$$

and $$\frac{1}{2}\begin{bmatrix} 1 & 0 \\ 0 & 1 \\ j & 0 \\ 0 & -1 \end{bmatrix}.$$

20. The base station of claim 17, wherein the first set of precoding matrices further includes $$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix},$$

and $$\frac{1}{2}\begin{bmatrix}0\\1\\0\\-j\end{bmatrix}.$$

\* \* \* \* \*

UNITED STATES PATENT AND TRADEMARK OFFICE
CERTIFICATE OF CORRECTION

PATENT NO. : 11,418,240 B2
APPLICATION NO. : 16/318632
DATED : August 16, 2022
INVENTOR(S) : Harrison et al.

It is certified that error appears in the above-identified patent and that said Letters Patent is hereby corrected as shown below:

On the Title Page

On Page 2, item (56), under "OTHER PUBLICATIONS", in Column 2, Line 17, delete "(Dec. 2013)," and insert -- (Feb. 2013), --, therefor.

In the Specification

In Column 1, Line 51, delete "ail" and insert -- all --, therefor.

In Column 1, Line 62, delete "oaf" and insert -- of --, therefor.

In Column 2, Line 12, delete "ail" and insert -- all --, therefor.

In Column 2, Line 28, delete "preceding" and insert -- precoding --, therefor.

In Column 2, Line 31, delete "preceding" and insert -- precoding --, therefor.

In Column 2, Line 32, delete "preceding matrices comprises preceding" and insert -- precoding matrices comprises precoding --, therefor.

In Column 2, Line 33, delete "ail" and insert -- all --, therefor.

In Column 2, Line 40, delete "preceding" and insert -- precoding --, therefor.

In Column 2, Line 41, delete "preceding" and insert -- precoding --, therefor.

In Column 2, Line 53, delete "preceding" and insert -- precoding --, therefor.

In Column 3, Line 48, delete "first" and insert -- first, --, therefor.

Signed and Sealed this
Eighteenth Day of April, 2023

Katherine Kelly Vidal
*Director of the United States Patent and Trademark Office*

CERTIFICATE OF CORRECTION (continued)
U.S. Pat. No. 11,418,240 B2

In Column 4, Line 11, delete "preceding" and insert -- precoding --, therefor.

In Column 4, Line 24, delete "preceding" and insert -- precoding --, therefor.

In Column 4, Line 27, delete "preceding" and insert -- precoding --, therefor.

In Column 4, Line 29, delete "preceding" and insert -- precoding --, therefor.

In Column 5, Line 39, delete "on," and insert -- on --, therefor.

In Column 6, Line 14, delete "p" and insert -- µ --, therefor.

In Column 6, Line 65, delete "Repeat." and insert -- Repeat --, therefor.

In Column 7, Line 6, delete "channel," and insert -- channel. --, therefor.

In Column 7, Line 22, delete "$N_2$" and insert -- $N_T$ --, therefor.

In Column 8, Line 36, delete "precoder." and insert -- precoder W. --, therefor.

In Column 8, Line 57, delete "COI," and insert -- CQI, --, therefor.

In Column 9, Line 5, delete "adaptation." and insert -- adaptation, --, therefor.

In Column 10, Line 29, delete "ern" and insert -- on --, therefor.

In Column 11, Line 5, delete "precede," and insert -- 'precoder', --, therefor.

In Column 11, Line 43, delete "(1,2)." and insert -- (1,2), --, therefor.

In Column 11, Line 46, delete "preceding" and insert -- precoding --, therefor.

In Column 11, Line 64, delete "(3.4)" and insert -- (3,4) --, therefor.

In Column 12, Line 23, delete "TPMs" and insert -- TPMIs --, therefor.

In Column 13, Line 2, delete "LIE" and insert -- LTE --, therefor.

In Column 13, Line 8, delete "5.3.3A2-2" and insert -- 5.3.3A.2-2 --, therefor.

In Column 13, Line 49, delete "u=2" and insert -- v=2 --, therefor.

In Column 14, Line 8, delete "transmsson" and insert -- transmission --, therefor.

In Column 14, Line 49, delete "transmsson" and insert -- transmission --, therefor.

CERTIFICATE OF CORRECTION (continued)

In Column 14, Line 60, delete " $\frac{1}{2}\begin{bmatrix} 1 & 0 \\ 0 & 1 \\ 1 & 0 \\ 0 & 1 \end{bmatrix}$ " and insert -- $\frac{1}{2}\begin{bmatrix} 1 & 0 \\ 0 & 1 \\ 0 & 1 \\ 1 & 0 \end{bmatrix}$ --, therefor.

In Columns 15 & 16, Table 3, Line 6, delete " $\frac{1}{2}\begin{bmatrix} 1 & 0 \\ -1 & 0 \\ 0 & 1 \\ 0 & -1 \end{bmatrix}$ " and insert -- $\frac{1}{2}\begin{bmatrix} 1 & 0 \\ -1 & 0 \\ 0 & 1 \\ 0 & -1 \end{bmatrix}$ --, therefor.

In Column 17, Line 30, delete "codebacks" and insert -- codebooks --, therefor.

In Column 25, Line 11, delete "WINO" and insert -- MIMO --, therefor.

In Column 26, Line 1, delete "[log₂ N]," and insert -- $\lceil \log_2 N \rceil$, --, therefor.

In Column 26, Line 3, delete "[x]" and insert -- $\lceil x \rceil$ --, therefor.

In Columns 27 & 28, Table 20, Line 9, delete "j)√2" and insert -- j)/√2 --, therefor.

In Columns 27 & 28, Table 20, Line 11, delete "(-1+j/" and insert -- (-1+j)/ --, therefor.

In Columns 27 & 28, Table 20, Line 12, delete "(1+j/" and insert -- (1+j)/ --, therefor.

In Column 29, Line 5, delete "REL8" and insert -- REL-8 --, therefor.

In Column 29, Line 11, delete "$W_n=I-2u_nu_nH/u_n^Hu_n$" and insert -- $W_n=I-2u_nu_n^H/u_n^Hu_n$, --, therefor.

In Column 30, Line 14, delete "codebook;" and insert -- codebook, --, therefor.

In Column 30, Line 17, delete "concern;" and insert -- concern, --, therefor.

In Column 30, Lines 34-35, delete "0=4 to 0=2," and insert -- O=4 to O=2, --, therefor.

In Columns 31 & 32, Table 21C, Line 3, delete "$v$=4" and insert -- $v$=3 --, therefor.

In Column 32, Line 60, delete "[log$_2$N]." and insert -- $\lceil \log_2 N \rceil$. --, therefor.

In Column 34, Line 9, delete "[log$_2$N]" and insert -- $\lceil \log_2 N \rceil$ --, therefor.

In Columns 33-34, Table 24, Line 2, delete "40," and insert -- {40, --, therefor.

In Column 35, Line 24, delete "15-36" and insert -- 16-36 --, therefor.

In Column 35, Line 25, delete "15-25" and insert -- 16-25 --, therefor.

In Column 35, Line 42, delete "7-13" and insert -- 7-18 --, therefor.

In Column 36, Line 14, delete "preceding" and insert -- precoding --, therefor.

In Column 36, Line 21, delete "preceding" and insert -- precoding --, therefor.

In Column 36, Line 22, delete "preceding" and insert -- precoding --, therefor.

In Column 36, Line 23, delete "third," and insert -- third --, therefor.

In Column 36, Line 25, delete "preceding" and insert -- precoding --, therefor.

In Column 36, Line 33, delete "preceding" and insert -- precoding --, therefor.

In Column 36, Line 34, delete "preceding" and insert -- precoding --, therefor.

In Column 36, Line 37, delete "preceding matrix in the fourth set of preceding" and insert -- precoding matrix in the fourth set of precoding --, therefor.

In Column 36, Line 41, delete "preceding" and insert -- precoding --, therefor.

In Column 36, Line 42, delete "preceding" and insert -- precoding --, therefor.

In Column 37, Line 1, delete "preceding" and insert -- precoding --, therefor.

In Column 37, Line 8, delete "preceding" and insert -- precoding --, therefor.

In Column 37, Line 13, delete "an" and insert -- on --, therefor.

In Column 37, Lines 16-17, delete "preceding" and insert -- precoding --, therefor.

In Column 38, Line 23, delete "preceding" and insert -- precoding --, therefor.

CERTIFICATE OF CORRECTION (continued)
U.S. Pat. No. 11,418,240 B2

In Column 38, Line 45, delete "preceding" and insert -- precoding --, therefor.

In Column 38, Line 51, delete "preceding" and insert -- precoding --, therefor.

In Column 39, Line 33, delete "Iwo" and insert -- two --, therefor.

In Column 39, Line 60, delete "preceding matrix" and insert -- precoding matrix --, therefor.

In Column 39, Line 60, delete "of preceding" and insert -- of precoding --, therefor.

In Column 40, Line 3, delete "preceding" and insert -- precoding --, therefor.

In Column 40, Line 10, delete "preceding" and insert -- precoding --, therefor.

In Column 40, Line 12, delete "preceding matrix" and insert -- precoding matrix --, therefor.

In Column 40, Line 12, delete "uplink preceding" and insert -- uplink precoding --, therefor.

In Column 40, Line 13, delete "preceding" and insert -- precoding --, therefor.

In Column 41, Line 56, delete "preceding" and insert -- precoding --, therefor.

In Column 42, Line 9, delete "preceding" and insert -- precoding --, therefor.

In Column 42, Line 29, delete "preceding" and insert -- precoding --, therefor.

In Column 42, Line 47, delete "465)," and insert -- 465). --, therefor.

In Column 42, Line 54, delete "preceding" and insert -- precoding --, therefor.

In Column 42, Line 62, delete "preceding" and insert -- precoding --, therefor.

In Column 43, Line 6, delete "preceding" and insert -- precoding --, therefor.

In Column 44, Line 25, delete "preceding" and insert -- precoding --, therefor.

In Column 45, Line 18, delete "capability." and insert -- capability, --, therefor.

In Column 49, Line 13, delete "part(s)/terminal(s)" and insert -- port(s)/terminal(s) --, therefor.

In Column 49, Line 43, delete "RE" and insert -- RF --, therefor.

In Column 51, Line 59, delete "1112:" and insert -- 1112; --, therefor.

In Column 51, Line 64, delete "nodes," and insert -- nodes --, therefor.

CERTIFICATE OF CORRECTION (continued)
U.S. Pat. No. 11,418,240 B2

In Column 53, Line 1, delete "WO." and insert -- WD. --, therefor.

In Column 56, Line 20, delete "(SIM/RUM)" and insert -- (SIM/RUIM) --, therefor.

In Column 57, Line 21, delete "schematic," and insert -- schematic --, therefor.

In Column 57, Line 48, delete "1412a. 1412b. 1412c" and insert -- 1412a, 1412b, 1412c --, therefor.

In Column 60, Line 25, delete "dummy" and insert -- 'dummy' --, therefor.

In Column 61, Line 50, delete "to," and insert -- to --, therefor.

In Column 61, Line 57, delete "wan/the" and insert -- a/an/the --, therefor.

In Column 62, Line 18, delete "herein:" and insert -- herein; --, therefor.

In the Claims

In Column 63, Line 34, in Claim 4, above " $\frac{1}{2}\begin{bmatrix} 0 \\ 1 \\ 0 \\ -j \end{bmatrix}$ " insert -- and --.

In Column 65, Line 24, in Claim 13, delete "orecodina" and insert -- precoding --, therefor.